(12) United States Patent
McCafferty et al.

(10) Patent No.: US 10,233,027 B1
(45) Date of Patent: Mar. 19, 2019

(54) MATERIAL HANDLING APPARATUS AND METHOD

(71) Applicant: ZME, LLC., Caldwell, ID (US)

(72) Inventors: Matthew Robert McCafferty, Middleton, ID (US); Zachary Gerald Soles, Nampa, ID (US)

(73) Assignee: ZME, LLC, Caldwell, ID (US)

(*) Notice: Subject to any disclaimer, the term of this patent is extended or adjusted under 35 U.S.C. 154(b) by 0 days.

(21) Appl. No.: 15/613,881

(22) Filed: Jun. 5, 2017

Related U.S. Application Data

(60) Provisional application No. 62/345,202, filed on Jun. 3, 2016.

(51) Int. Cl.
*B65G 25/08* (2006.01)
*B65G 25/10* (2006.01)

(52) U.S. Cl.
CPC ............. *B65G 25/10* (2013.01); *B65G 25/08* (2013.01)

(58) Field of Classification Search
CPC ................................ B65G 25/08; B65G 25/10
USPC ....... 198/741, 743, 744, 746, 747, 737, 738, 198/750.1, 750.2
See application file for complete search history.

(56) References Cited

U.S. PATENT DOCUMENTS

| | | | |
|---|---|---|---|
| 2,103,469 A | 12/1937 | Kremer | |
| 3,310,150 A | 3/1967 | Southard | |
| 3,512,629 A * | 5/1970 | Torrance | B65G 47/00 198/718 |
| 4,323,152 A | 4/1982 | Wiknich | |
| 4,476,976 A | 10/1984 | Smith | |
| 4,484,676 A | 11/1984 | Plumridge et al. | |
| 4,584,466 A | 4/1986 | De Mola | |
| 4,592,273 A | 6/1986 | Yonezawa | |
| 5,195,630 A | 3/1993 | Donovan et al. | |
| 5,320,212 A | 6/1994 | McIntosh et al. | |
| 5,320,213 A | 6/1994 | McIntosh et al. | |
| 5,816,381 A * | 10/1998 | Bungter | B65G 25/10 198/301 |
| 5,850,904 A | 12/1998 | DeBrosse et al. | |
| 6,852,242 B2 | 2/2005 | Sun et al. | |
| 7,269,935 B2 | 9/2007 | Jafari | |
| 7,367,445 B2 | 5/2008 | Mazurek | |
| 9,028,902 B2 | 5/2015 | Evseev | |
| 9,103,595 B2 | 6/2015 | Ciurkot | |
| 9,476,647 B2 | 10/2016 | Yang et al. | |

(Continued)

FOREIGN PATENT DOCUMENTS

GB          1258257          12/1971

*Primary Examiner* — James R Bidwell
(74) *Attorney, Agent, or Firm* — AP Patents

(57) ABSTRACT

An indexing or ratcheting conveyor configured to advance loads includes a frame defining the inlet end and the outlet end of the conveyor, an indexing device with a gravity rocking pushers mounted on moving rails and pushing on the loads, the rails mounted for movement on receptacles and a powered member linked to carrying members and configured to advance the loads along a conveyance path in a direction from the inlet end to the outlet end of the conveyor. The conveyor can also include a second device configured to move the loads, disposed at the outlet end only, in a direction from the outlet end to the inlet end prior to discharge of the load outwardly from the outlet end. The conveyor can be used as a component of an oven configured to cook or bake dough in containers with electrical resistance.

18 Claims, 29 Drawing Sheets

(56) References Cited

U.S. PATENT DOCUMENTS 9,745,137 B1 8/2017 McCafferty et al.
2004/0065527 A1* 4/2004 Opdahl ................ B65G 25/08
198/468.1

* cited by examiner

MATERIAL HANDLING APPARATUS AND METHOD

CROSS-REFERENCE TO RELATED APPLICATIONS

The present application is related to and claims priority from a provisional U.S. patent application No. 62/345,202, tilted "Conveyor", filed on Jun. 3, 2016 by inventors Matthew Robert McCafferty and Zachary Gerald Soles and is being hereby incorporated herein by reference in its entirety.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to conveyors for transporting material. It further relates to indexing conveyors for transporting closely placed loads in a linear direction. It further relates to systems methods utilizing conveyors.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, conveyors are used for transporting or advancing product(s) in material handling applications. Such conveyors can be used to transport material to and from material processing machine or as an integrated/internal component of the material processing machine. Some conveyors utilize belts or rollers that may require more than desirable cleaning, particularly when used in applications requiring frequent cleaning due to sanitary and cleanness standards and requirements. Furthermore, such belt or roller conveyors can be used in applications requiring load indexing (stop and go). Some conveyors may use a push cylinder with a wide paddle above a table top to advance product(s). Some conveyors may use a bar that is attached to two parallel chains (the chains are parallel to the conveyor body). Some conveyors can be of an indexing type using gravity drop-out dogs or pushers.

BRIEF DESCRIPTION OF THE DRAWINGS

The accompanying drawings are incorporated in and constitute part of the specification and illustrate various embodiments. In the drawings.

DETAILED DESCRIPTION OF EXEMPLARY EMBODIMENTS

Figure 1:
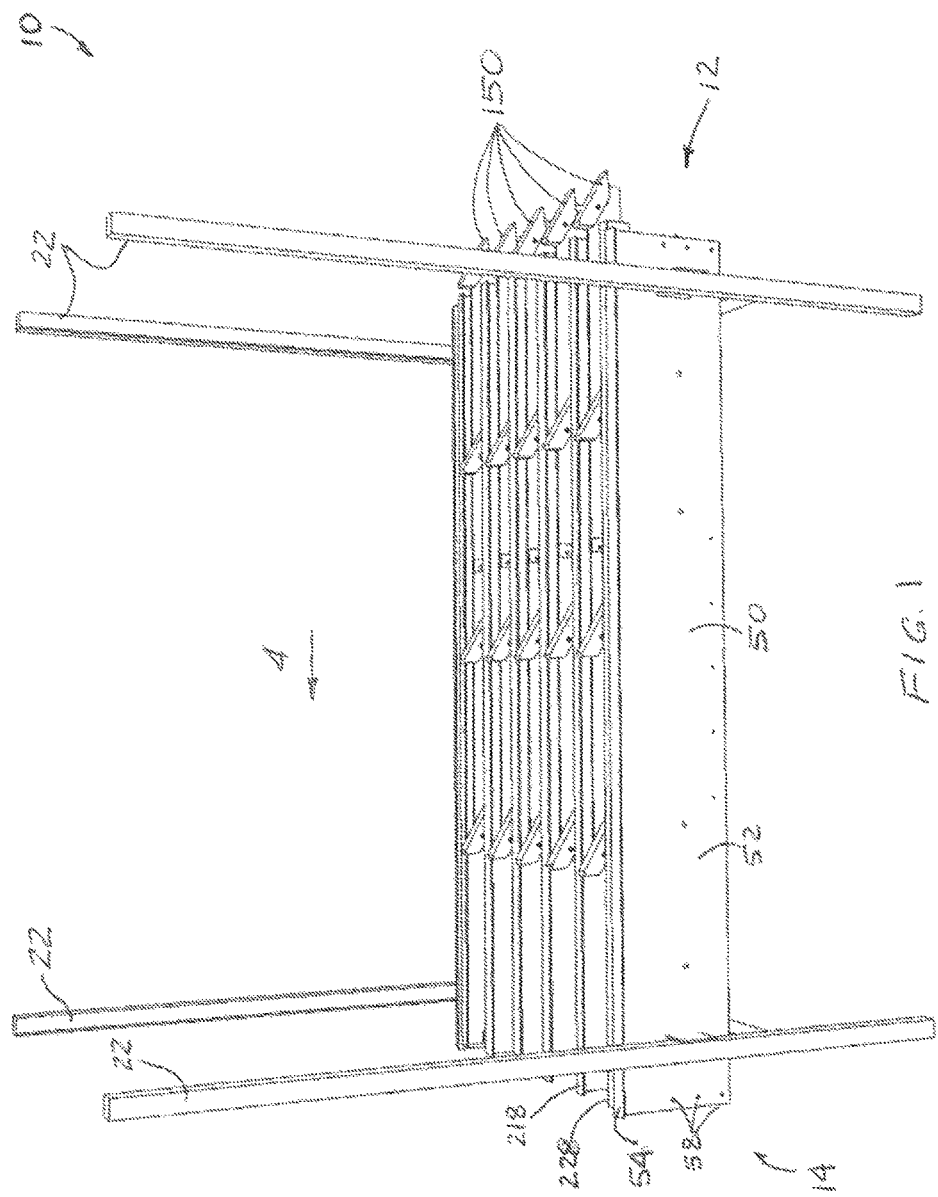
FIG. 1 illustrates a 3-D view of an exemplary conveyor configured to advance multiple rows of loads.

Prior to proceeding to the more detailed description of the present invention, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As may be used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

For purposes of description herein, the directional and/or relationary terms such as "upper", "top", "lower", "bottom", "left", "right", "rear", "back", "front", "apex", "vertical", "horizontal", "lateral", "exterior", "interior" and derivatives thereof are relative to each other and are dependent on the specific orientation of an applicable element or article, and are used accordingly to aid in the description of the various embodiments and are not necessarily intended to be construed as limiting. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The term "or" when used in this specification and the appended claims is not meant to be exclusive; rather the term is inclusive, meaning either or both.

The term "couple" or "coupled", when used in this specification and appended claims, refers to an indirect or direct physical connection between the identified elements, components, or objects. Often the manner of the coupling will be related specifically to the manner in which the two coupled elements interact.

The term "directly coupled" or "coupled directly," when used in this specification and appended claims, refers to a physical connection between identified elements, components, or objects, in which no other element, component, or object resides between those identified as being directly coupled.

The terms "removable", "removably coupled", "removably disposed," "readily removable", "readily detachable", "detachably coupled", "separable," "separably coupled," and similar terms, when used in this specification and appended claims, refer to structures that can be uncoupled, detached, uninstalled, or removed from an adjoining structure with relative ease (i.e., non-destructively, and without a complicated or time-consuming process), and that can also be readily reinstalled, recoupled, or coupled to the previously adjoining structure.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items. As may be used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present disclosure are provided for illustration purpose only and not for the purpose of limiting the present disclosure as defined by the appended claims and their equivalents.

The term "conveyor" when used in this specification and appended claims, refers, without limitations, to an indexing conveyor, a ratchet conveyor, a bi-directional ratchet conveyor, a belt conveyor, or a roller conveyor.

The term "substantially horizontally" as used herein when referring to elements or features of the conveyor(s) should be understood to mean that such elements or features are positioned with respect to a vertical line extending there above at an angle of 90°, except for manufacturing tolerances. The angle can be in the range of from about 89° to about 91°, in the range of from about 88° to about 92°, in the range of from about 87° to about 93°, or in the range of from about 85° to about 95°. In other words, the term "substantially horizontally" should be also understood to mean that, if deviating from absolutely horizontal, the conveyor is operable to convey material completely or partially between ends of the conveyor.

The term "generally horizontal(ly)" or "generally vertical (ly)" should be also understood to mean respectively horizontally or vertically disposed element or surface but the term does not exclude the possibility of orienting such feature or surface at a small angle relative to respectively absolute horizontal or vertical plane.

It is to be understood that the singular forms "a," "an," and "the" include plural referents unless the context clearly dictates otherwise. Thus, for example, reference to "a component surface" includes reference to one or more of such surfaces.

The particular embodiments of the present disclosure generally provide conveying means, conveyors, systems and methods directed to transporting or advancing material(s) or load(s) in a linear direction.

In particular embodiments, a conveyor is configured to advance a single load.

In particular embodiments, a conveyor is configured to advance a single row or series of loads spaced apart along a conveyance path.

In particular embodiments, a conveyor is configured to advance a single row or series of loads spaced apart across a conveyance path.

In particular embodiments, a conveyor is configured to advance a multiple rows or series of loads.

In particular embodiments, a conveyor is configured to transport or advance a plurality of rows of loads with a plurality of loads in each row in a linear transport or conveyance path.

In particular embodiments, a conveyor is configured to transport or advance, along the linear transport or conveyance path, a plurality of loads disposed in a plurality of rows and in a series with each other within each row.

Now referring to the drawings, FIGS. 1-9 illustrate an embodiment of a material handling apparatus or conveyor, generally designated as 10. The conveyor 10 may be also referred to in this document as an indexing conveyor, a ratchet conveyor, a bi-directional ratchet conveyor, a conveying apparatus, an apparatus or a conveyance apparatus. The conveyor 10 is configured to transport or advance a plurality of rows of loads 2 with a plurality of loads 2 in each row in a linear transport or conveyance path 4. The conveyor 10 is also configured to transport or advance, along the linear transport or conveyance path 4, a plurality of loads disposed in a plurality of rows and in a series with each other within each row. The conveyor 10 defines an inlet end 12 and an outlet end 14. The linear transport or conveyance path 4 is defined herewithin as a path from the inlet end 12 to the outlet end 14. The linear transport or conveyance path 4 can be also referred to as a pathway. In other words, the conveyor 10 is configured to convey an array of loads 2 along the conveyance path 4, the array comprising a plurality of rows of loads 2 disposed along the conveyance path 4 with a plurality of loads 2 disposed in each row in a direction normal to the conveyance path.

Figure 4:
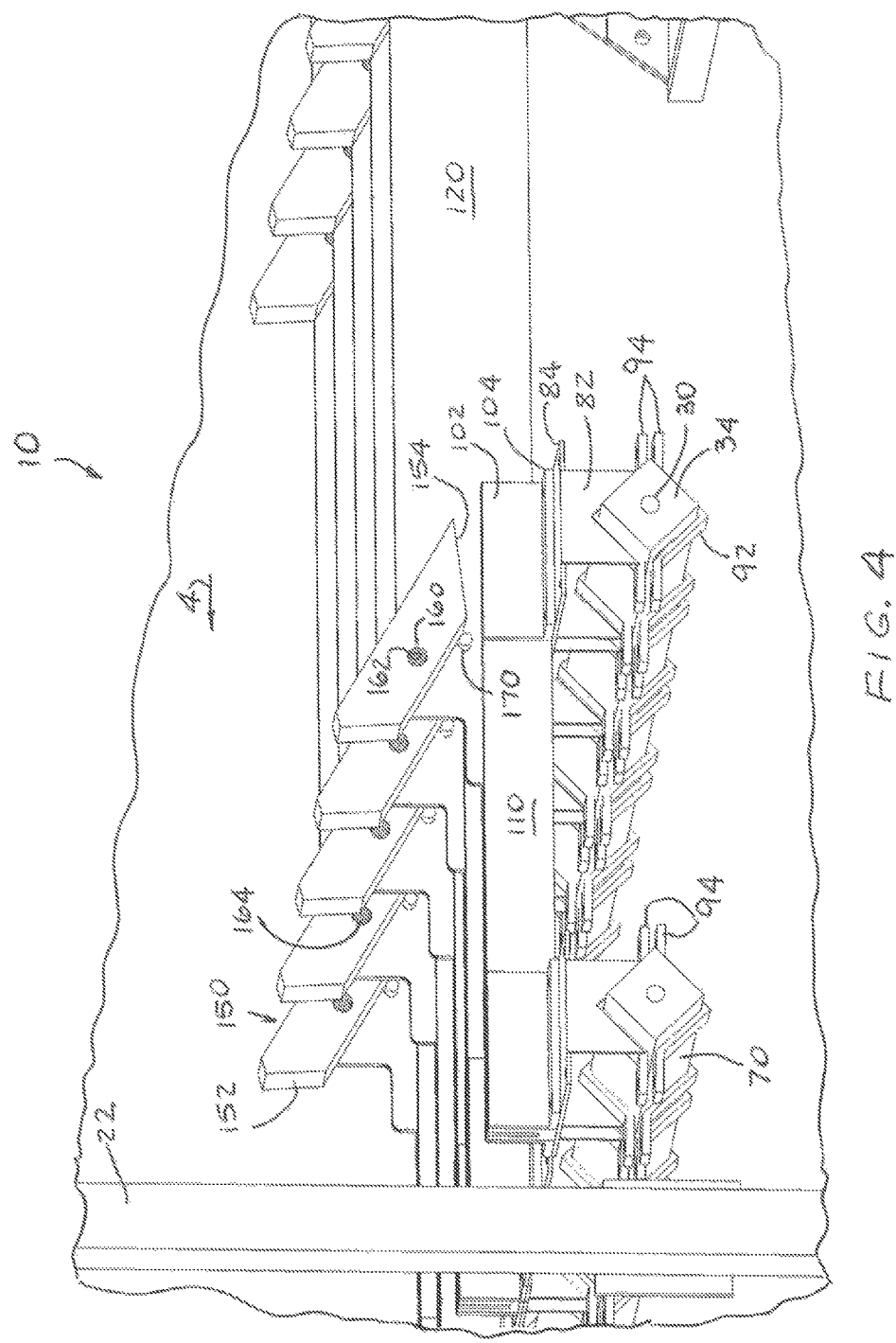
FIG. 4 illustrates a partial 3-D side view of the conveyor of FIG. 1.
Figure 5:
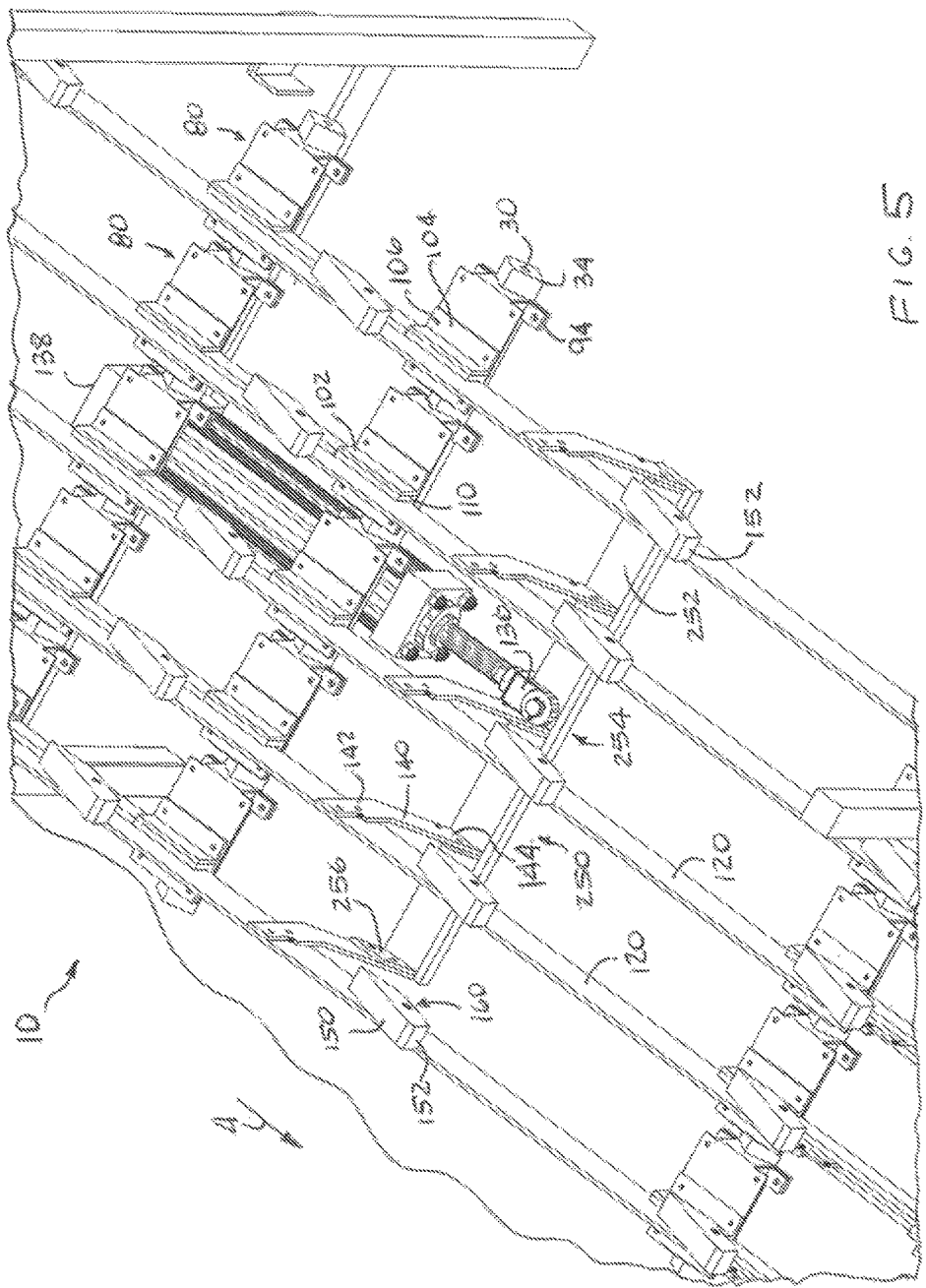
FIG. 5 illustrates one partial 3-D top view of the conveyor of FIG. 1.
Figure 6:
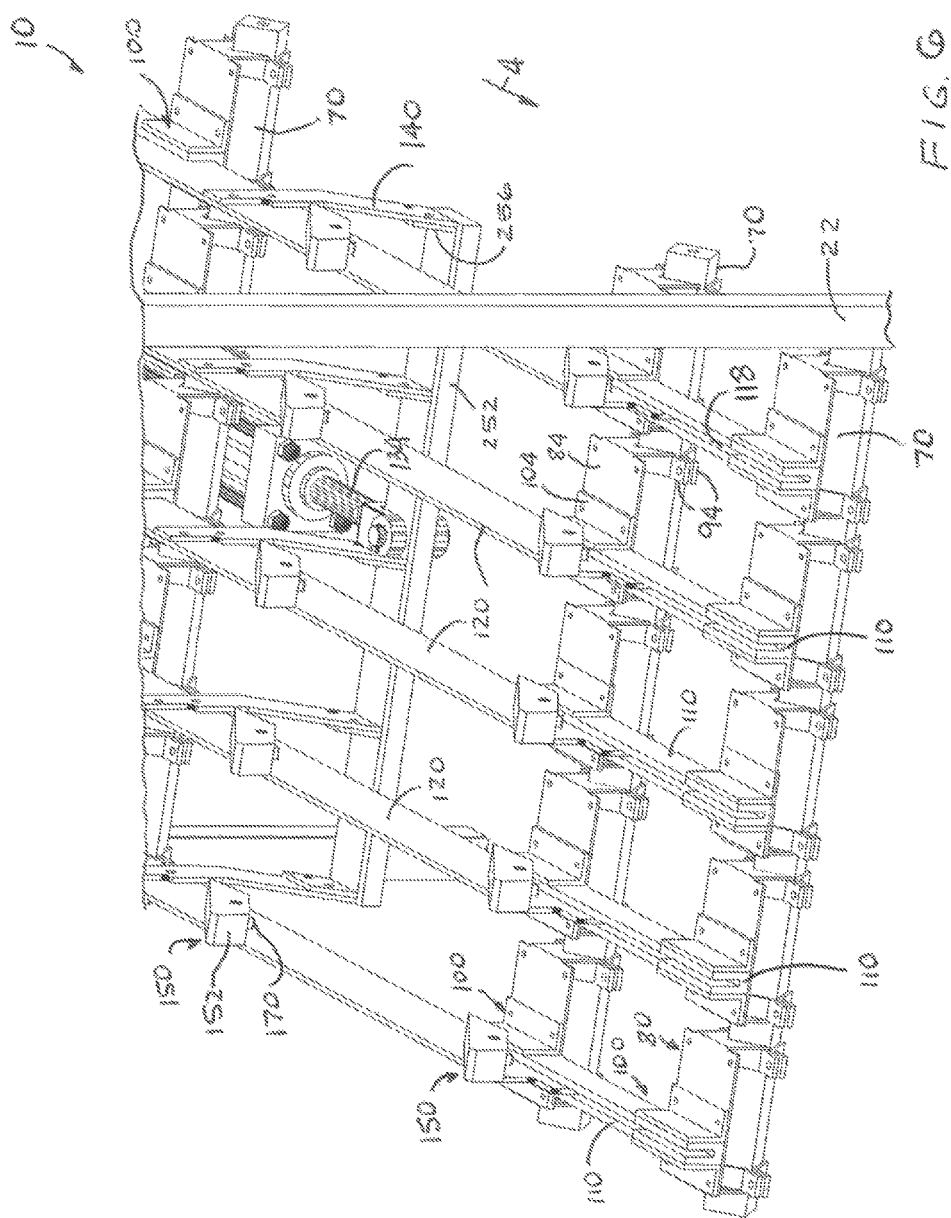
FIG. 6 illustrates one partial 3-D top view of the conveyor of FIG. 1.
Figure 7:
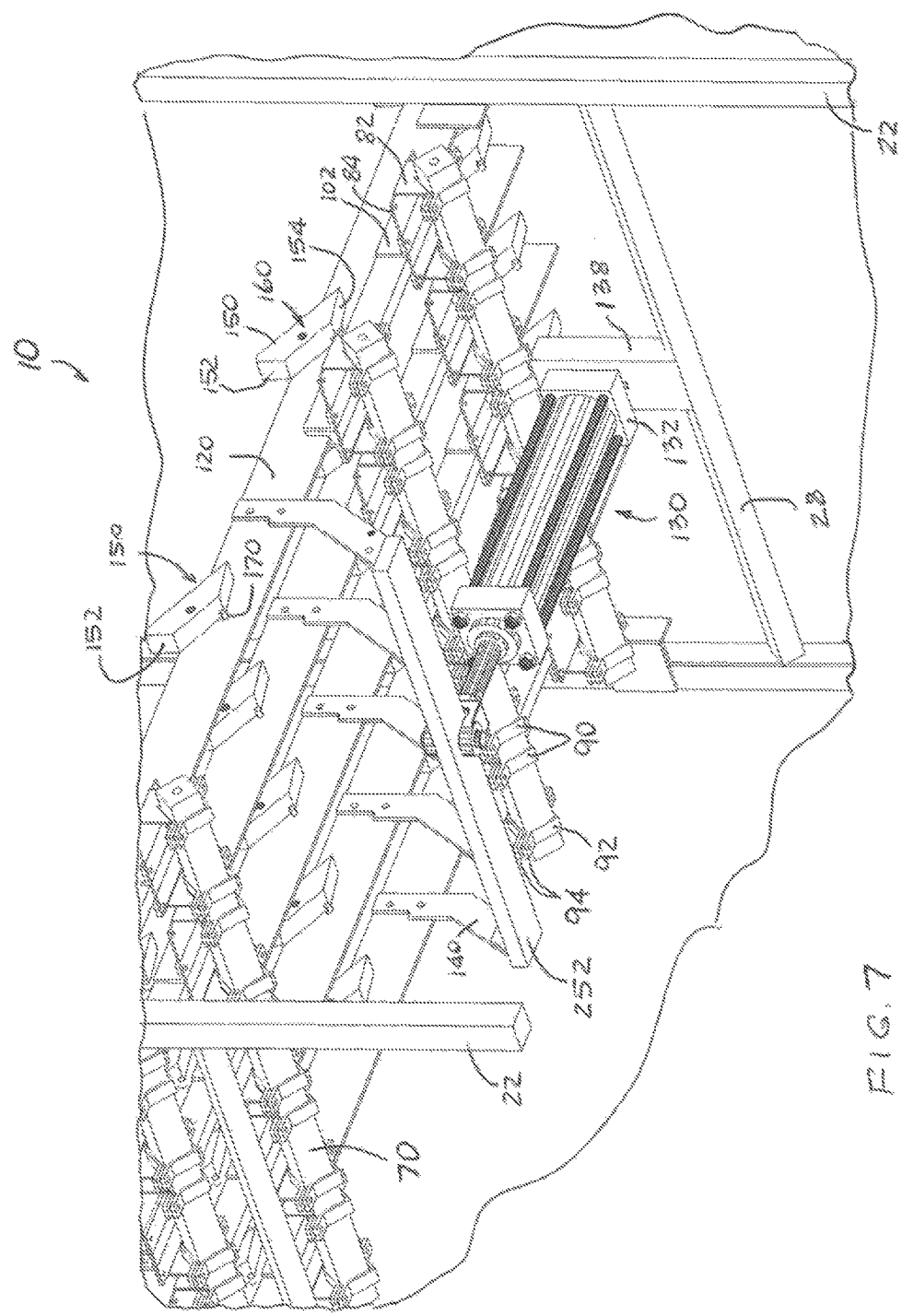
FIG. 7 illustrates a partial 3-D bottom view of the conveyor of FIG. 1.
Figure 8:
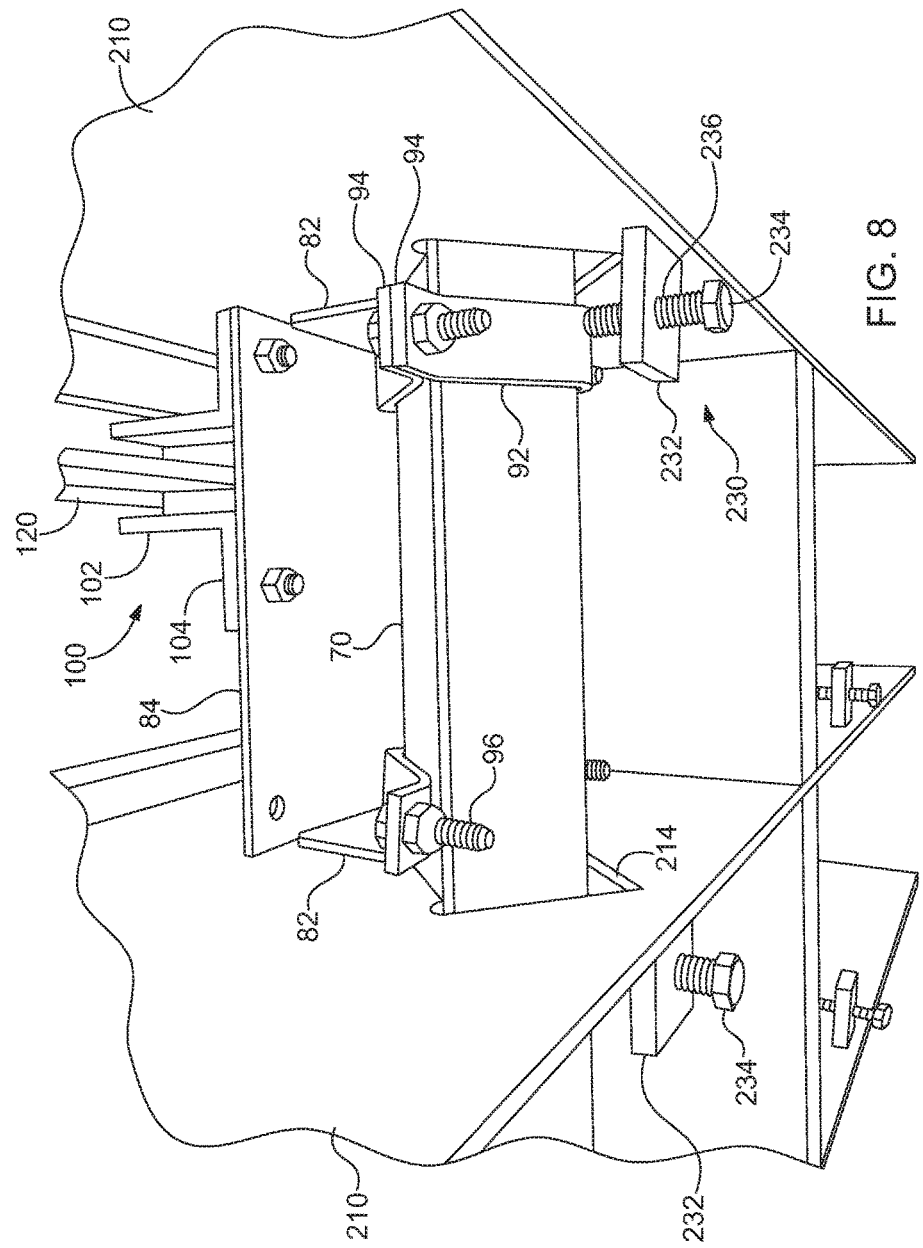
FIG. 8 illustrates a partial 3-D bottom view of the conveyor of FIG. 1.

The conveyor 10 comprises a frame 20 that extends between the inlet end 12 and the outlet end 14 of the conveyor 10. The exemplary frame 20 is illustrated as having a rectangular shape and comprises four end members 22 that are positioned vertically during use of the conveyor 10. A bottom end 24 of one or more of the end members 22 can be adapted with an adjustable member or a foot 26. Such adjustable member or foot 26 can be threadably coupled to the bottom end 24 with a threadable connection. The adjustable member or foot 26 can be provided as any one of pad, a wheel or a caster. Each pair of the end members 22 can be coupled therebetween with an end brace 28, positioned traverse to the linear direction 4, particularly when the conveyor 10 is configured as a free-standing conveyor, i.e., a conveyor that is not secured to a surface or an object. In an example, the brace 28 can be welded, at each end thereof, to an exterior surface of the respective end member 22 or can be detachably attached thereto, with fasteners. In an example, each end of the end brace 28 can be adapted with a threaded aperture 30 and the respective end member 22 can be adapted with an aperture 32 that is aligned with the threaded aperture 30 during assembly. The end brace 28 can be provided as a tubular member. When the end brace 28 can be provided as the tubular member, each end of the end brace 28 can be closed with a plate member 34 carrying such threaded aperture 30, as is best shown in FIGS. 4-5. In an example, the threaded aperture 30 can be replaced with a plain aperture and a nut fastener welded to or caged on a surface of the plate member 34. Furthermore, when the end brace 28 is provided as the tubular member with a square or rectangular periphery, it can be assembled in absence of horizontally disposed surfaces. This aspect is at least advantageous in sanitary applications to at least minimize collection of debris or waste product falling from carried load(s) 2 during transport or processing. It is also contemplated herewithin that more than one brace 28 can be provided on one or both ends of the conveyor 10.

Figure 2:
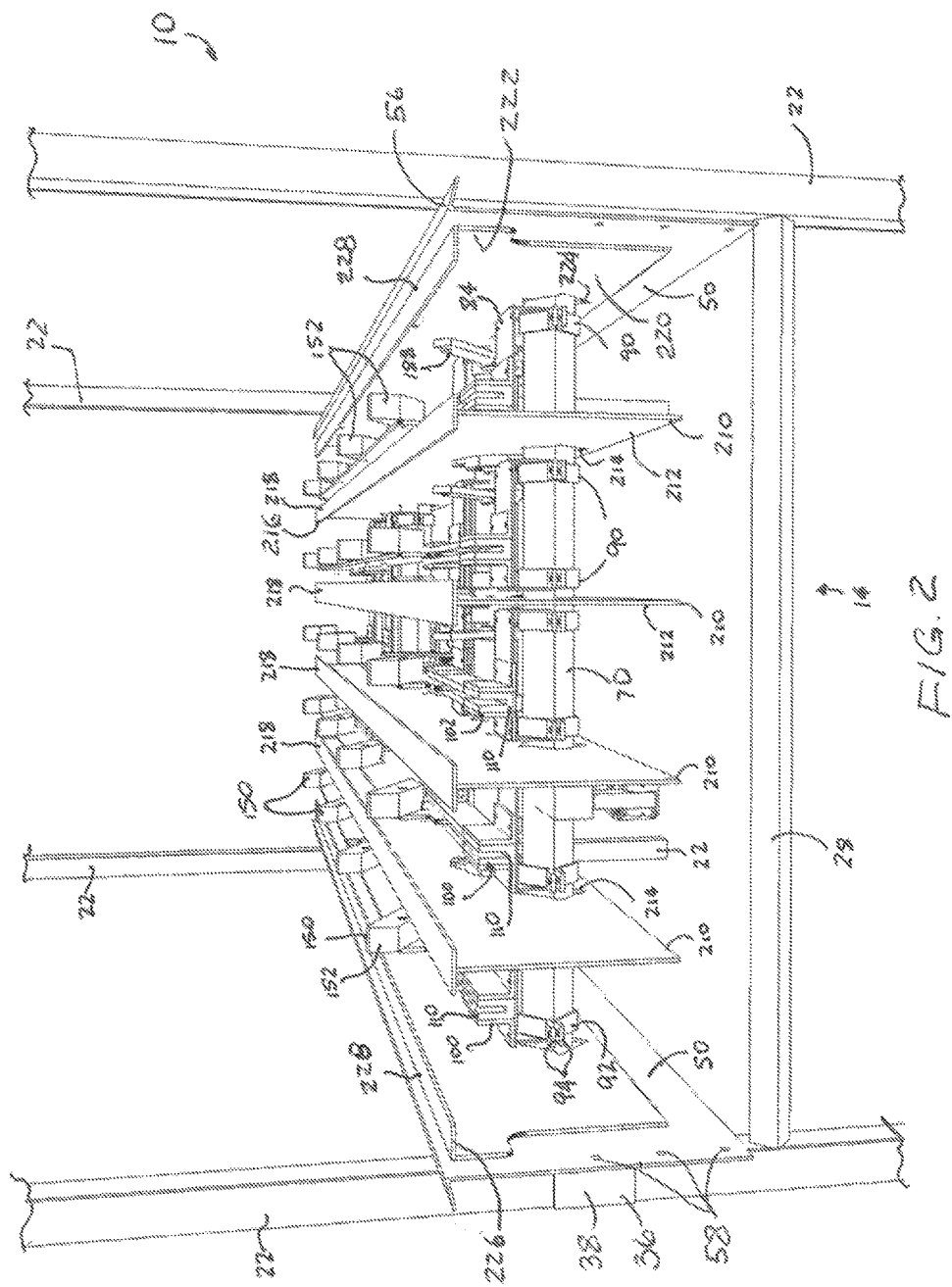
FIG. 2 illustrates a perspective end view of the conveyor of FIG. 1.
Figure 3:
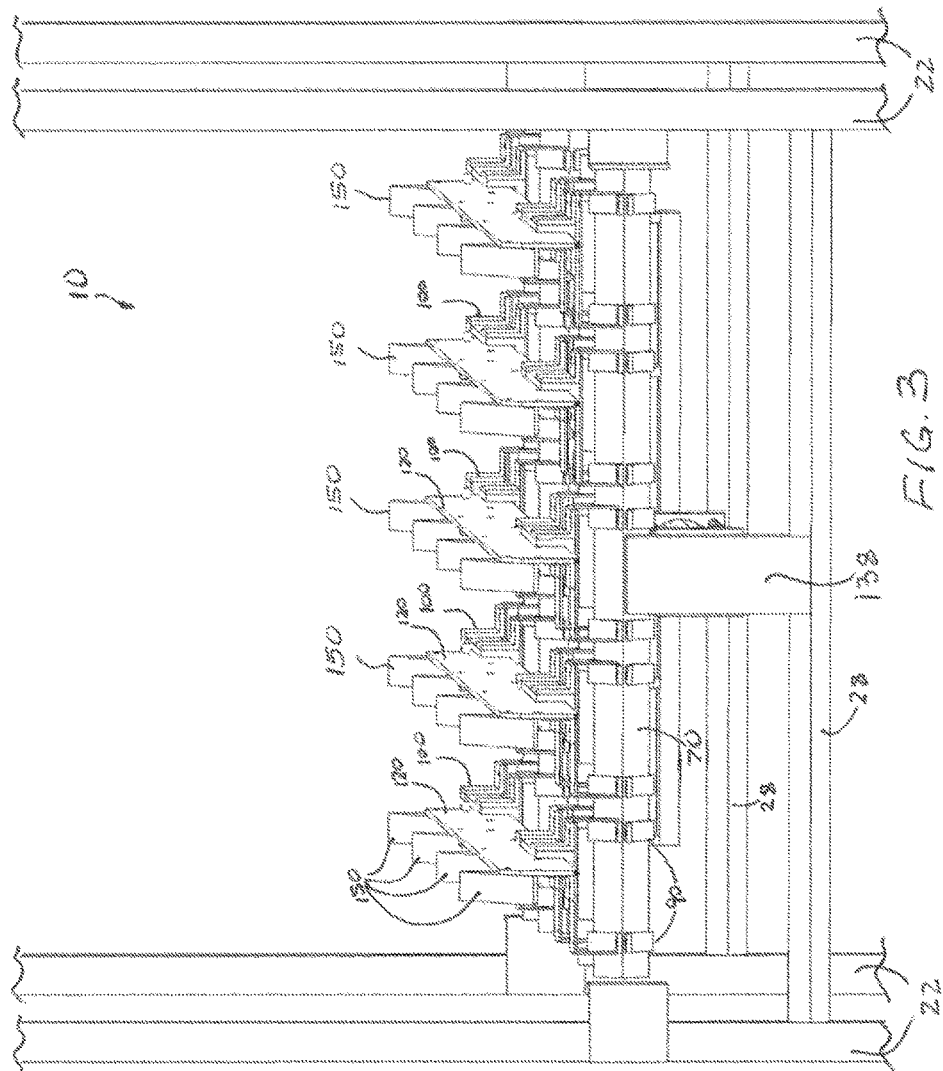
FIG. 3 illustrates a 3-D end view of the conveyor of FIG. 1.

The exemplary frame 20 can also comprise two longitudinal side members 50 that are best shown in FIGS. 1 and 2. Each side member 50 spans the distance between two end members 22 positioned on one side of the conveyor 10, where the side is oriented along the conveyance path 4. In other words, one end member 22 is positioned on one side of the inlet end 12 and the other end member 22 is positioned on the same side of the outlet end 14. The side member 50 can be welded, at each end thereof to a respective end member 22. The side member 50 can be detachably attached at each end thereof to a respective end member 22. In an example, each end of the side members 50 can be fastened directly to the end member 22, in any of the conventional fastening arrangements. In an example, each end member 22 can be provided with an L-shaped bracket 36 having one leg 38 thereof being welded to the surface of the end member 22 and another leg 40 thereof being configured for detachable attachment to the end of the side member 50. In an example, the side member 50 can be provided as a tubular member. In an example, the side member 50 comprises a first wall 52 and a second wall 54 that is disposed normal to the first wall 52. The second wall 54 is illustrated as being faced outwardly but can also face inwardly during use of the conveyor 10. Such shape of the side member 50 can be achieved by bending side member 50 from a sheet of plate material or providing the resulting L-shape cross-section by an extrusion process. For the reasons to be explained later, each end of the first wall 52 can extend outwardly past the peripheral boundary of the frame 20 and comprises aperture(s) 58 disposed adjacent and spaced from such each end. It is not necessary for the end members 22 to extend, in a vertical direction, past the second wall 54.

It is also contemplated herewithin that the side members 50 can be indirectly or directly attached to other members or structures. In an example, the side members 50 can be attached to vertical walls of a pit-like structure. In an example, the side members 50 can be attached to upright members. In an example, the side members 50 can be disposed on support members, such as shortened end members 22. In an example, the side members 50 can be configured to for attachment to a generally horizontal surface, for example such as a floor surface.

Thus, the frame 20 or just the side members 50 can be also defined herewithin as means for supporting remaining components of the conveyor 10.

The conveyor 10 comprises braces 70 that are coupled stationary, at each end thereof, to the frame 20 and, more particularly to the first wall 52 of each side member 50.

Braces 70 are further disposed in series and in a spaced apart relationship with each other between the inlet end 12 and the outlet end 14 of the conveyor 10, with each brace 70 being disposed transverse to the pair of sides 50. Braces 70 can be either welded, at each end thereof, to a respective first wall 52 or being detachably attached, at each end thereof, to the respective first wall 52. One or more of the braces 70 can be provided as a tubular member. When one or more of the braces 70 being provided as the tubular member, it can be detachably attached to the first walls 52 in a manner described above in detachably attaching tubular end braces 28. Furthermore, when the brace 70 is provided as the tubular member with a square or rectangular periphery, it can be assembled in absence of horizontally disposed surfaces. In other words, each surface of such tubular member is inclined, at angles other than 90° to a horizontal or vertical plane. The brace 70 can also have a round periphery. It is not necessary for all braces 70 to have the same peripheral shape. The braces 70 can be spaced at equal or unequal distances from each other along the pathway 4. In other words, it is not necessary that braces 70 are disposed at equal distances from each other. Braces 70 can be provided as a component of the frame 20.

The conveyor 10 comprises support brackets 80 disposed stationary during use of the conveyor 10, with each support bracket 80 being permanently or detachably coupled to a respective brace 70. The bracket 80 can be configured as a U-shaped bracket. Each U-shaped bracket 80 comprises a pair of flanges 82 coupled to the respective brace 70 and further comprises a main portion 84 with at least one surface disposed substantially horizontally during use of the conveyor 10 and above the respective brace 70. It is not necessary that the main portion 84 is solid. The main portion 84 can contain material voids that do not impact operation of the conveyor 10. Each flange 82 can be permanently coupled to the respective brace 70, for example by a welding process. Each flange 82 can be detachably coupled to the respective brace 70, for example by using clamps 90, as is best shown in FIGS. 4-9. When clamps 90 are provided, they can be configured as a pair of hat-shaped clamp members having a main portion 92 and a pair of flanges 94, each with an aperture 96 formed through a thickness of the flange 94. One of the pair of hat-shaped clamp members 90 can be rigidly coupled, for example such as by welding, to each flange 82 of the support bracket 80. Thus, in an example, two (or a pair of) clamps 90 are provided for each support bracket 80 with the clamps 90 essentially caging the exterior surface(s) of the brace 70 and being coupled to each other with fasteners 96.

It is also contemplated herewithin that a size of one support bracket 80 can be adjusted to span the distance between a pair of braces 70 so that one support bracket can be supported by two braces 70. Alternatively, it is also contemplated herewithin that two or more brackets 80 can be supported on a single brace 70 by using intermediate member(s) (not shown).

The conveyor 10 comprises an indexing device. The indexing device comprises receptacles 100, carrying members 120, coupling member 140 and force exerting members 150 with stops 170. Each receptacle 100 is coupled stationary to a respective support bracket 80. Thus, in an embodiment of the conveyor 10, the receptacles 100 are disposed in series with each other between the inlet end 12 and the outlet end 14 of the conveyor 10 and further in series with each other across the width of the conveyor 10. In an embodiment, each receptacle 100 defines a pair of walls 102 disposed vertically and upstanding on the main portion 84 of a respective bracket 80. In an example, the walls 102 can be welded to the main portion 84. In an example, vertically disposed walls 102 can be detachably coupled to the main portion 84 by way of the flanges 104 with aperture(s) 106 formed through a thickness of each flange 104 that are aligned at assembly with complimentary aperture(s) (not shown) in the main portion 84. It would be understood that each wall 102 in a combination with the flange 104 can be provided as an L-shaped member, being either formed, molded, casted or extruded. The receptacle 100 can be also provided as a U-shaped member, defining the pair of walls 102. The receptacle 100 can comprise a metal, a plastic or a combination thereof. The receptacle 100 can comprise a material with a low friction coefficient, for example such as a self-lubricating bronze alloy. The receptacle 100 can be integrated with the support bracket 80 as a unitary one-piece construction. Such unitary one-piece construction can be provided by a welding process, by a molding process or by a casting process. The unitary one-piece construction may comprise different materials. In an example, the portion of the support bracket 80 can comprise metal while the portion of the receptacle 100 can comprise plastic or polymer material.

The indexing device can comprise optional liners 110. Each liner 100, when provided, comprises a material with a low friction coefficient. In example, such material can be an engineered plastic. The engineered plastic can be a thermoplastic polyethylene and, more specifically, an ultra-high-molecular-weight (UHMW) polyethylene. In an example, the engineered plastic can be an equivalent to the thermoplastic polyethylene. In an example, such material can comprise self-lubricating bronze alloy. When the receptacle 100 defines a pair of vertically disposed walls 102, the optional liners 110 can be coupled to the inner surfaces of the vertically disposed walls 102 or can be provide as a U-shaped member being caged between the vertically disposed walls 102 and resting on the main portion 84. The liner 110, when provided, can be fastened to a respective receptacle 100, can be secured thereto with adhesives or can be provided integral with the receptacle 100, for example during a molding process. The liner 110 can be also provided as a coating of a low-friction material on an inner surface of the wall 102.

The optional liner 110 can be sized to span a length of the receptacle 100 or even be sized to span a distance between furthest ends of a pair of adjacent receptacles 100.

The receptacle 100 or the optional liner 110 defines an inner space 118.

Each carrying member 120 is positioned for a reciprocal linear movement within the inner space 118. Each carrying member 120 is illustrated as a thin bar or a rail with a pair of flat surfaces, but can be provided in other shapes, for example such as a tubular shape. The carrying member 120 does not have to be solid throughout and can comprise material voids to reduce weight of the conveyor 10. The carrying member 120 may comprise metal, plastic and a combination thereof. When the carrying member 120 comprises metal, the liner 110 is configured to wear first during linear movement of the carrying member 120 within the receptacle 100. When the carrying member 120 comprises metal and receptacle 100 comprises plastic material at least on the inner surface of the wall 102, the liner 110 may not be needed. Likewise, when the carrying member 120 comprises, either partially or completely, plastic material and the receptacle 100 comprises metal, the liner 110 may not be needed. A length of the carrying member 120 can be selected so that the carrying member 120 does not extend past the inlet end 12 and/or the outlet end 14 during operation of the conveyor 10. A length of the carrying member 120 can be selected so that the carrying member 120 extends past the inlet end 12 and/or the outlet end 14 during operation of the conveyor 10. The carrying member 120 can extend to past the inlet end 12 and/or the outlet end 14 during operation of the conveyor 10 to position a row of force exerting members 150 very close to one or both ends of the load supporting members 210, 220 described in details below.

The indexing device can also comprise a powered member 130. Such powered member 130 can be provided as a component of the conveyor 10 and thus be an optional component of the indexing device. In either configuration, the powered member 130 is configured to provide a reciprocal linear movement of the carrying members 120. In an example, the powered member 130 can be a linear actuator. The linear actuator can be provided as an electrically, pneumatically or hydraulically operated device. The linear actuator can comprise a rotating drive screw and a drive nut that translates linearly on the drive screw during a rotation thereof. The rotation can be achieved by using a conventional electric motor. The powered member 130 can be a cylinder, either pneumatic or hydraulic. The cylinder 130 has a stationary portion 132 rigidly coupled at on end thereof to the frame 20. In an example, the stationary portion can be rigidly coupled to a mounting member 138 that is rigidly coupled to one of the ends of the frame 20, shown as the inlet end 12 of the conveyor 10. The cylinder 130 also has a movable portion 134 that moves in a linear direction. The distal end of the movable portion 134 can be configured as a U-shaped member 136.

In the embodiment of the conveyor 10, each carrying member 120 is coupled to the powered member 130 with coupling members 140 and a link 252. Each coupling member 140 comprises one end 142 thereof coupled, for example with fasteners or by welding, to a respective carrying members 120 and comprises a second end 144 is attached or coupled, either permanently or detachably, to a link 252. When the coupling member 140 is permanently coupled, the second end 144 can be welded to the link 252. When the coupling member 140 is detachably coupled, it can be coupled, with fasteners, to a flange 256 on the link 252. The flanges 256 are disposed, in a spaced apart relationship with each other, on the link 252. The second end 144 can be also adapted with a flange for a detachable coupling to a surface of the link 252, for example with fasteners. The coupling members 140 and the link 252 can define or comprise a linkage 250. The link 252 is disposed transverse to the load supporting members 210 (described further in this document) and has a pivotal connection 254 with an opposite end 134 of the powered member 130.

It will be understood that the linkage 250 is configured to move multiple carrying members 120 with a single powered member 130. In other words, the linkage 250 is configured to advance multiple rows of loads 2 with a single powered member 130.

It is also contemplated that each carrying member 120 can be adapted with a dedicated powered member 130. In this embodiment, the link 252 is not needed and the second end 144 of the coupling member 140 is configured for a pivotal attachment to the powered member 130.

The force exerting members 150 in the embodiment of the conveyor 10 of FIGS. 1-9 are disposed in series with each other between the inlet end 12 and the outlet end 14 of the conveyor 10. The spacing between a pair of adjacent force exerting members 150 is dependent on the size of the load 2 so that a single force exerting member 150 is provided for a single load 2. Each force exerting member 150 comprises a front end 152 and a rear end 154. The front end 152 is configured to abut the load 2. In an example, the rear end 154 is being configured heavier than the front end 152. In an example, the front end 152 can be lightened with apertures or material voids (not shown). In an example, the front end 152 can be configured smaller than the rear end 154. In an example, the rear end 154 can be adapted with additional weight.

There is a pivotal connection 160 between each force exerting member 150 and the carrying member 120. In an example, each of the carrying member 120 and the force exerting member 150 can be provided with through apertures 162 with the pivotal connection being achieved by way of a pin 164 passed through each aperture 162 and terminated at each end to prevent unintended disengagement from such aperture 162. In an example, the pin 164 can be provided as an integral part of one of the carrying member 120 or the force exerting member 150, with the other one of the carrying member 120 or the force exerting member 150 comprising an aperture.

Each force exerting member 150 is pivotable between a load engaging position and a non-load engaging position on the carrying member 120 and movable with the carrying member 120 in the reciprocal linear movement, enabled by the powered member 130.

Thus, the force exerting member 150 can be also referred to and/or configured as a gravity rocking advancement pusher or a gravity rocking dog.

Each stop 170 is rigidly coupled to the carrying member 120 and is positioned to maintain the front end 152 of a respective force exerting member 150 in the load engaging position. The stop 170 can be welded and/or fastened to the carrying member 120.

The conveyor 10 comprises load supporting members such as inner load supporting member(s) 210 and two outer load supporting members 220, extending between the inlet end 12 and the outlet end 14 of the conveyor 10. Each inner load supporting member 210 is positioned in a spaced apart relationship with the outer load supporting members 220 and with each other when more than one inner load supporting member 210 is provided. Each inner load supporting member 210 comprises a first wall 212 with apertures 214 formed through a thickness thereof and a second wall 216 with a load supporting surface 218 which is sized to receive portions of loads 2 in adjacent rows. The first wall 212 is being disposed generally vertically during operation of the conveyor 10. The load supporting surface 218 is being disposed substantially horizontally during operation of the conveyor 10. The load supporting surface 218 can comprise a smooth flat surface. The inner load supporting member 210 is shown as comprising a T-shaped cross-section in a plane transverse to a length thereof but can be also provided with an L-shaped cross-section. The second wall 218 can be replaced with a cylindrical rod-like or (hollow) member that will eventually define a linear contact between the outer surface thereof and the load 2 supported thereon. In other words, the load supporting surface 218 does not have to comprise a smooth flat surface. Each outer load supporting member 220 is positioned adjacent a respective side member 50, when provided or at each side of the conveyor 10. Each outer load supporting member 220 comprises a first wall 222, disposed generally vertically during operation of the conveyor 10 and a second wall 226 disposed generally horizontally during operation of the conveyor 10. The first wall 222 comprises apertures 224 formed through a thickness thereof, in a spaced-apart relationship with each other along a length of the first wall 222. The second wall 226 defines a load supporting surface 228. The load supporting surface 228 is being disposed substantially horizontally during operation of the conveyor 10. The load supporting surface 228 can comprise a smooth surface. The outer load supporting member 220 is shown as comprising an L-shaped cross-section in a plane transverse to a length thereof but can be also provided with a T-shaped cross-section, similar to the inner load supporting member 210. The second wall 228 can be replaced with a cylindrical rod-like or (hollow) tubular member that will eventually define a linear contact between the outer surface thereof and the load 2 supported thereon. In other words, the load supporting surface 228 does not have to comprise a smooth flat surface.

It is also contemplated herewithin that outer load supporting members 220 can be provided by or integrated with the side members 50 of the frame 20. In other words the side member 50 can be at least configured to comprise the load supporting surface 228.

During assembly, each brace 70 is passed through respectively aligned apertures 214 and 224.

In an embodiment, each brace 70 can be rigidly coupled to each first wall 212 of the inner load supporting member 210 and first wall 222 of the outer carrying member 220. Such rigid coupling can be achieved by welding when the conveyor 10 is essentially fabricated from metallic material, for example such as steel or aluminum.

In an embodiment, each brace 70 can be detachably coupled to each first wall 212 of the inner load supporting member 210 and first wall 222 of the outer carrying member 220. In this embodiment, each brace 70 is configured to pass freely through the apertures 214 and 224. When the brace 70 is configured to pass freely through the apertures 214 and 224, the conveyor 10 further comprises biasing members 230, best shown in FIG. 8. Each biasing member 230 comprises a first portion 232 stationary attached to a surface of the first wall 212 of each inner load supporting member 210 and to a surface of the first wall 222 of each outer load supporting member 220, in an alignment with a respective clamp 90 and comprising a second portion 234 movable in a relationship to the first portion 232 and having one end thereof positioned in an abutting relationship with the respective clamp 90 so as to bias each brace 70 with upper edge(s) of each aperture 214, 224 during use of the conveyor 10. By way of one example only, the first portion 232 can be adapted with a threaded aperture 236 with the second portion 234 being configured as a threaded bolt or a threaded rod. It would be understood that the position of the biasing members 230 can be reversed to bias the brace 70 downwardly.

In an embodiment, the brace 70 and apertures 214, 224 can be eliminated by welding or fastening the support brackets 80 directly to the first wall 212 or 222 and fastening the first walls 222 to the respective side member 50, when provided.

Inner load supporting members 210 and outer load supporting members 220 can be also configured for supporting the remaining elements of the conveyor 10 in absence of the fame 20. In an example, the first walls 212 and 222 can be simply rested on a surface or structure. In an example, the first walls 212 and 222 can be fastened to a surface or structure by providing an optional bottom flanges (not shown).

Figure 9:
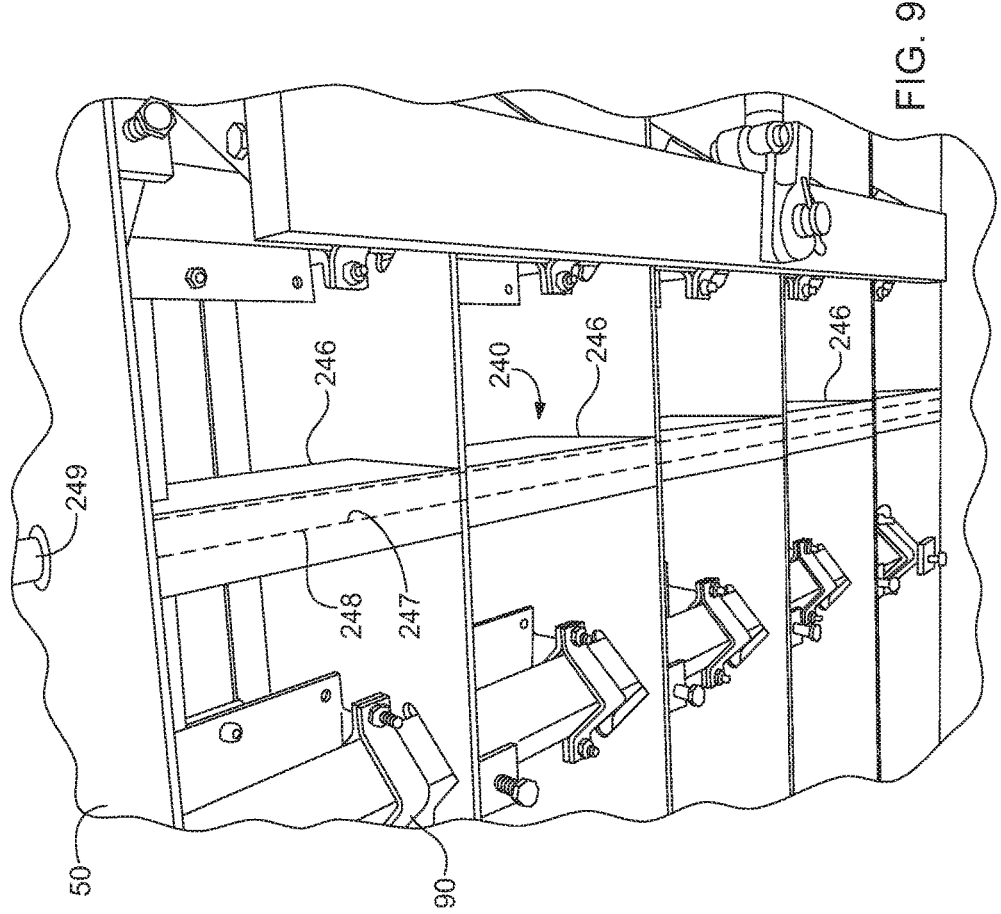
FIG. 9 illustrates another partial 3-D bottom view of the conveyor of FIG. 1.
Figure 10:
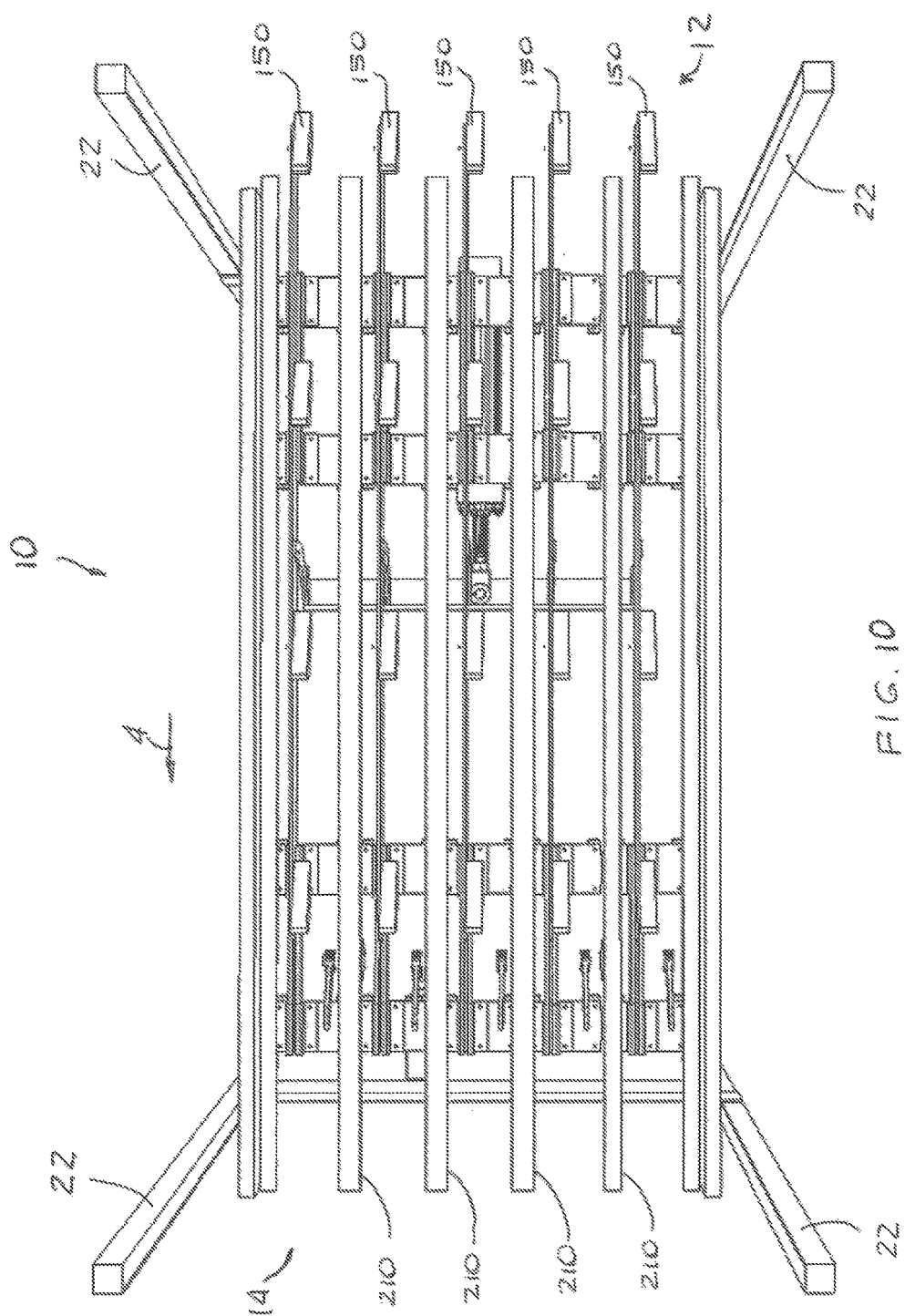
FIG. 10 illustrates a perspective top view of an exemplary conveyor configured to advance multiple rows of loads, particularly showing a kick-back device.
Figure 11:
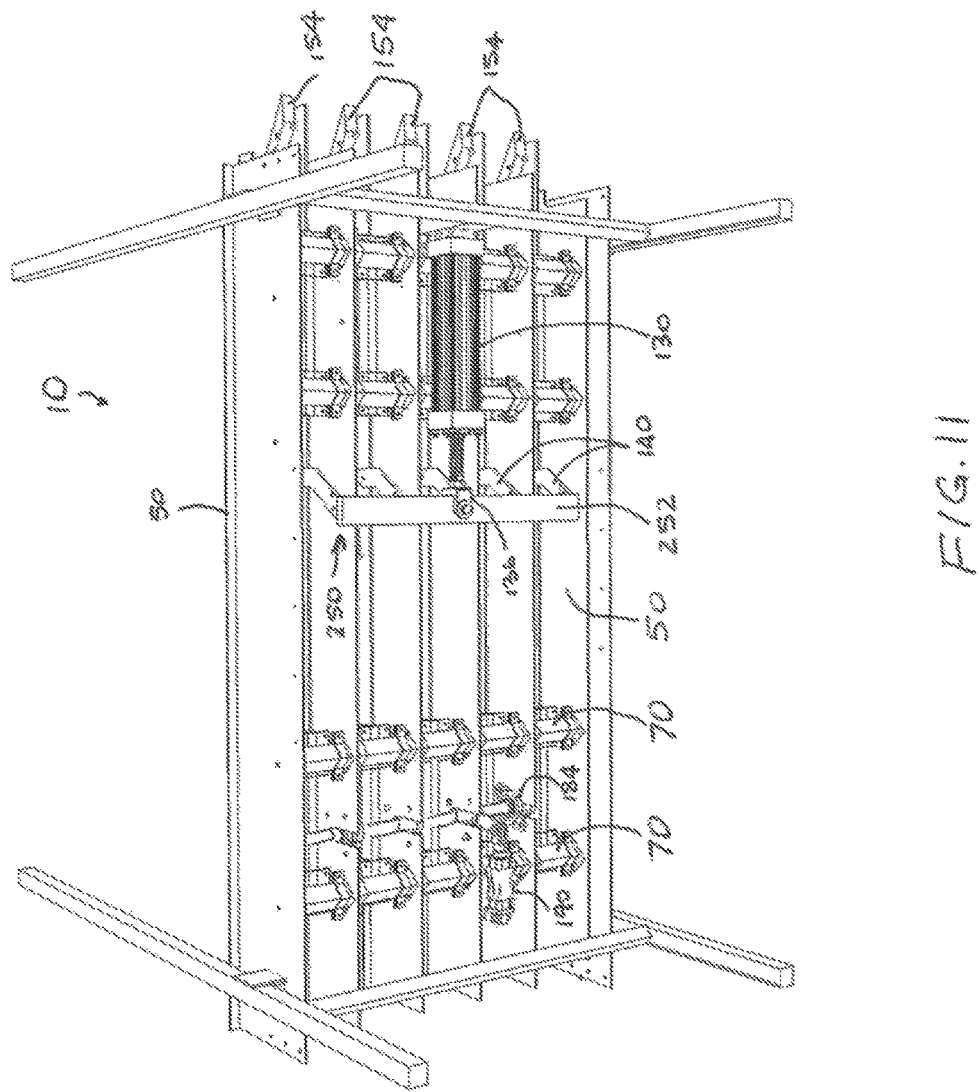
FIG. 11 illustrates a perspective bottom view of the conveyor of FIG. 10.
Figure 12:
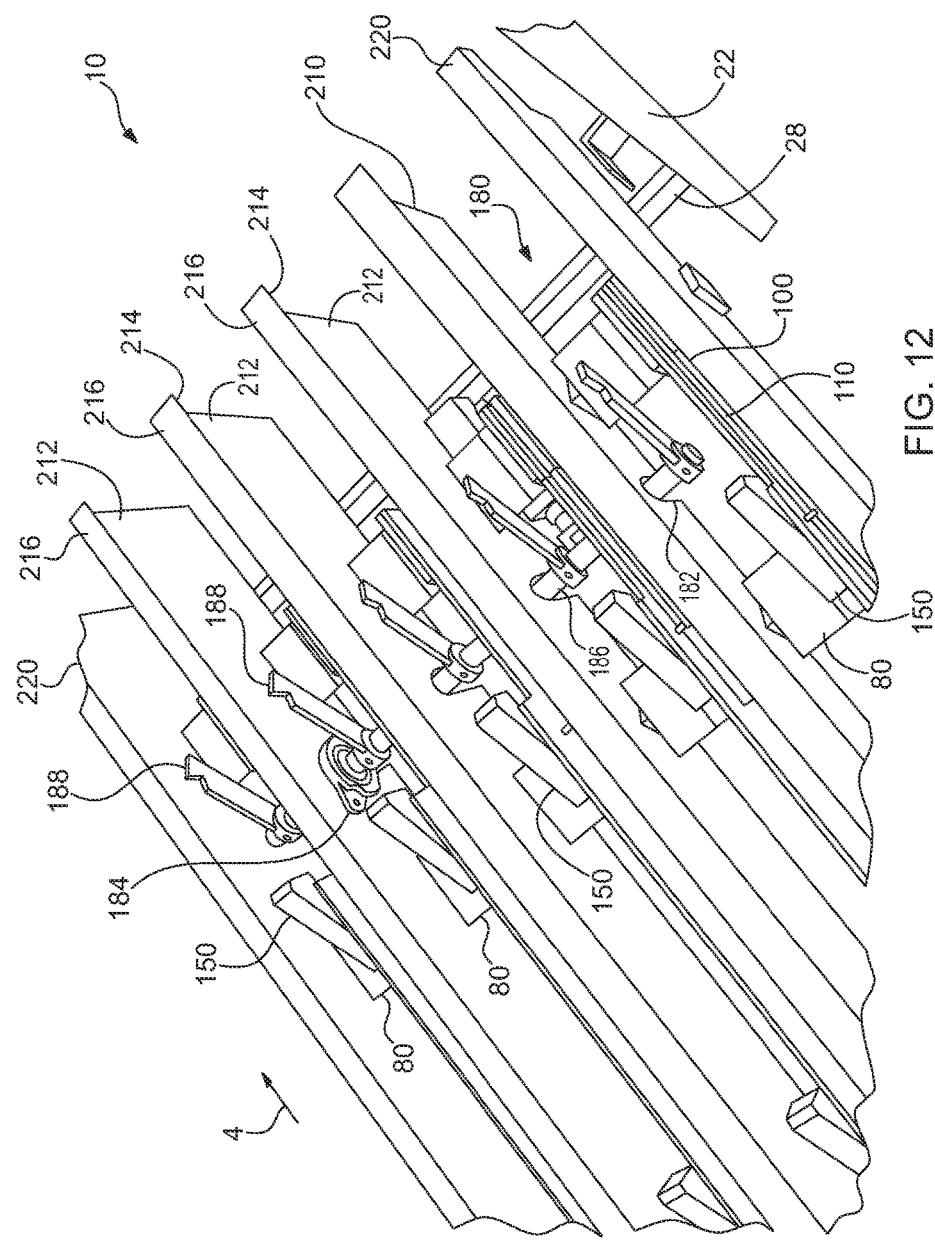
FIG. 12 illustrates a partial 3-D top view of the conveyor of FIG. 10.
Figure 13:
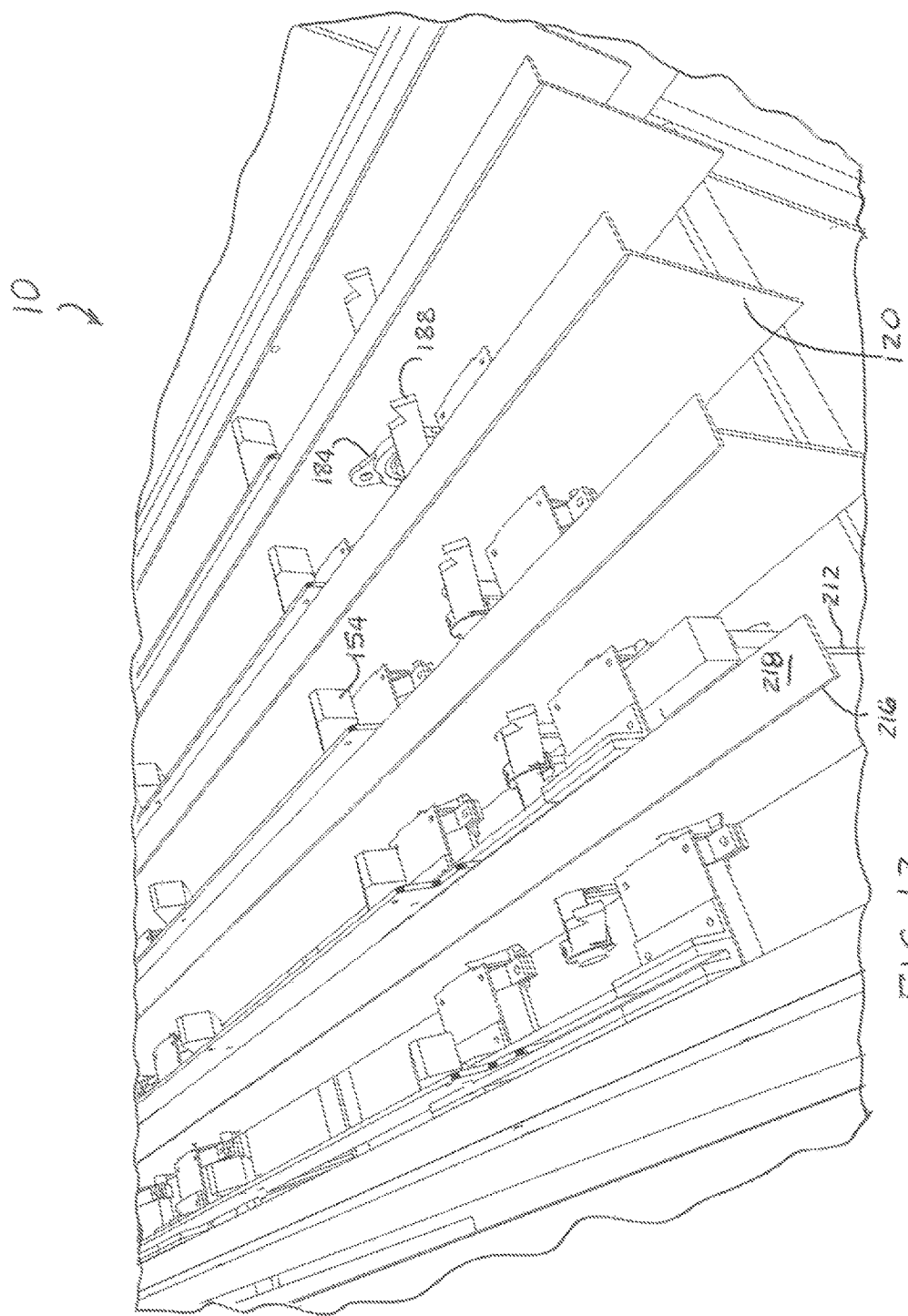
FIG. 13 illustrates a partial 3-D top view of the conveyor of FIG. 10.
Figure 14:
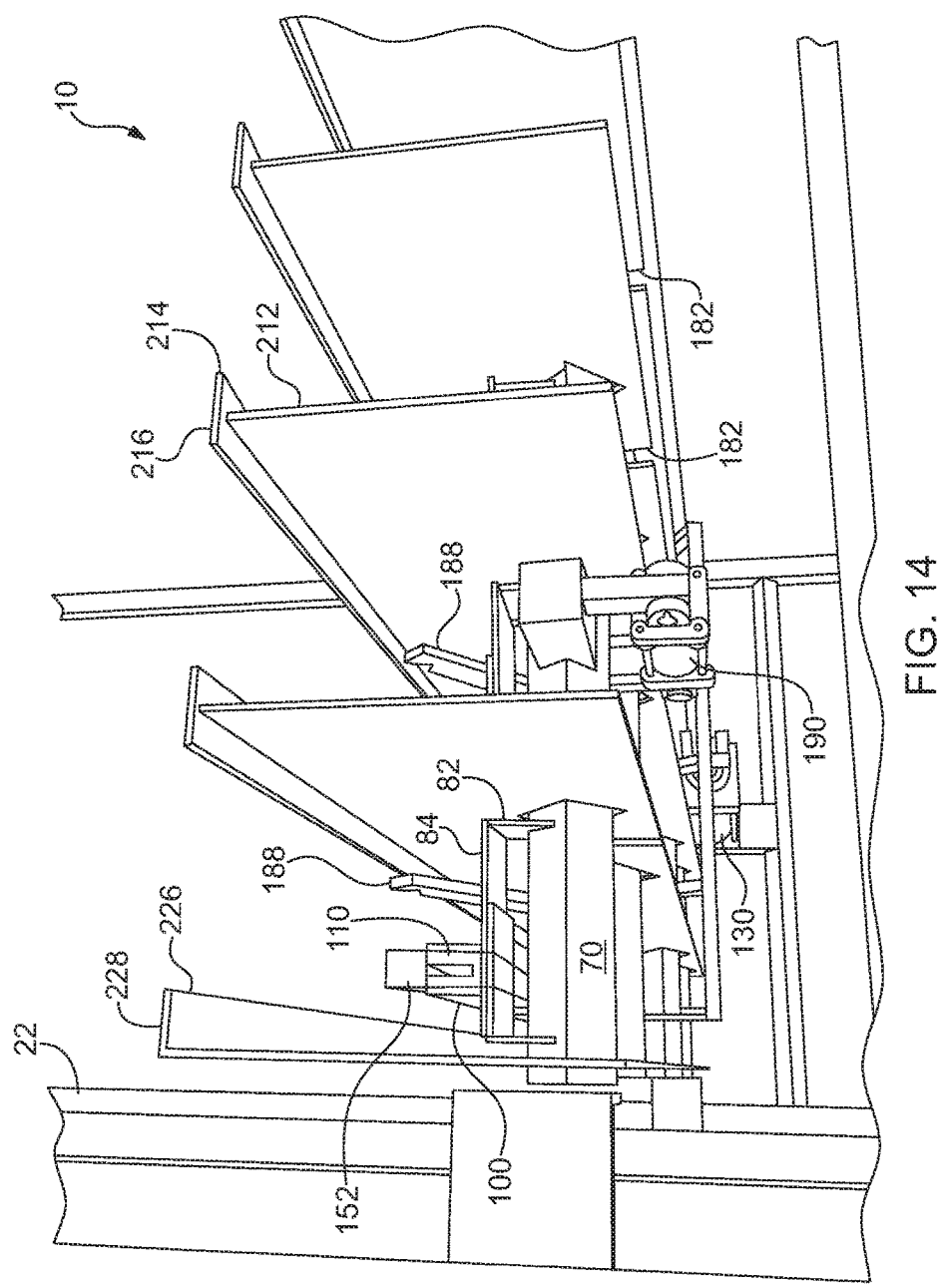
FIG. 14 illustrates a partial 3-D end view of the conveyor of FIG. 10.
Figure 15:
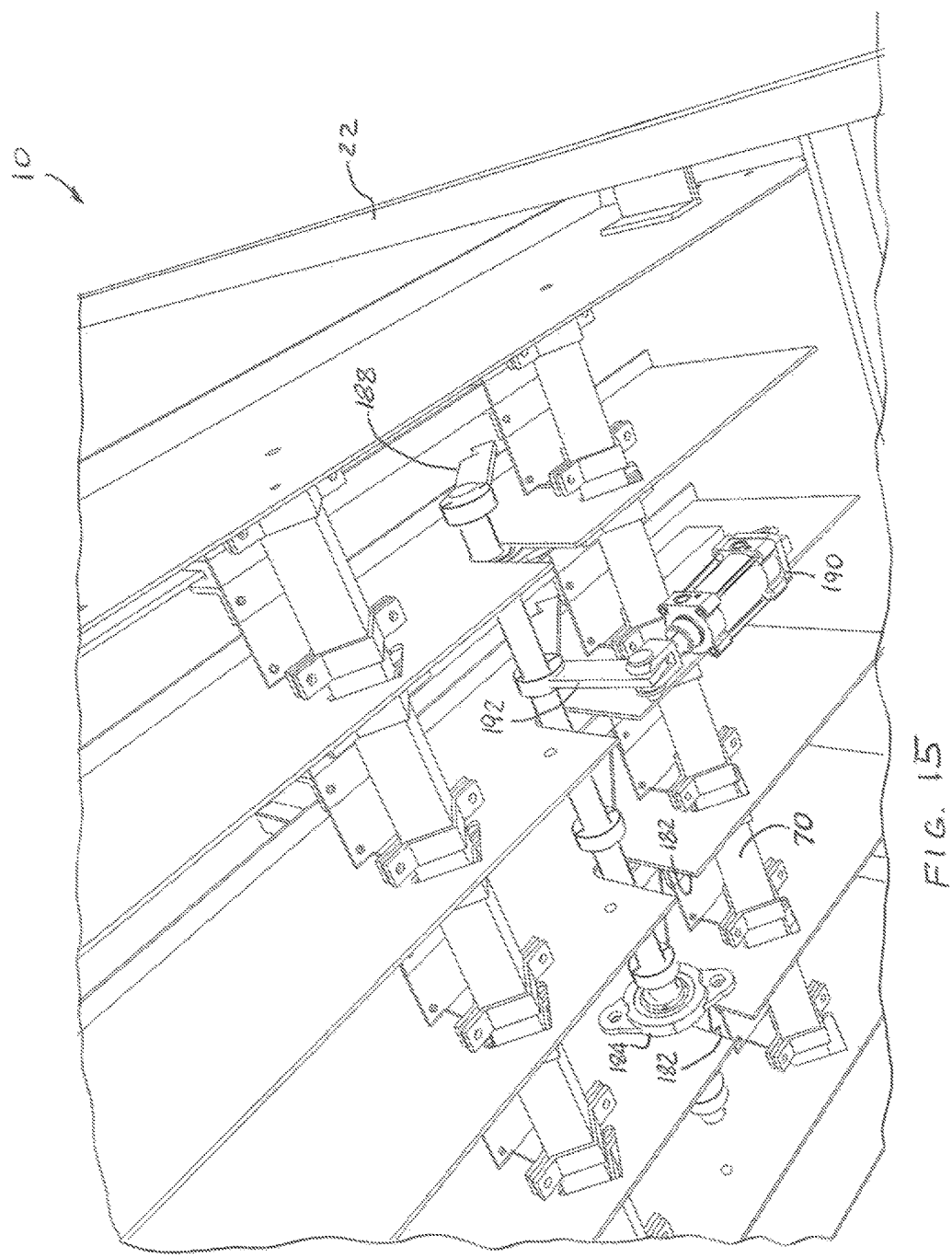
FIG. 15 illustrates one partial 3-D bottom view of the conveyor of FIG. 10.

Conveyor 10 can comprise one or more optional braces 240 to improve rigidity of the conveyor 10 provided as a kit of components to be assembled together at a location of use. Each optional brace 240, best shown in FIG. 9 is coupled, stationary and detachably, at each end thereof, to each side member 50 of the frame 20. Each optional brace 240 is stationary disposed mediate the inlet end 12 and the outlet end 14 in a direction transverse to a direction therebetween. Each optional brace 240 comprises brace apertures in the first wall 212 of each inner load supporting member 210, brace apertures in the first walls 222 of each outer load supporting member 220, brace apertures in the side members 50 of the frame 20, all respective apertures are being aligned with each other during assembly, spacers 246 disposed between surfaces of the first walls 212 of adjacent inner load supporting members 210 and outer load supporting members 220 and having each end in an abutting relationship therewith, brace apertures 247, through the spacers 246, being oriented in the direction transverse to the direction between the inlet and outlet ends and in an alignment with the brace apertures in first walls 212 and 222, and an elongated 248 member passed through the aligned brace apertures and having each end thereof secured to a respective side member 50 of the frame. In an example, each end of the rod 248 can be threaded to receive threaded nut fastener 249. When the optional braces 240 are provided the brace 70 can be referred to as a first brace and the brace 240 can be referred to as a second brace.

In operation, the front end 152 has at least a portion thereof extending outwardly or upwardly, in the load engaging position, from or above load supporting surfaces 218 and 228 and in an abutting relationship with a portion of the load 2 during operation of the conveyor 10. Such portion can be a rear surface of the load 2 or a void in a bottom surface thereof. The abutting relationship of the front end 152 of each force exerting member 150 causes an incremental advancement of the loads 2 between the inlet end 12 and the outlet end 14 during the linear movement of the carrying members 120 in a first or load moving direction. The incremental movement is defined by the stroke of the powered member 130 that is, in turned, is selected based on a travel distance of the load 2. The front end 152 and the rear end 154 are also being at least partially disposed, in the non-load engaging position, below the load supporting surfaces 218 and 228 during the linear movement of the carrying member 120 in an opposite second or a non-load moving direction. The linear movement of the force exerting members 150 in the first direction advances the load 2 from the inlet end 12 to the outlet end 14. When the powered member 130 is controlled to move the carrying member 120 and the force exerting members 150 in a reversed direction toward the inlet end 12, the force exerting members 150 rotate into the non-load engaging position and move under the load 2 which is behind the load 2 that was previously advanced by the retracting force exerting members 150. While retracting, the force exerting members 150 are being maintained in the non-load engaging position by any continuous bottom surface of the load 2. Once, the retracting force exerting members 150 passed the load 2 or the bottom surface of the load 2 has a void, the force exerting members 150 pivot into the load engaging position due to gravity without aid of any powered member. When the force exerting members 150 return into the load engaging position due to gravity, these force exerting members 150 are in a position to advance the next load 2 when the powered member 130 is controlled to move the carrying members 120 toward the outlet end 14 of the conveyor 10.

The number of force exerting members 150 depends on a distance between inlet end 12 and the outlet end 14, the size of the load 2 in the transport direction along the conveyance path 4 and the number of loads 2 to be positioned in series between the inlet end 12 and the outlet end 14. Although four force exerting members 150 are illustrated in FIGS. 1-7 as being attached to a single carrying member 120, more or less can be used in a specific application. It is contemplated that a single force exerting member 150 can be used, for example on short conveyors 10, a long stroke powered device 130 or a combination thereof. Furthermore, although force exerting members 150 are disposed at one surface of the carrying member 120, the conveyor 10 may use a pair of force exerting members 150 for each load 2. The second force exerting member 150 can be simply mounted at the opposite surface of the carrying member 120, even on a common pivoting member. The force exerting members 150 in each pair can be pivoting in unison with each other (rigid connection of each force exerting member 150 to the pivoting member) or independently from each other.

The number of the braces 70, support brackets 80 and receptacles 110 at least depends on a distance between the inlet end 12 and the outlet end 14 and the size of the load 2 in the transport direction. Although four braces 70 are provided in the exemplary embodiment of the conveyor 10 in FIGS. 1-7, more or less can be used in a specific application, including one of each of the brace 70, support bracket 80 and receptacle 100.

Each carrying member 120 in a combination with at least the force exerting members 150 is configured to function as a carriage.

All carrying members 120 in a combination with at least the force exerting members 150 are configured to function as a carriage.

In an embodiment, an exemplary method of advancing the load 2 from the inlet end 12 to the outlet end 14 comprises supporting each load 2 on load supporting surfaces 118, 228, engaging each load 2 with a force exerting member 150, moving, with the powered member 130, each force exerting member 150 and its respective load 2 in a (first) direction toward the outlet end 14, moving, with the powered member 130, each force exerting member 150 without the load 2 in an opposite (second) direction toward the inlet end 12 so as to position each force exerting member 150 to engage the next load 2 to be moved toward the outlet end 14. The step of moving each force exerting member 150 and its respective load 2 in a direction toward the outlet end 14 comprises controlling or actuating the powered member 130 to move in the first direction. The step of moving each force exerting member 150 in a direction toward the inlet end 12 comprises controlling or actuating the powered member 130 to move in the second direction. The step of moving each force exerting member 150 comprises the step of pivotally attaching one or more force exerting members 150 to a carrying member 120 and mounting the carrying member 120 for a linear movement. The mounting can be achieved by providing receptacles 100 mounted stationary during operation of the conveyor 10, for example on braces 70 and support brackets 80.

In an embodiment, an exemplary method of indexing or incrementally advancing the loads 2, positioned in a series (i.e., one after another) with each other, from the inlet end 12 to the outlet end 14 comprises supporting each load 2 on load supporting surfaces 118, 228, engaging each load 2 with a single force exerting member 150, moving, with the powered member 130, the force exerting members 150 and the loads 2 in a (first) direction toward the outlet end 14, moving, with the powered member 130, the force exerting members 150 without the loads 2 in an opposite (second) direction toward the inlet end 12 so as to not move the loads 2 in such second direction, engaging with each force exerting members 150 the next load 2 and advancing the loads 2 again toward the outlet end 14. It would be understood that at the beginning of operation, only one row of loads load can be positioned at the inlet end 12. Thus, in the beginning of operation of the exemplary conveyor 10 only the force exerting members 150 will index or incrementally advance the loads 2. After the first indexing, there will now be two rows of loads 2 positioned in a series with each other. So, the next indexing step will move two rows of loads 2 and so on until the conveyor 10 is completely loaded with loads 2 and each force exerting member 150 advances a respective load 2 in the first direction from the inlet end 12 to the outlet end 14. It would be understood that it would take 4 strokes of the powered member 130 to load the conveyor 10 illustrated in FIGS. 1-9 and further illustrated in FIGS. 1-18 and 21-24.

It would be understood that the conveyor 10 is configured to advance an array of loads 2 with a plurality of rows of loads 2 with a plurality of loads in each row.

Now in reference to FIGS. 10-15, the conveyor 10 is constructed in accordance with above described embodiment(s) of FIGS. 1-9 and further comprises an optional device 180 configured to move a selected row of loads 2 in a reversed or retracted direction from the outlet end 14 to the inlet end 12 when the load(s) 2 is(are) disposed at the outlet end 14. In an embodiment, the device 180 can comprise edge slots 182 in the first wall 212 of each inner load supporting member 210, bearing block 184 coupled to two or more first walls 212 in an alignment with a respective slot 182, a shaft 186 passed through each bearing block 184, a pawl 188 secured on the shaft 186 for a rotation thereof and another powered drive 190 coupled with a link 192 to the pawl 188 and operable to pivot the shaft 186 and the pawl 188 in the direction from the outlet end 14 to the inlet end 12 so as to move the load 2, disposed at the outlet end 14, a small increment toward the inlet end 12. The device 180 is configured to function as a kickback device.

In an example, the device 180 can be employed in application(s) where the load 2 exiting the outlet end 14 is transferred onto another conveyor (not shown) to be moved in a direction generally normal to the transport or conveyance path 4. In this application, the purpose of the device 180 is to "break" a contact between the load 2 being positioned at the outlet end 14 and the load 2 that was pushed by the force exerting member 150 onto the another conveyor (not shown). The kickback motion allows a separation between the load 2 being positioned at the outlet end 14 and the load 2 that was pushed by the force exerting member 150 onto the another conveyor and subsequently allows an unobstructed movement of the discharged load 2 on the another conveyor (not shown). If the discharged load 2 on the another conveyor (not shown) has contact with a respective load 2 still on the index conveyor 10, the discharged loads 2, through friction of them touching, may turn or stall and not be transported by such another conveyor (not shown).

Thus, in an embodiment, an exemplary method of indexing or incrementally advancement of the loads 2, positioned in a series (i.e., one after another) with each other, in the first direction from the inlet end 12 to the outlet end 14 comprises incrementally moving the load 2 positioned at the outlet end 14 of the conveyor 10 in the opposite second direction with a device 180 which is powered independently from the powered member 130.

Different control arrangements can be employed for electrical control of the conveyor 10 of FIGS. 1-15. In an example of FIG. 16, a transmitter 272 and a receiver 274 can be mounted in an operative alignment with each other across a width of the conveyor 10, at an inlet end 12 thereof, to sense a presence or an absence of the load 2. The transmitter 272 and receiver 274 can be of an optical type or a sound transmission type.

In an example, a transmitter 276 and a receiver 278 can be mounted in an operative alignment with each other at an outlet end 14 of the conveyor 10 to sense a presence or an absence of the load 2.

In an example, a first pair of the transmitter 272 and the receiver 274 can be mounted in an operative alignment with each other across a width of the conveyor 10, at an inlet end 12 thereof, and a second pair of the transmitter 276 and the receiver 278 can be mounted in an operative alignment with each other at across a width of the conveyor 10 an outlet end 14 of the conveyor 12.

The single powered member 130 of a pneumatic or hydraulic cylinder type can be adapted with one or a pair of sensors 280, 282, for example of a proximity type. Sensor 280 can be positioned at a rod end 132 and operable to provide a cylinder extend signal and the sensor 282 can be mounted at the opposite piston end 138 and operable to provide a cylinder retract signal. In an example, the sensors 280, 282 can be mounted to sense an absence or a presence of an internal component, for example such as a piston (not shown).

The sensor 280 and/or 282 can be positioned and operable to sense a position of the load 2 so as to reverse an operating direction of the powered member 130.

The sensor 280 and/or 282 can be positioned and operable to sense a presence or an absence of the loads 2 translating on the load supporting members 210 and 220.

The above described transmitters, receivers and sensors are electrically coupled to a control unit 286. The control unit 286 can be either of a microprocessor type, a programmable logic type or a relay type. The receivers 274, 278 and the sensors 280, 282 are operable to input a signal into the control unit 286. The control unit 286 can be also configured to source power to transmitters 272, 276 when applicable. The control unit 286 can be provided as a component of the conveyor 10. The control unit 286 can be mounted on the conveyor 10, for example on the side member 50 or can be mounted remotely from the conveyor 10. The control unit 286 can be provided as a component of another control member (not shown).

Figure 16:
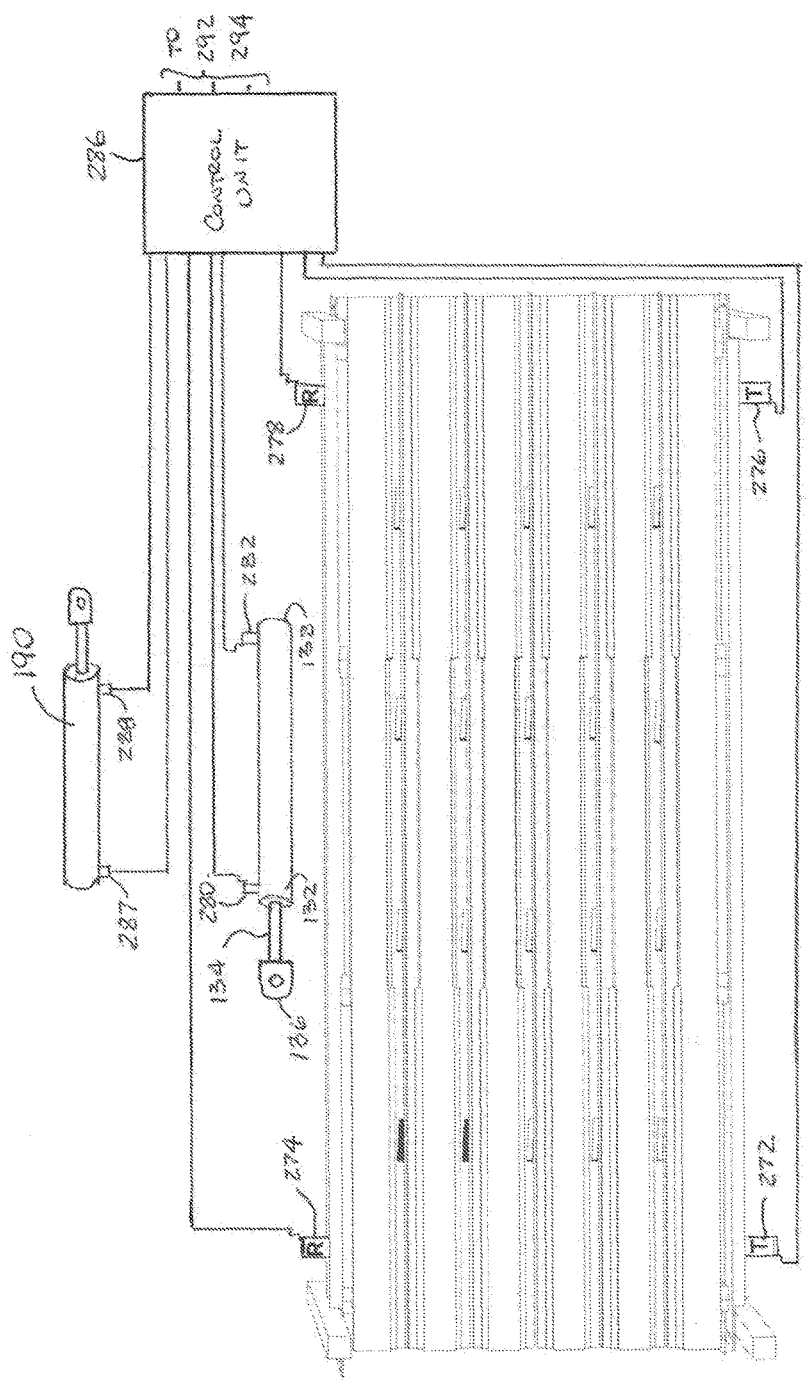
FIG. 16 illustrates an electrical block diagram of the conveyor of FIG. 1 or 8.

FIG. 16 illustrates control of the conveyor 10 with the single powered member 130 of a pneumatic or hydraulic cylinder type. It would be understood that when conveyor 10 is provided with the plurality of the powered member 130, either one or each powered member 130 can be adapted with the above described sensors 280, 282. When each powered member 130 is adapted with the above described sensors 280, 282, each sensor 280, 282 is electrically coupled to the control unit 286.

It is contemplated herewithin that the powered member 130 can be adapted with one of the sensors 280, 282. In an example, only the sensor 280, for example of a proximity type, can be provided to sense the powered member 130 being in a retracted position and transmit a respective signal to the control unit 286. The control unit 286 can be then configured (programmed) to calculate the time to extend and retract (i.e. complete the cycle) the powered member 130 based on the selected stroke, i.e. distance to index or incrementally move the load 2. In an example, only the sensor 280, for example of a proximity type, can be provided to sense the powered member 130 being in the extended position and transmit a respective signal to the control member 286. The control unit 286 can be then configured (programmed) to calculate the time to retract and extend (i.e. complete the cycle) the powered member 130 based on the selected stroke, i.e. distance to index or incrementally move the load 2.

It is further contemplated that function of the sensors 280, 282 can be replaced by a logic algorithm or executable instructions executed by the control unit 286. Such logic algorithm or executable instructions can be based on a time required to cycle (extend and retract) the powered member 130 and to move or index the load 2 a preselected distance. The cycle can be initiated by the input signal from the receiver 274 and/or 278 or from any other sensor (not shown).

When the powered member 130 is an electric motor, it can be adapted with an optional encoder (not shown) coupled to the control unit 286 and operable to send position signal to the control unit 286. Then, the control unit 286 can control operation of the conveyor through a pre-selected timing sequence even without the load detection transmitter 272 and the receiver 274.

When the conveyor 10 is configured with the optional device 180, the operation of the powered member 190 can be controlled in the above described manner, for example by adapting the powered member 190 with the sensors 287, 288 and using the transmitter 276 and the receiver 278 at the outlet end 14 of the conveyor 10.

Figure 17:
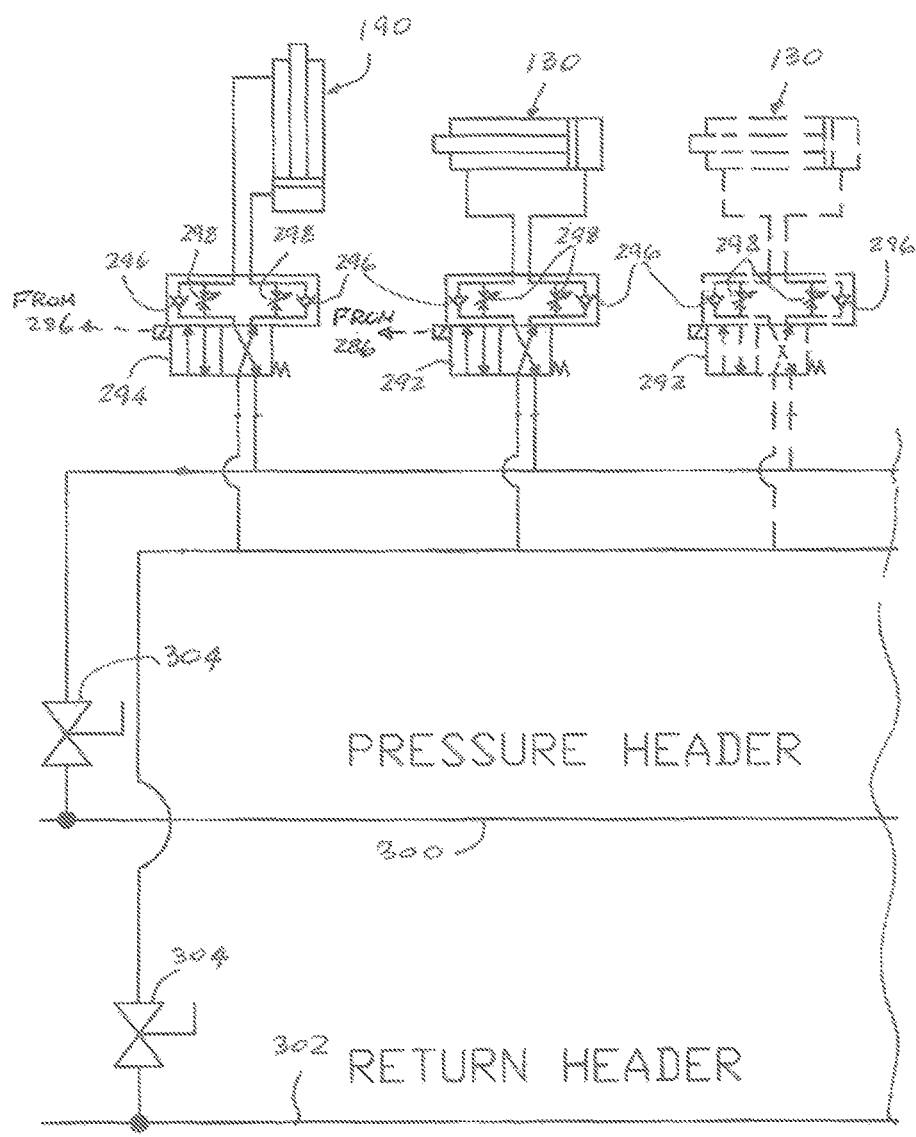
FIG. 17 illustrates a fluid control block diagram of the conveyor of FIG. 1 or 8.

FIG. 17 illustrates an exemplary fluid flow control of the conveyor 10 when the powered member 130 and an optional powered member 190 are provided as conventional pneumatic or hydraulic cylinders comprising piston and rod members. A solenoid operable valve 292 can be electrically connected to the control unit 286 and pneumatically or hydraulically coupled (i.e. in a fluid communication) to the cylinder 130 so as to control extension and/or retraction thereof. Another solenoid operable valve 294 can be electrically connected to the control unit 286 and pneumatically or hydraulically coupled (i.e. in a fluid communication) to the cylinder 190 so as to control extension and/or retraction thereof. Check valve(s) 296 and/or orifices(s) 298 can be also employed for fluid flow control. Check valve(s) 296 and/or orifices(s) 298 can be combined within a single unit or can be provided and installed individually. The cylinders 130, 190 of the hydraulic type are connected to pressure or supply header 300 and a return header 302 that can be controlled by valves 304. It would be understood that additional electrical and fluid control components can control more than one cylinder 130 or 190. The cylinders 130, 190 of a pneumatic type can be vented to atmosphere and thus can be only connected to the pressure or supply header 300, eliminating a need for check valve 296 and orifice 298 at the rod end and simplifying the solenoid operable valves 292, 294.

It would be also understood that each cylinder 130, 190 in a plurality of such cylinders can be adapted with its dedicated set of control components. In a further reference to FIG. 17, therein is illustrated at least a pair of powered member 130 with a single powered member 190. This embodiment may apply to a configuration of a plurality of conveyors 10 being positioned in a series with each other along the conveyance path 4, where only one such conveyor 10 is configured with the kick-back device 180 and the remaining conveyors 10 are absent such kick-back device 180.

It is also contemplated that each cylinder 130, 190 can be provided/configured as a rodless cylinder type.

Figure 18:
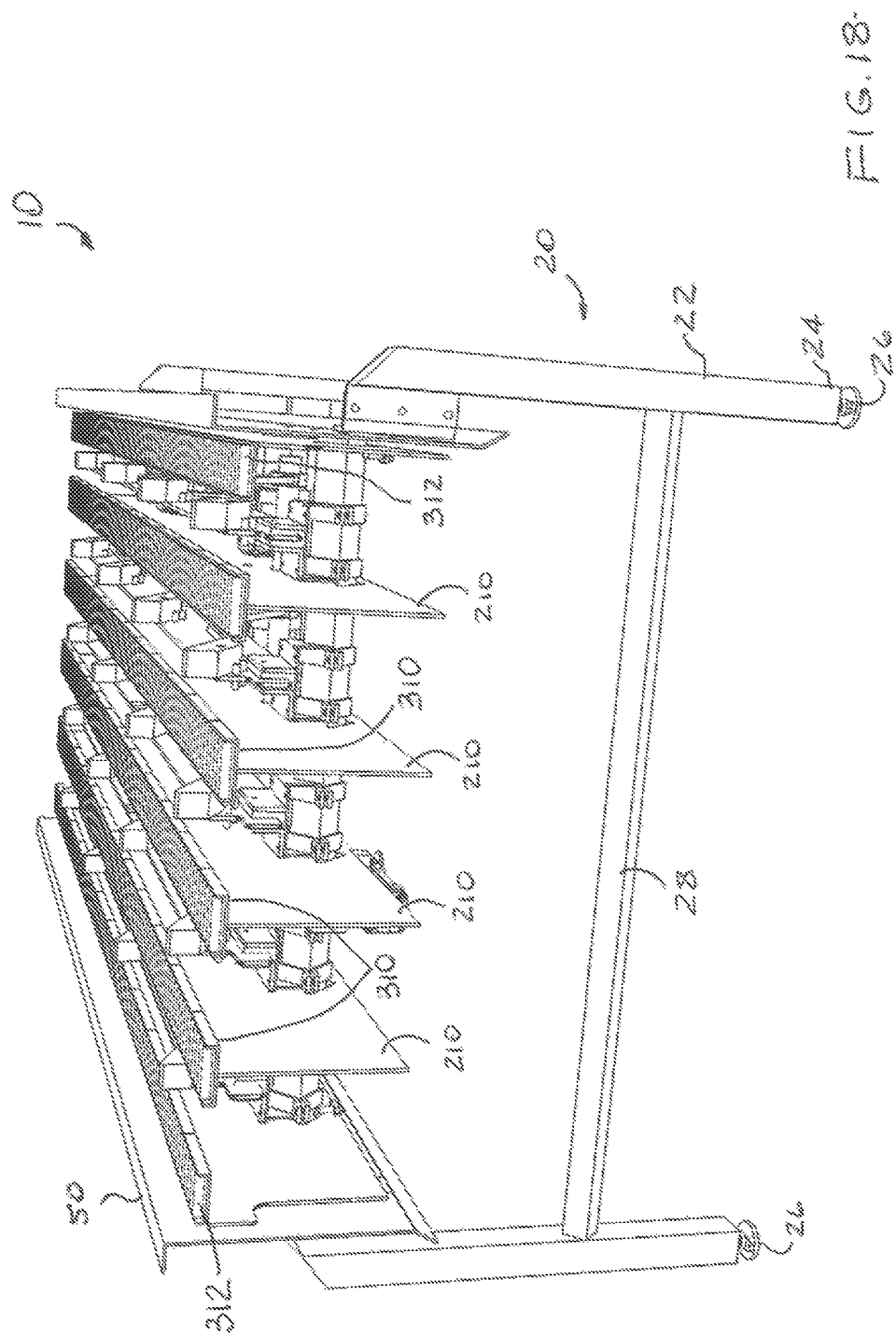
FIG. 18 illustrates a perspective view of an exemplary conveyor configured to advance multiple rows of loads.

FIG. 18 illustrates an embodiment of the load supporting members 210, 220 wherein the second wall 216 or 226 respectively has been replaced with a U-shaped receptacle 310 containing plurality of rollers 310 mounted for a rotation. The rollers 312 can than define the previously described load supporting surfaces 218, 228. The advantage of the rollers 312 is in at least minimizing if not eliminating friction between the load 2 and the previously described load supporting surfaces 218, 228. The rollers 312 that are illustrated as being rotated about a horizontally disposed axis during use of the conveyor 10 can be replaced with any roller type suitable for material handling applications.

Figure 19:
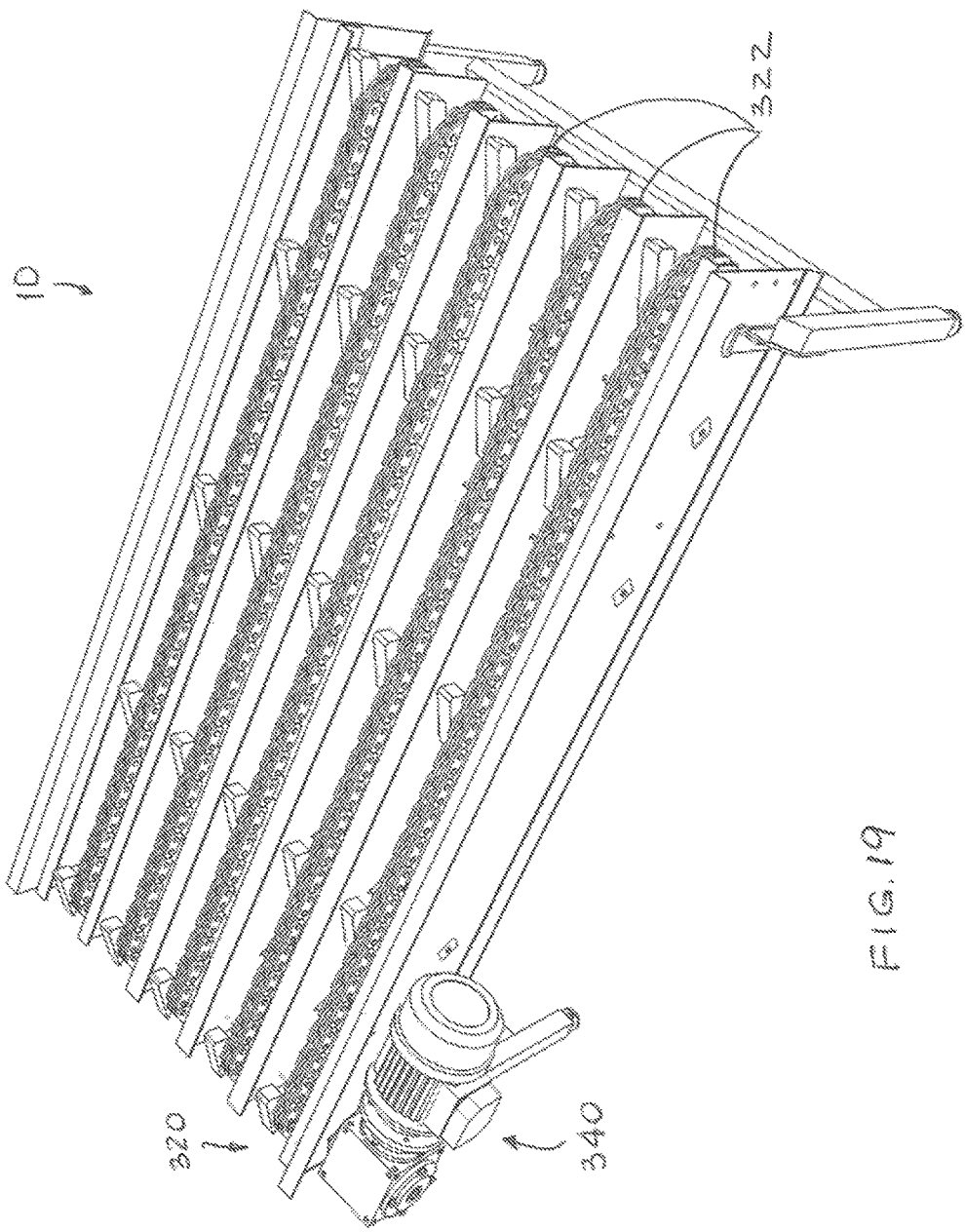
FIG. 19 illustrates a 3-D view of an exemplary conveyor configured to advance multiple rows of loads.
Figure 20:
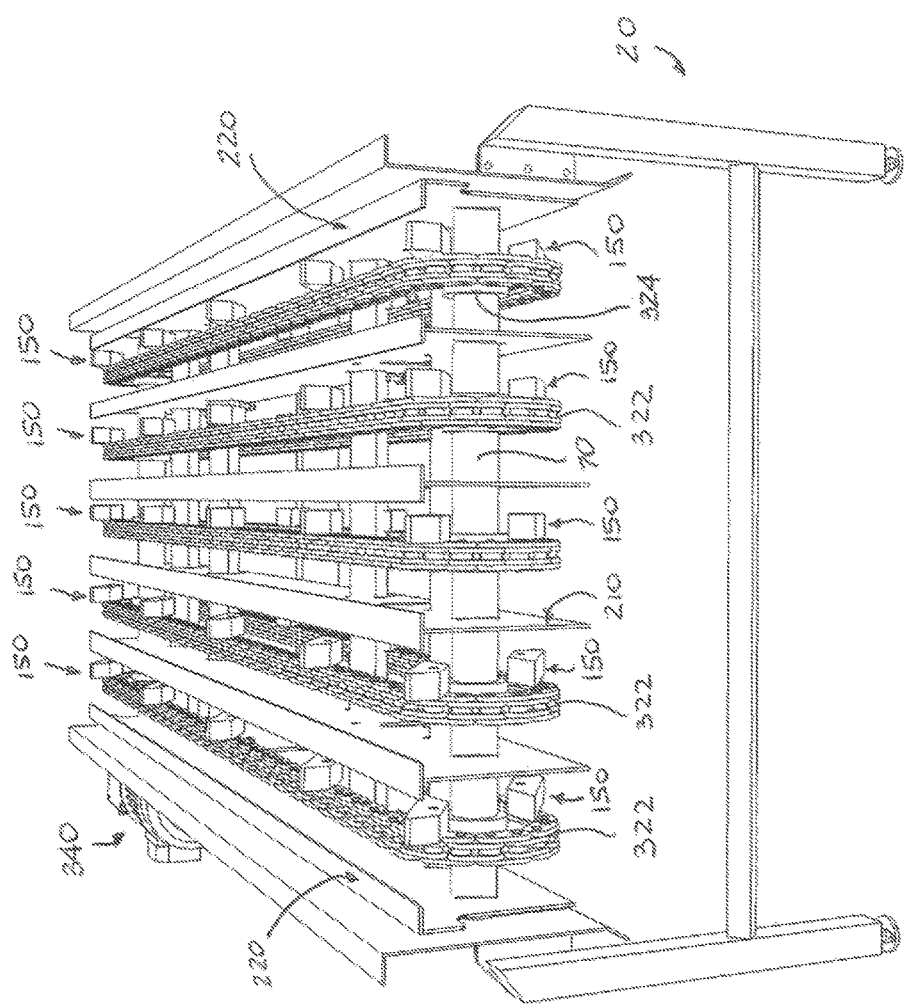
FIG. 20 illustrates a 3-D end view of the conveyor of FIG. 19.

FIGS. 19-20 illustrate an embodiment of the conveyor 10 wherein the previously described indexing device comprising the receptacles 100, carrying members 210, and a linearly configured powered member 130 has been replaced with a chain drive 320 comprising a plurality of chains 322 of an endless type, driven by a powered member 340, for example being of a motor and gearbox type, through a pair of chain sprockets 324 for each chain 322. Each chain 322 is configured to carry a plurality of the force exerting members 150. Each force exerting member 150 can be fastened to a single link of the chain 322. It would be understood that the force exerting members 150 in the embodiment of FIGS. 19-20 can move in a single direction. Furthermore, the force exerting members 150 in this embodiment, can be coupled stationary to each chain 322 Indexing or incremental advancement of the force exerting members 150 can be controlled through the control unit 286, for example based on a size of the load 2 to be incrementally advanced from the inlet end 12 to the outlet end 14 or based on a timing selected to incrementally advance such load 2. FIGS. 19-20 also illustrate an example of the frame 20 where the end members 22 of the frame 20 do not extend above the side members 50.

Figure 21:
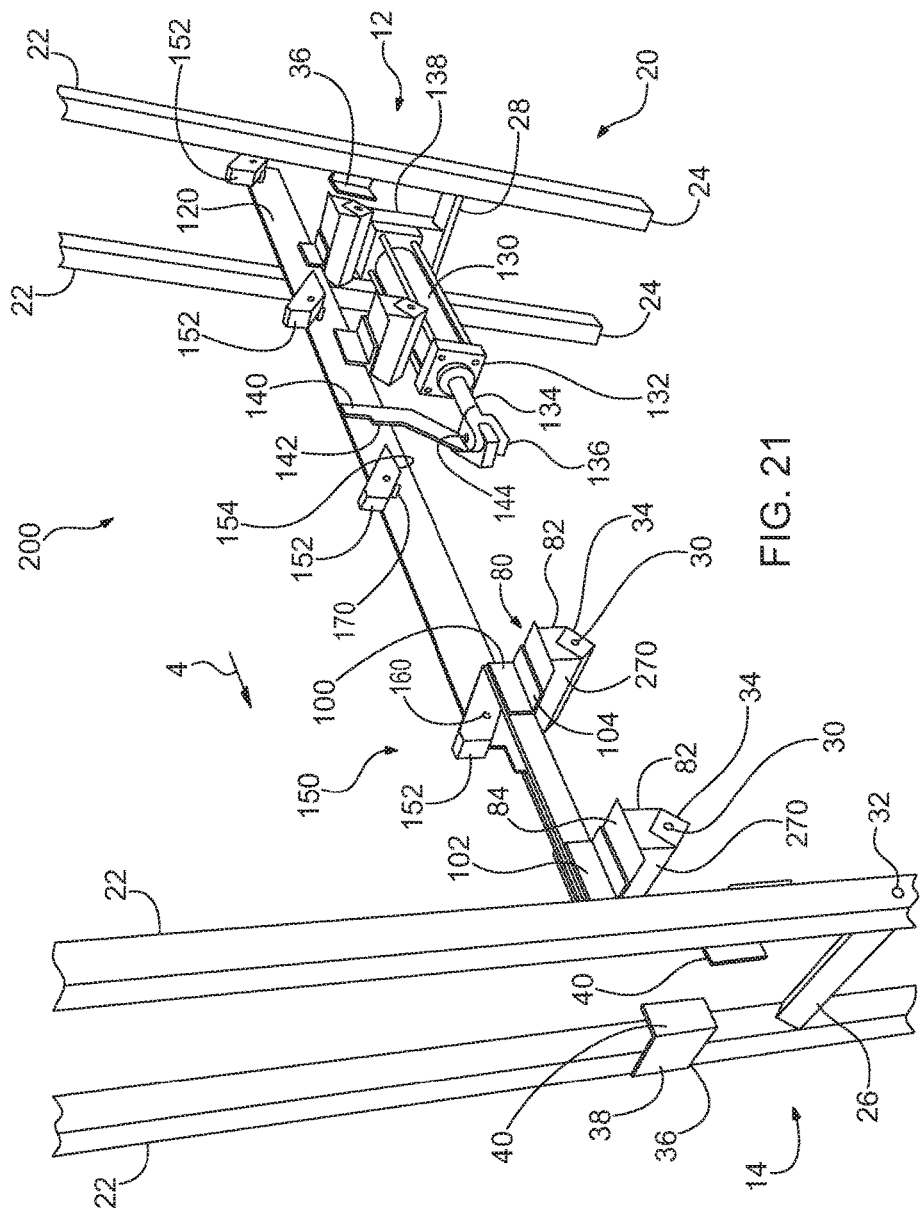
FIG. 21 illustrates a 3-D view of an exemplary conveyor configured to advance a single row of loads.

FIG. 21 illustrates an exemplary embodiment of a conveyor 200 configured to advance a single load 2 in each row. The conveyor 200 also comprises a frame that can be constructed identical to the above described frame 20, except for a smaller lateral distance between end members 22 to accommodate such single load 2. The frame defines an inlet end 12 and an outlet end 14 of the conveyor 200. The frame comprises end members 22, end braces 28, sized for a smaller lateral distance and the pair of side members 50, each side member 50 is coupled to the pair of end members 22 in a direction between the inlet end and the outlet end of the conveyor 200. The side members 50 are omitted in FIG. 21 for the sake of clarity and the detail description of such end members 50 is omitted herein for the sake of brevity.

Conveyor 200 comprises braces 270 coupled stationary, at each end thereof, to each side member 50 of the frame, in series and in a spaced apart relationship with each other between the inlet and outlet ends of the conveyor 200. Each brace 270 can be essentially the above described brace 70, except for a shorter length to accommodate the smaller lateral distance of the conveyor 200. Each brace 270 is disposed substantially transverse to the above described load supporting members 220 and passing through aligned apertures 224 in each first wall 222 of each load supporting member 210. The pair of load supporting members 220 are omitted in FIG. 21 for the sake of clarity. In an example, the outer load supporting member 220 can be replaced with the side members 50 configured to support the loads 2 and the inner load carrying members 210 are not needed in the embodiment of FIG. 21. In an example, only one load supporting member can be provided.

The conveyor 200 is also adapted with the above described U-shaped brackets 80 and clamps 90 positioned in spaces between the load supporting members 210.

The conveyor 200 also comprises the above described receptacles 100 and can comprise optional liners 110. As is in the embodiment of the conveyor 10, a single carrying member 120 with force exerting members 150 is also provided and is positioned between a pair of load supporting members 220.

The conveyor 200 comprises a single powered member 130 coupled to the single carrying member 120 with the link 140.

The operation of the conveyor 200 of FIG. 21 is essentially identical to the operation of the conveyor 10, except for the single load 2 in each row being advanced from the inlet end 12 to the outlet end 14.

It will be also understood that plurality of conveyors 200 can be coupled with each other in a side-by-side relationship to essentially define a conveyor being similar to the conveyor 10 and configured to move a single carrying member 120 with a dedicated power mover 190.

Figure 22:
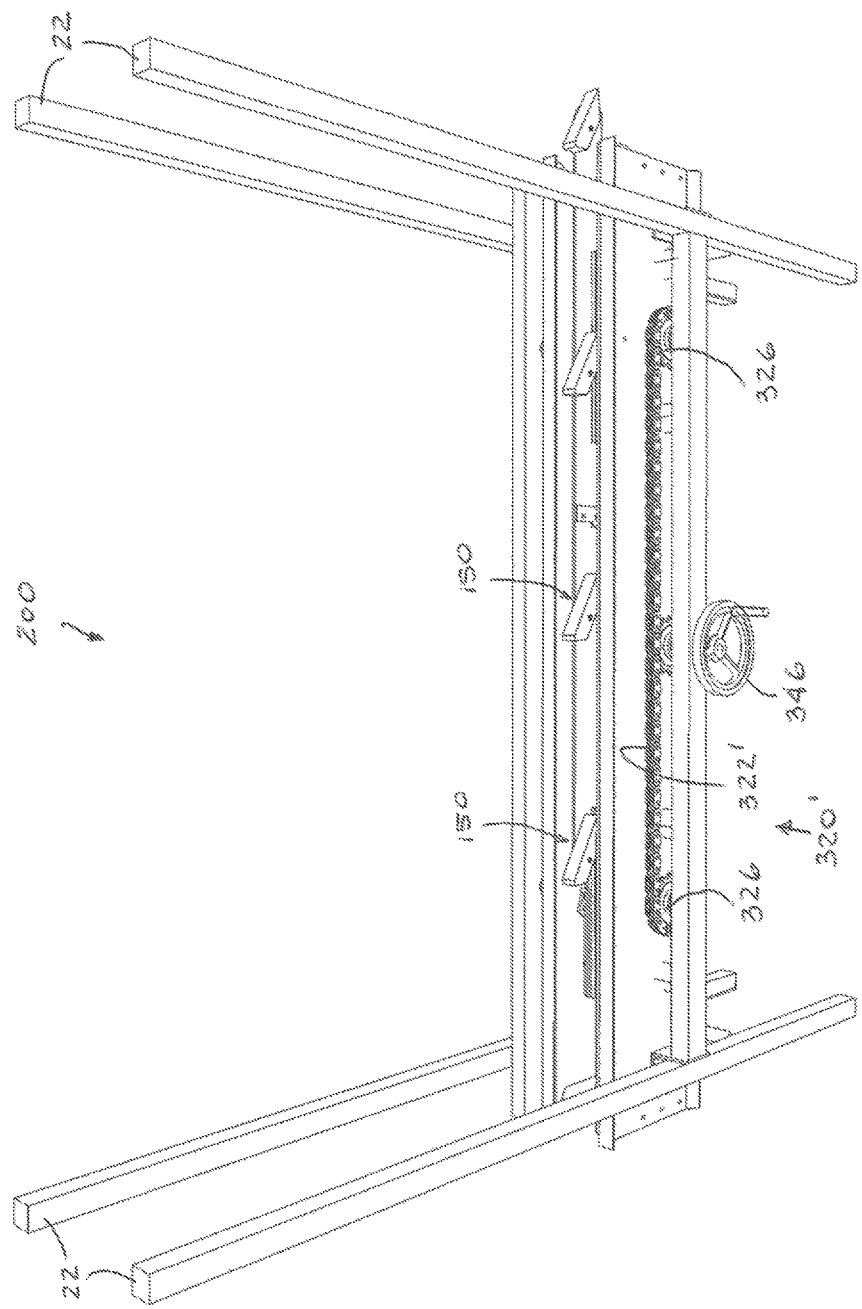
FIG. 22 illustrates a perspective view of an exemplary conveyor configured to advance a single row of loads.
Figure 23:
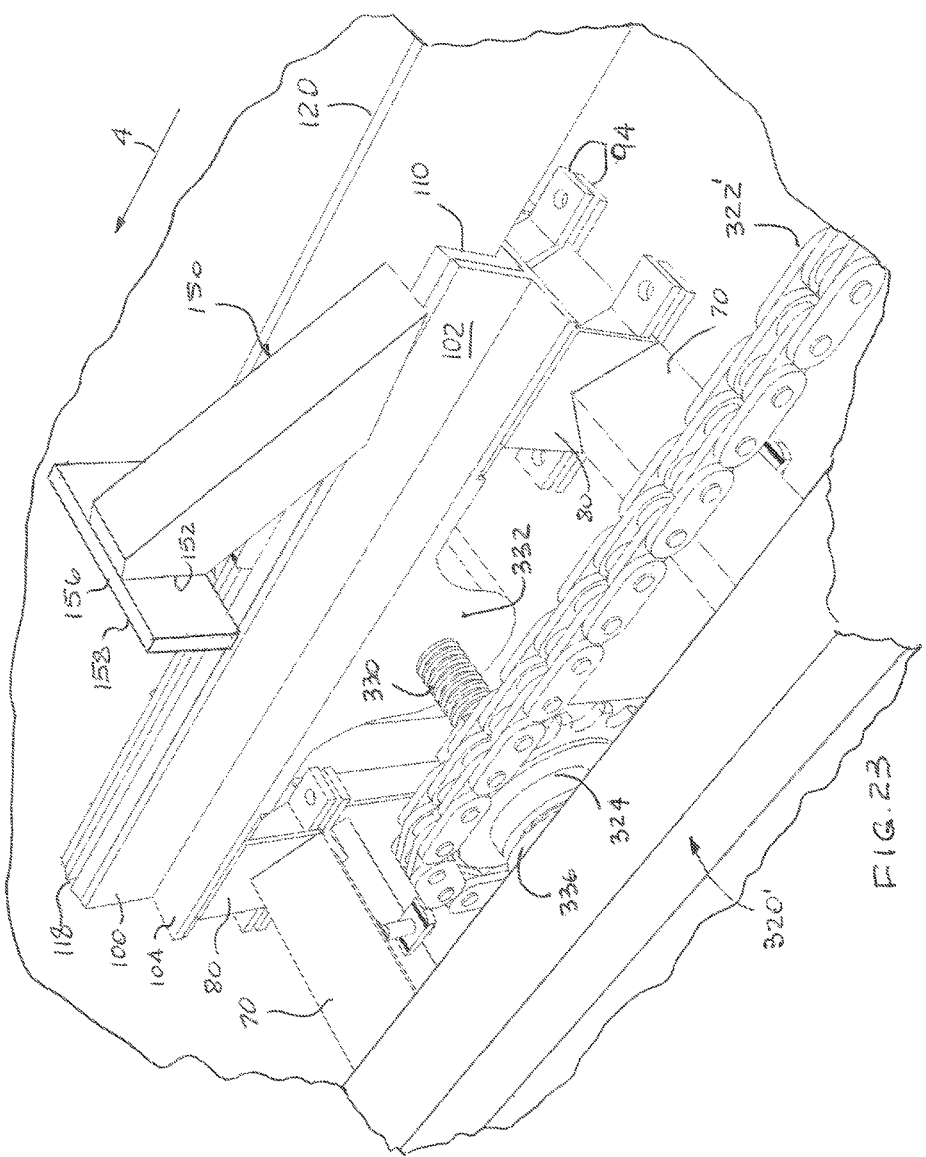
FIG. 23 illustrates a partial 3-D top view of the conveyor of FIG. 22.
Figure 24:
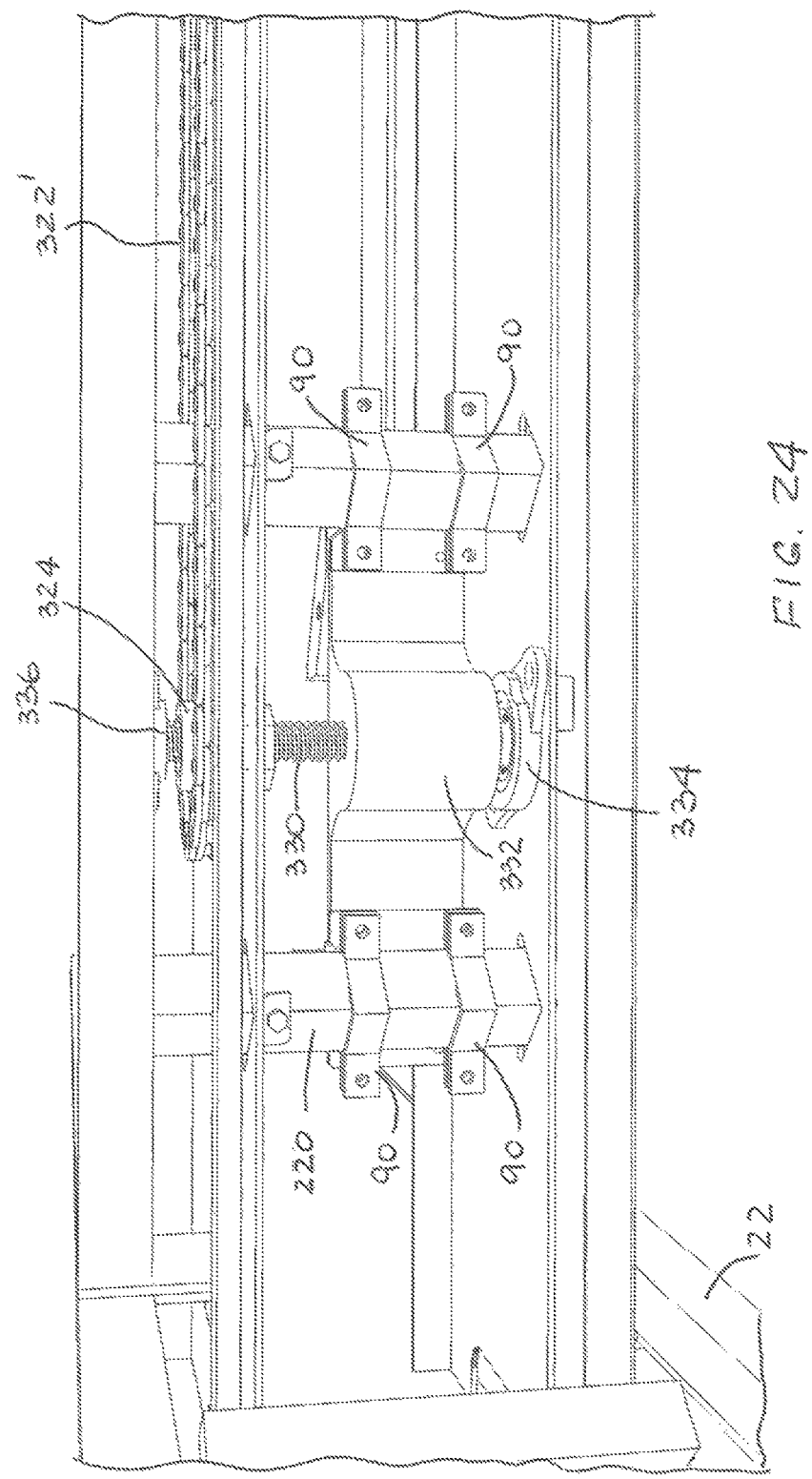
FIG. 24 illustrates a partial 3-D bottom view of the conveyor of FIG. 22.

FIGS. 22-24 illustrate an embodiment of the conveyor 200 wherein the powered member 130 has been replaced with the chain drive 320' comprising a chain 322' and sprockets 324. For the sake of clarity, the load supporting members have been removed in FIGS. 22-24. The sprockets 324 can be coupled by way of the shaft 330 rotating in a pair of bearings 334, 336. The conveyor 200 of FIGS. 22-24 is also configured as an adjustable width conveyor by way of a threadable engagement of the shaft 330 and a housing 332. The housing 332 is stationary coupled to the receptacle 100 and/or the support bracket(s) 80. The width of the conveyor 200 can be adjusted manually by way of a hand wheel 346 or by a powered member, for example such as the above described powered member 340. Thus, the exemplary conveyor 200 of FIGS. 22-24 comprises a device configured to adjust or means for adjusting the width of the conveyor 200 so as to accommodate loads 2 of various widths.

FIG. 23 also illustrates an example of the force exerting member 150 in a stationary connection with the carrying member 120 and being adapted with an enlarged front end 152. Such enlarged front end 152 is represented by a member 156 having a front face 158. The member 156 will extend above both load supporting surfaces during use of the conveyor 200 to increase the contact area with the load 2. Such increased contact area is advantageous is spreading the pushing force over a larger area of the load 2. The front face 158 is illustrated as having a smooth flat surface but can be configured in different shapes. The member 156 can be sized to extend over only one load supporting surface in applications where only one load supporting member is used. FIG. 23 also illustrates that the force exerting member 150 is stationary coupled to the carrying member 120. The stationary coupling can be used in application(s) where the force exerting member 150 does not have to travel under the load 2 when moving (retracting) in a direction opposite to the conveyance path 4. For example, the conveyor 200 can be configured only with a single force exerting member 150 that retracts to initial position at the inlet end of the conveyor 200 and receives next load 2 to advance from above or from a side of the conveyor 200. When the force exerting member 150 is stationary coupled, the shape of the force exerting member 150 and the shape of the rear end 154 is not critical. Or, the force exerting members 150 within the conveyor 10 of FIGS. 19-20 can be adapted with the member 156 and travel, without interferences, with the chain 322. If the member 156 is to be adapted on pivotally mounted force exerting members 150, the carrying member 120 and/or the load supporting members will be adapted with notches (not shown) to receive the member 156 when the force exerting member is disposed in a non-loading position.

Figure 25:
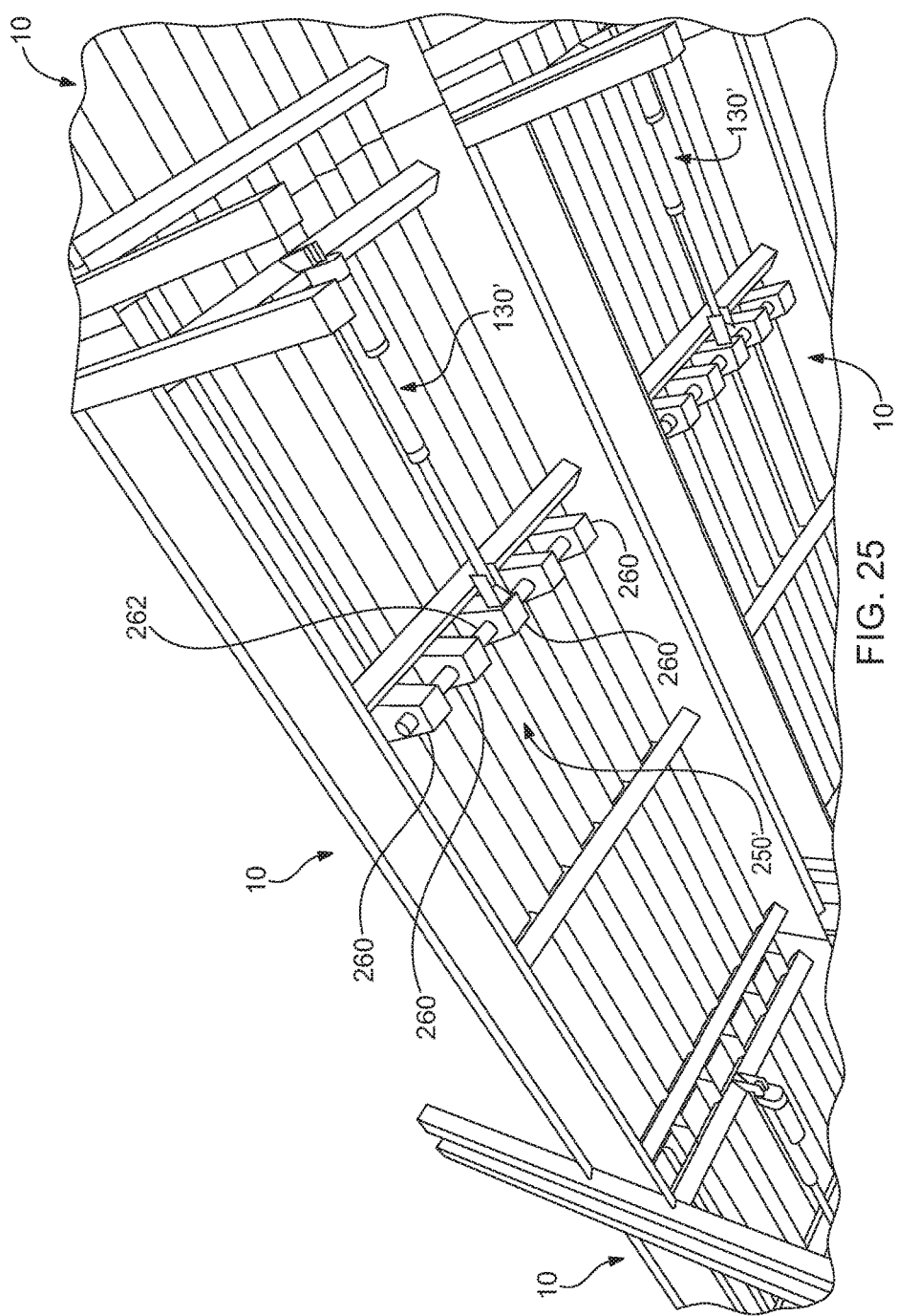
FIG. 25 illustrates a partial 3-D view of multiple conveyors disposed in a series with each other.

FIG. 25 illustrates an embodiment, wherein multiple conveyors 10 are disposed in a series with each other along the conveyance path 4. The conveyors 10 can be mechanically connected therebetween for example with fasteners (not shown) passed through aligned apertures 58 in each conveyor 10. FIG. 25 also illustrates that conveyors 10 can be disposed in series with each other in a direction normal to the conveyance path 4. Accordingly, it would be understood that multiple conveyors 10 can be coupled to each other along the conveyance path and in a direction normal to the conveyance path. Furthermore, FIG. 25 illustrates an example of the powered member configured as a screw drive 130' and the link assembly 250' comprising blocks 260 joined by a single elongated member 262, although a plurality of members 262 is also contemplated herewithin.

Figure 26:
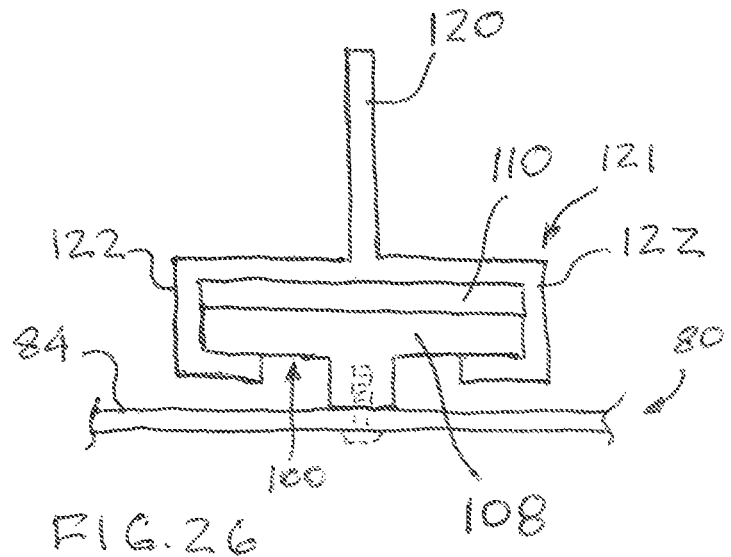
FIG. 26 illustrates a partial end view of an exemplary carrier and receptacle configuration that can be employed in the conveyors of FIGS. 1-15, 18 and 21-24.

FIG. 26 illustrates an embodiment of the receptacle 100 and the carrying member 120, wherein the carrying member 120 is adapted with a base 121 comprising a pair of portions 122 each having a J-shaped configuration in a plane transverse to a length of the carrying member 120. The receptacle 100, in this embodiment, is provided as a member 108 having a T-shaped configuration in the plane transverse to a length of the carrying member 120. The member 108 is shaped to fit within the base 121. The optional liner 110 may be simply provided as a flat member or a strip or may be adapted with a complimentary J-shaped configuration.

Figure 27:
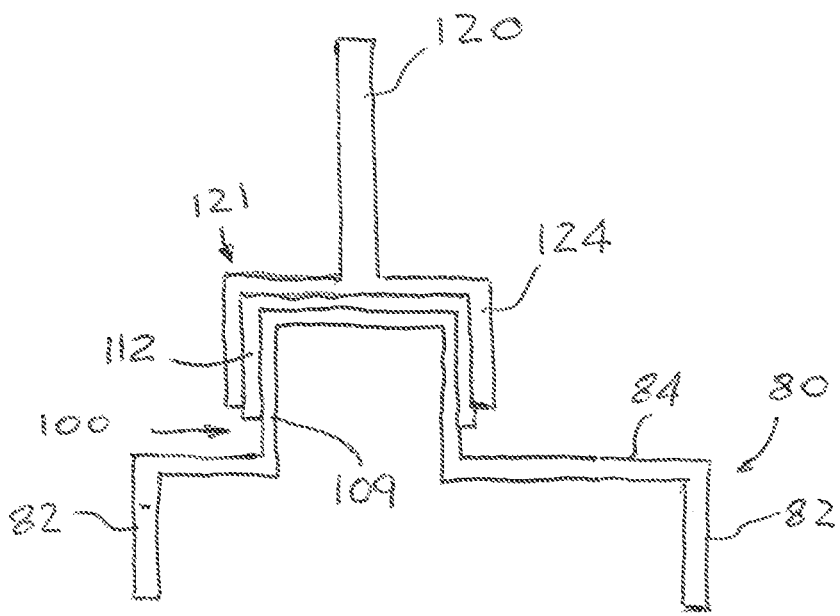
FIG. 27 illustrates a partial end view of an exemplary carrier and receptacle configuration that can be employed in the conveyors of FIGS. 1-15, 18 and 21-24.

FIG. 27 illustrates an embodiment of the receptacle 100 and the carrying member 120, wherein the carrying member 120 is adapted with a base 121 comprising a pair of flanges 124, each having an L-shaped configuration in a plane transverse to a length of the carrying member 120. In other words, the base 121 can have a U-shaped configuration. The receptacle 100, in this embodiment, is provided as a U-shaped portion 109 integral to the support bracket 80. The optional liner 110 may be provided as a member 112 with a U-shaped configuration being complimentary to the U-shaped configuration of the base 121.

Thus, the above described receptacle(s) 100 and the carrying member(s) 120 provide means for mounting and/or carrying force exerting member(s) 150 for a reciprocal linear movement between the inlet end 12 and the outlet end 14. Furthermore, in reference to FIGS. 26-27, the means for mounting and/or carrying force exerting member(s) 150 for the reciprocal linear movement exclude rollers, cam followers or wheels. However, in an embodiment, the carrying member 120 can be moved by tracks and cam followers as disclosed in U.S. Pat. No. 5,195,630 issued to Donovan et al. on Mar. 23, 1993 and whose teaching are incorporated in its entirety by reference thereto.

Figure 36:
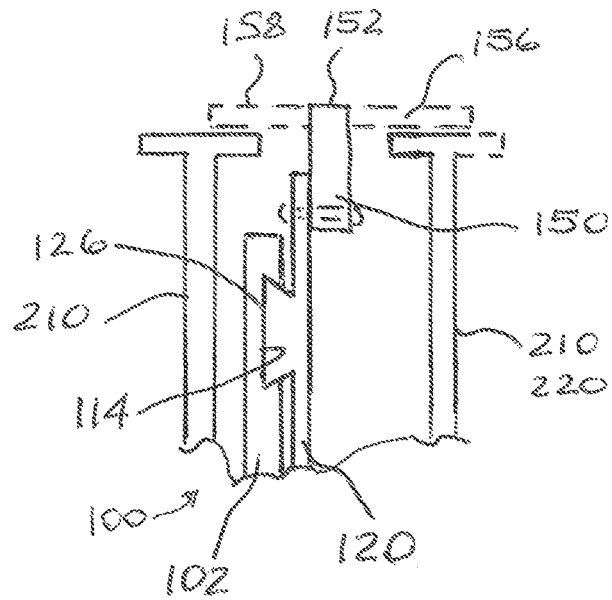
FIG. 36 illustrates a partial end view of an exemplary carrier and receptacle configuration that can be employed in the conveyors of FIGS. 1-15, 18 and 21-24.

FIG. 36 illustrates an embodiment of the receptacle 100 comprising a single wall 102' with a recess 114. The carrying member 120 is shown as being adapted with a complimentary protrusion 126 that engages recess 114 and enables movement of the carrying member 120. It would be understood that recess 114 can be on the carrying member 120 and the protrusion 126 can be on the single wall 102' of the receptacle 100. It will be understood that an optional liner (not shown) can be provided, or the one or both recess 114 and protrusion 126 can be coated with a friction reducing material. It is further contemplated that recess 114 and protrusion 126 can comprise different materials minimizing friction during linear movement.

Figure 37:
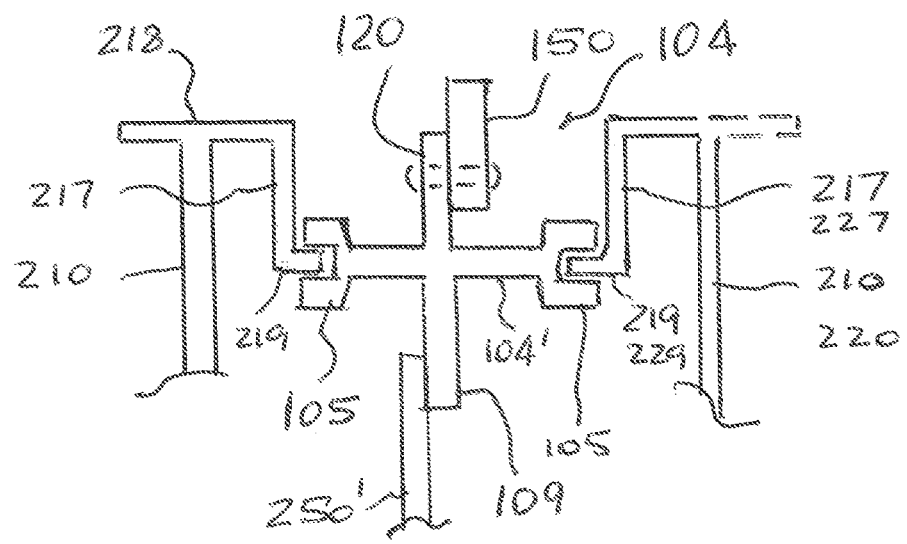
FIG. 37 illustrates a partial end view of an exemplary carrier and receptacle configuration that can be employed in the conveyors of FIGS. 1-15, 18 and 21-24.

FIG. 37 illustrates an embodiment of the receptacle 100 integrated with the carrying member 120 as a unitary one-piece construction. Furthermore, the receptacle 104 in this embodiment comprises a member or a flange 104' with a female receptacle 105 at each end thereof, where the end is disposed along the conveyance path 4. Each female receptacle 105 is shaped and sized to mate with a complimentary flange 219 of the inner load supporting member 210 through an intermediate flange 217, or with a complimentary flange 229 of the outer load supporting member 220 through an intermediate flange 227. In other words, in this embodiment, the receptacle 104 does not have to be stationary mounted and can linearly move on the load supporting members. The flange 104' has a connection to the powered member through a linkage 250' that can be either directly coupled to the flange 104' or indirectly coupled through another flange 109. In this embodiment, independent carrying members 120 can be provided, one for each force exerting member 150. Such independent carrying members 120 can be joined with a common flange 109 or any other arrangement for a connection to the single powered member. It will be understood that in this embodiment, the receptacle 100 is provided without even a single vertically disposed wall 102. The provision for the female receptacle 120 and the flange 219, 229 can be reversed, so that the female receptacle 105 is on the load supporting member 210 and/or 220. A connection between the carrying member 120 and the flange 104' can be provided through an intermediate flange (not shown) for fastening purposes, can be a direct connection by way of welding or use of adhesive or can be an integral connection, where the carrying member 120 and flange 104' are provided as a unitary one-piece construction, for example by a molding, extrusion or casting process.

Thus, it should be understood that the receptacle 100 of FIGS. 26-27 and 36-37 provide means for mounting the carrying member 120 for linear movement where the receptacle 100 is provided as any one of a single vertically disposed wall, without any vertically disposed walls, stationary, movable, fixed to stationary component(s), suspended from stationary component(s).

Figure 28:
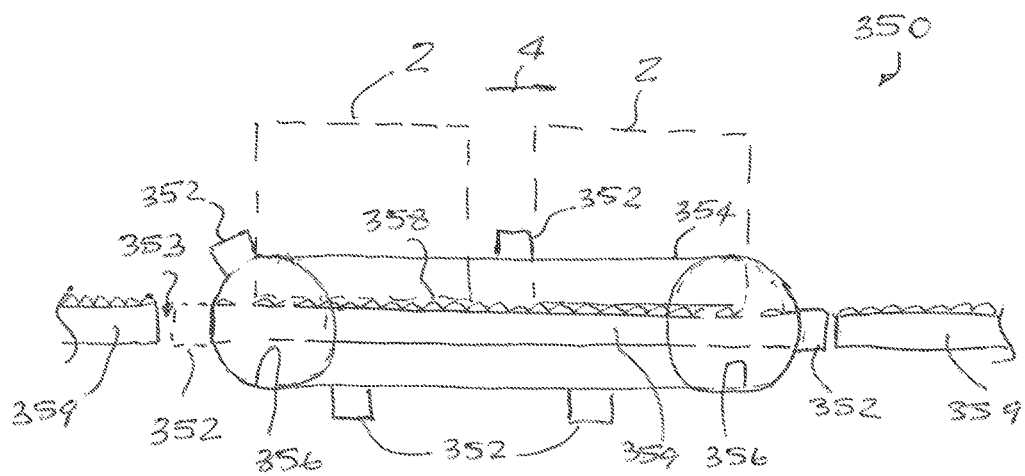
FIG. 28 illustrates a side view of an exemplary conveyor configured to advance multiple rows of loads.
Figure 29:
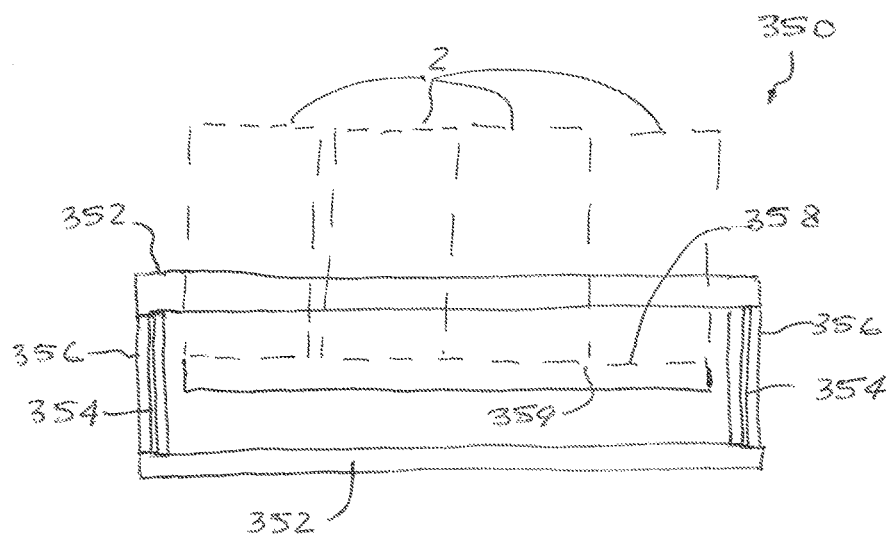
FIG. 29 is an end view of the conveyor of FIG. 28.

FIGS. 28-29 illustrate an embodiment of a conveyance apparatus 350, wherein loads 2 are advanced by way of elongated members 352 attached to a pair of endless members 354, each being any one of such as a belt, chain or cable. Sprockets 356, or any other suitable members, are provided to move the elongated members 352, with one or more sprockets being attached to a powered member (not shown), for example such as the above described powered member 340. The surface(s) 358 of the load carrying members 359, that the loads 2 are being supported on during advancement, could be the above described surfaces 218, 228, 312. The load carrying member(s) 359 may be even provided as a conventional powered or unpowered roller conveyor or a conventional belt conveyor. In other words, the conveyance apparatus 350 can comprise a roller or belt conveyor. The incremental advancement or indexing of the loads 2 can be controlled by way of the control unit 286. Incremental travel distance of the load 2 can be used as a control parameter for the control unit 286. Or, the above described position sensors 272, 274, 276 and 278 can be used to start and stop operation of the powered member. When two or more load carrying members 359 are positioned in series with each other along the conveyance path 4, a suitable gap 353 between ends of a pair of adjacent load carrying members 359 is provided to accommodate passage of the elongated member 352.

Particular embodiments of the disclosure also provide improvements to conventional force exerting members. For the sake of reader's convenience, such force exerting members conventionally comprise a front end essentially identical to the above described front end 152. In some applications, for example when the load 2 comprises a paper bag/sack with powdery contents, such as a cement and flour or with loose contents such as oats and cereals, the front end 152 may damage the integrity of the paper bag/sack due to a small contact area and force to move each load 2.

The force exerting member 150 of FIG. 23, being adapted with the member 156, distributes the force over a larger contact area with the load 2 and thus substantially reduces if not eliminates the risk of damaging the integrity of the load 2 comprising the paper bag/sack. In such application(s), the carrying member 120 and/or load supporting members will be then adapted with a notch to accommodate pivoting motion of the member 156. Furthermore, the member 156 can be sized to span two or more force exerting members 150, providing rigidity and evenness of distribution during an advancement of the load 2. Thus, in applications where the load 2 comprises the above described paper bag/sack, such load can be advanced with more than one force exerting member joined with a common member 156 that can be sized to span the entire size of the load 2.

As it has been stated above, the face 158 of the member 156 does not have to be flat and can be provided in different shapes. In other words, the member 156 and subsequently, the force exerting member 150, can be configured with a non-flat front end 152.

Figure 30:
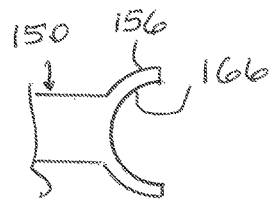
FIG. 30 illustrates a partial top view of an exemplary force transmitting member.
Figure 31:
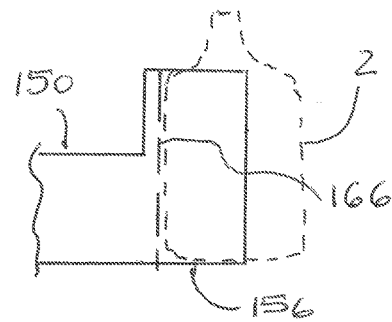
FIG. 31 illustrates a partial elevation view of an exemplary force transmitting member.
Figure 34:
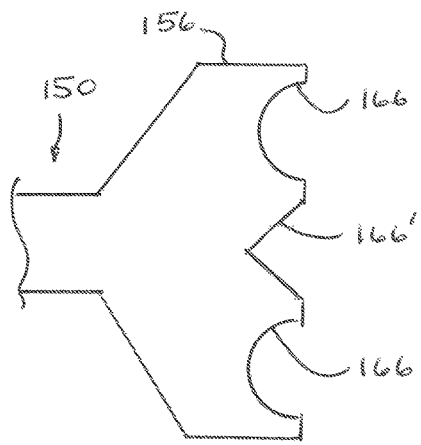
FIG. 34 illustrates a partial top view of an exemplary force transmitting member.

108 recess or cavity. In one example, such front end 152 can be configured as having one or more of concave surfaces. The concave surface can comprise semi-cylindrical shape 166. The semi-cylindrical shape 166 can be disposed generally horizontally during use of the conveyor, as is best shown in FIG. 30. In this orientation, the member 156 can be configured to advance a shaft-like or an axle-like load. The semi-cylindrical shape 166 can be disposed vertically during use of the conveyor, as is best shown in FIG. 31. In this orientation the member 156 can advance a generally vertically disposed load 2, for example such as a wine, beer, soda or juice bottle or can. The member 156 can be adapted with more than one semi-cylindrical shape 166, as is best shown in FIG. 34. For example, three semi-cylindrical shapes 166 can be used to advance loads 2 such as bottles or cans in a conventional six-pack configuration. Or three semi-cylindrical shapes 166 can be used to advance three bottles or cans for packaging into a six-pack or higher (twelve-pack) configuration.

Figure 32:
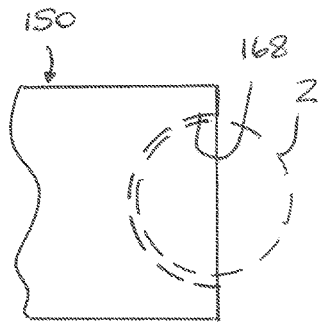
FIG. 32 illustrates a partial top view of an exemplary force transmitting member.
Figure 33:
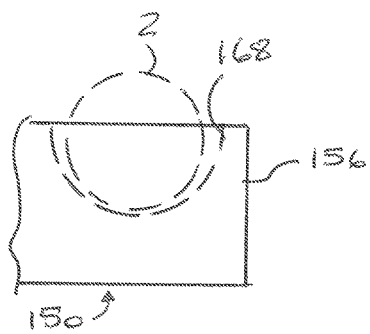
FIG. 33 illustrates a partial elevation view of an exemplary force transmitting member.

The concave surface can comprise a semi-spherical or similar shape 168. The semi-spherical shape 168 can be disposed in a generally vertical plane, as is best shown in FIG. 32, so as to abut a complimentary exterior surface of the load 2 having a spherical or semi-spherical shape, for example such as an orange, a head of lettuce, a ball and the like. The semi-spherical shape 168 can be disposed in a generally horizontal plane, as is best shown in FIG. 33, so as to carry the load 2 thereon. For example, a load 2, such as a ball, can be lowered onto the member 156 having the horizontally disposed semi-spherical shape 168 so that such ball is advanced, either incrementally completely while being supported on the member 156.

It should be understood that the recess is not limited to the above examples and would be selected based on the shape and/or size of load 2. For example, the concave surface 166 can be adapted with a more complex profile to correspond to a profile of the load 2, being a bottle with a narrow top portion. The recess can be provided with a triangular, square or other cross-sections depending on the type of load 2. The recess can be even provided as a bore. A combination of different surface shapes can be also used. For example, FIG. 34 illustrates a triangular-shaped recess 166' interspersed with a pair of cylindrical shaped recesses 166.

In an embodiment, the front end 152 can be provided with a protrusion. It will be understood, that any of the above described recesses examples can be inverted to define a protrusion.

In an embodiment, a combination of recess(s) and protrusion(s) can be used.

It should be understood, that the front end 152 modified with any one of a recess, a protrusion and a combination thereof improves guidance and/or stability of the load 2 during movement thereof. Likewise, the improved guidance and/or stability can be achieved by connecting two or more force exerting members 150.

Figure 35:
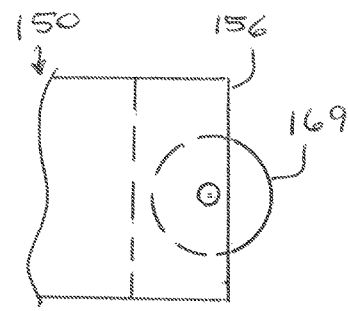
FIG. 35 illustrates a partial top view of an exemplary force transmitting member.

The front end 152 can be adapted with a U-shaped configuration to mount a roller 169 for a rotation about substantially vertical axis, as is best shown in FIG. 35, or substantially horizontal axis. This rotating feature can reduce friction during contact with the other loads that move in a direction normal to the conveyance path 4.

The front end 152 can be configured to at least reduce if not completely eliminate a movement of the load 2 in a direction normal to a direction of the conveyance path 4. For example, when the load 2 is orthogonal in nature (box, container, printed circuit board, etc.) the recess in the front end 152 can be configured not only to push the load 2 from the back, i.e. exert force thereonto, but also guide the load 2 by abutting the side surfaces of the load 2. Similarly, the front end 152 can be configured to restrict, during conveyance, tilting of the load 2 in a vertical direction, where a portion of the load 2 may separate from the load supporting surface(s).

The member 156 (or a portion of the front end 152) in some or all of the above examples can be provided as a detachable member. The method of detachably attaching such member 156 is not critical herewithin. It can be attached with fasteners, releaseable adhesives or fasteners, and other mechanical fastening means, for example such as a mating bore and a pin or a pair of mating tapered surfaces. Such detachable member 156 can be configured as a wearable member. Such wearable member can comprise any one of a low friction polymer material and an elastomeric material.

The particular embodiments of the present disclosure also provide an indexing or a ratchet device for a conveyor operable to advance a single load or a plurality of loads with a single stroke, between an inlet end and an outlet end of the conveyor.

In an embodiment, the indexing device is configured to advance plurality (two or more) of rows of loads 2 with a plurality (two or more) of loads 2 disposed in a spaced-apart relationship and in series with each other in each row. In other words, in this embodiment, the indexing device is configured to advance a plurality of loads 2 disposed in a grid-like pattern. The indexing device, described when installed within the conveyor, comprises, in combination, receptacles 100, carrying members 120, force exerting members 150, a pivotal connection 160 between each force exerting member 150 and the carrying member 120, and a link/linkage configured to connect the indexing device to the powered member.

Receptacle 100 are mounted in a stationary position, in series with each other both along a length and along a width of the conveyor, between the inlet and outlet ends thereof. In other words, the receptacles 100 are also mounted in a grid-like pattern. A row of receptacles 100 is disposed between a pair of spaced apart load supporting members, for example, such as two inner load supporting members 210 or one inner load supporting member 210 and one outer load supporting member 220. Each receptacle 100 defines a pair of vertically disposed walls 102 and an interior or a gap 118 between the inner surfaces of the walls 102. The wall 102 can have a flange 104 defining an L-shaped configuration of the receptacle 100, with flange 104 being configured to secure, either permanently or detachably, the wall member 102 to a supporting structure or surface. The receptacle 100 can also be configured with a U-shaped configuration.

Each carrying member 120 is positioned for a reciprocal linear movement between the vertically disposed walls 102 within the interior 118 of each receptacle 100. In other words, each carrying member 120 is also between a pair of spaced apart load supporting members, for example such as above described load supporting members 210 and 220.

Force exerting members 150 are disposed in series with each other between the inlet and outlet ends of the conveyor and between the pair of spaced apart load supporting members, such as two inner load supporting members 210 or one inner load supporting member 210 and one outer load supporting member 220. Each force exerting member 150 comprising a front end 152 and a rear end 154.

A pivotal connection 160 between each force exerting member 150 and the carrying member 120 also comprises a stop 170. In operation, each force exerting member 150 pivots between a load engaging position and a non-load engaging position on the carrying member 120 and moves with the carrying member 120 in the reciprocal linear movement. The front end 152 has at least a portion thereof extending outwardly, due to gravity of the rear end 154, in the load engaging position, from load supporting surfaces of the spaced apart inner and outer load supporting members, 210 and 220 respectively, and in a abutting relationship with a portion of the load 2 during operation of the indexing device. The abutting relationship causes an incremental advancement of the load 2 between the inlet and outlet ends during a linear movement of each carrying member 120 in a first direction. The front end 152 and the rear end 154 being at least partially disposed, in the non-load engaging position, below or flush with the load supporting surfaces during the linear movement of each carrying member 120 in an opposite second direction. The linear movement of the force exerting members 150 in the first direction advances the load 2 from the inlet end to the outlet end of the conveyor.

The linkage can be the above described linkage 250.

The indexing device of any of the above described embodiments can be retrofitted on other type conveyors. In an example, the indexing device(s) can be retrofitted on a conveyor as disclosed in U.S. Pat. No. 5,195,630 issued to Donovan et al. on Mar. 23, 1993, the entire contents of which are incorporated herein by reference. In this example, the above described indexing device(s) can be employed to at least replace the cam follower arrangement in U.S. Pat. No. 5,195,630.

In an example, the indexing device(s) can be retrofitted on a conveyor as disclosed in U.S. Pat. No. 5,320,212 issued to McIntosh et al. on Jun. 14, 1994, the entire contents of which are incorporated herein by reference. In this example, the above described indexing device(s) can be employed to at least replace a dual cylinder and linkage arrangement to pivot force exerting members or dogs.

The present disclosure is also directed to a kit for production of a free-standing conveyor from a plurality of interfitting parts.

In an embodiment, the kit comprises a frame comprising four tubular end members configured for vertical positioning during use of the conveyor, two tubular cross braces and two longitudinal side members, each longitudinal side member comprising apertures disposed adjacent and spaced from each end thereof, the longitudinal side members, when connected to the four tubular end members, define an inlet end and an outlet end of the conveyor; load supporting members, each load carrying comprising a first wall and a second wall with a load supporting surface, the first wall being disposed generally vertically during operation of the conveyor and comprising apertures spaced apart along a length of the each load supporting member and biasing member, each biasing member disposed between a peripheral edge of a respective aperture and a free edge of the first wall and comprising a first portion stationary attached to a surface of the first wall of each member in an alignment with a respective clamp and comprising an second portion movable in a relationship to the first portion, the load supporting surface being disposed generally horizontally during operation of the conveyor; braces; clamps, each clamp comprising a pair of portions fastened to each other during operation of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; L-shaped members, each L-shaped member having one leg thereof configured for fastening to the surface of the each U-shaped bracket during assembly of the conveyor; liners, each liner comprising a low friction material and being coupled to an interior surface of another leg of a respective L-shaped member; elongated carrying members; a powered member comprising a stationary portion and a movable portion thereof being configured for a reciprocal linear movement; a linkage comprising a link having a means for a pivotal connection with a distal end of the movable member and flanges disposed in a spaced apart relationship on and from one exterior surface of the link; plurality of coupling members, each coupling member comprising one end thereof configured for coupling, with fasteners, to a respective carrying member and comprising a second end thereof configured for coupling, with fasteners, to the link; force exerting members, each force exerting member comprising a front end and a rear end, the rear end being heavier than the front end; a pivotal connection between each force exerting member and a respective carrying member; and stops, each stop being rigidly coupled to each carrying member in a proximity to a respective pivotal connection.

In an embodiment, the kit for production of a freestanding conveyor from a plurality of interfitting parts comprises a frame; load supporting members to be mounted on said frame in a stationary position and in a spaced apart relationship with each other; a powered member; and an indexing device to be mounted on said frame, the indexing device comprising a portion to be movable by the powered member.

The kit can be also configured in accordance with any other embodiment described herewithin and thus, the detail description of such kit(s) is omitted herein for the sake of brevity.

In an embodiment, a conveyor for advancing a plurality of rows of loads with a plurality of loads in each row, comprises a frame defining an inlet end and an outlet end of the conveyor, the frame comprising end members and a pair of side members, each side member coupled to a pair of end members in a direction between the inlet end and the outlet end; a pair of outer load supporting members extending between the inlet and outlet ends of the conveyor, each outer load supporting members comprising a first wall coupled to a respective side member and a second wall with a load supporting surface, the load supporting surface being disposed generally horizontally during operation of the conveyor; inner load supporting members extending between the inlet and outlet ends of the conveyor, the inner load supporting members positioned in a spaced apart relationship with each other between the pair of outer load supporting members, each inner load supporting member comprising, a first wall and a second wall with a load supporting surface, the first wall of the each inner load supporting member being disposed generally vertically during operation of the conveyor and comprising an aperture, the load supporting surface of the each inner load supporting member being disposed generally horizontally during operation of the conveyor; first braces coupled stationary, at each end thereof, to each side member of the frame, in series and in a spaced apart relationship with each other between the inlet and outlet ends of the conveyor, each first brace disposed substantially transverse to the inner and outer load supporting members and passing through aligned apertures in each load supporting member; clamps caging each first brace and disposed in pairs between first walls of a pair of adjacent members, each clamp comprising a pair of portions fastened to each other during operation of the conveyor; biasing members, each biasing member comprising a first portion stationary attached to a surface of the first wall of each inner or outer load supporting member in an alignment with a respective clamp and comprising a second portion movable in a relationship to the first portion and having one end thereof positioned in an abutting relationship with the respective clamp so as to bias each brace with an upper edge of each aperture during use of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; an indexing device mounted on the U-shaped brackets; a powered member configured to provide a reciprocal linear movement, the powered member having one end thereof coupled to the frame; and a linkage connecting an opposite end of the powered member with the indexing device.

In an embodiment, a conveyor is configured to advance a load and comprises a frame defining an inlet end and an outlet end of the conveyor; a device mounted on the frame and configured to incrementally advance the load in a direction from the inlet to the outlet end; and a device mounted on the frame and configured to move the load, disposed at the outlet end only, in a direction from the outlet end to the inlet end prior to discharge of the load from the outlet end.

In an embodiment, a method of advancing a load in a linear direction from an inlet end of a conveyor past an outlet end thereof comprises advancing the load, with a first device comprising a first portion thereof stationary mounted on the conveyor and a second portion thereof reciprocally movable in the linear direction and comprising gravity rocking advancement pushers abutting a portion of the load during movement from the inlet end to the outlet end; moving, with a second device, the load, disposed at the outlet end only, in a direction from the outlet end to the inlet end prior to discharge of the load from the outlet end; and moving the load, with the gravity rocking advancement pushers past the outlet end to discharge the load from the conveyor.

In an embodiment, the conveyor is configured to minimize horizontally disposed surfaces that span a distance between the inlet and outlet ends and that are positioned below the load supporting surfaces. This aspect is at least advantageous in sanitary applications to at least minimize collection of debris or waste product falling from loads carried on load supporting surfaces.

In an embodiment, the conveyor is configured to use independent force exerting members to move the load positioned at the outlet end only in a direction toward the inlet end, with such independent force exerting members being operable by an independent powered member.

In an embodiment, the conveyor is configured to use only a single powered member to incrementally move or advance a plurality of loads, positioned in a plurality of rows across a width of the conveyor, during a single stroke of the single powered member.

In an embodiment, the conveyor is configured to use only a single powered member to move a plurality of loads, positioned in a single row across a width of the conveyor.

In an embodiment, the conveyor is configured to engage the loads with force exerting members and advance the loads positioned and supported only on load supporting surfaces.

In an embodiment, the conveyor is configured to move the loads with force exerting members in a first direction from inlet end to the outlet end and move the force exerting members in an opposite second direction without moving the loads in such second direction In an embodiment, the conveyor is configured to maintain position of the load carrying members in a vertical direction only with members that are disposed transverse to such load supporting members.

In an embodiment, the conveyor is configured to maintain the load supporting members in tension with side members of the conveyor frame with one or more braces disposed transverse to such load supporting members.

In an embodiment, the conveyor is configured to move loads in absence of load supporting surface(s) being chain type conveyor surface(s).

In an embodiment, the conveyor is configured for use as a free standing conveyor.

In an embodiment, two or more conveyors can be coupled together, in a series with each other along the travel path, at the side members thereof.

In an embodiment, two or more conveyors can be coupled together laterally, transverse to the travel path, to increase number of rows of the load.

In an embodiment, two or more conveyors can be coupled together, in a series with each other along the travel path, at the side members thereof and can be further coupled together laterally, transverse to the travel path, as is best shown in FIG. 25.

In any of the embodiments, the conveyor, indexing device or method can comprise a controller or a control circuit to control operation of the powered device(s) and sensors. The controller or the control circuit can comprise any one of electric components, pneumatic components, hydraulic components and any combination thereof. The selection of control components at least partially depends on the selection of the drive member 130, 190. As been described above, the control circuit for pneumatic or hydraulic drive member 130, 190 comprises at least solenoid valves. It would be understood that in applications with the drive member 130, 190 of electrical type, the control circuit will not comprise valves and will generally comprise relays, motor drivers and other suitable control components.

In any of the embodiments, the force exerting member 150, being illustrated as a one-piece unitary device pivotally mounted on one side of the movable carrying member can be provided as a pair of members 150, each pivotally mounted on each side of the carrying member 120.

In an embodiment, a conveyor for incrementally advancing or indexing a plurality of rows of loads with a plurality of loads in each row comprises a frame; a powered member coupled to the frame; and a conveyance means for incrementally advancing or indexing the plurality of rows of loads with the plurality of loads in each row. In an example, the conveyance means comprises the braces 70, the brackets 80, the receptacles 100, the carrying members 120, the load supporting members 210 and 220, and the gravity dropout force exerting members 150 pivotally mounted on the carrying members 120. In an example, the conveyance means comprises the braces 270, the brackets 80, the receptacles 100, a single carrying member 120, a pair of load supporting members 220, and gravity dropout force exerting members 150 pivotally mounted on the carrying member 120.

In an embodiment, the conveyance means comprises the braces 70, the brackets 80, the receptacles 100, the carrying members 120, gravity dropout force exerting members 150, linkage 250 and the powered member 130.

In an embodiment, the conveyance means comprises the brackets 80, the receptacles 100, the carrying members 120, gravity dropout force exerting members 150, linkage 250 and the powered member 130.

In an example, the conveyance means comprises chains 322 and gravity dropout force exerting members 150 pivotally mounted on the chains 322.

In an embodiment, the conveyance system can be configured to fully, or partially, capture with precise placement the load being any one of box, case, container, board, cart, crate, pallet, circuit board, book/bound item (including newspaper), bundle, mold, device, component, wheel, tray, bag/sack, or other ridged or semi-ridged item that can be indexed for a process, timed hold, or general conveyance.

In an embodiment, the conveyance system can be manually operated or automated.

In an embodiment, the conveyance system can use an energy operated source (air, hydraulic, electric, etc.) or can be moved by a person, or other.

In an embodiment, the conveyance can be made out of virtually any materials; wood, aluminum, steel, stainless, steel or other.

In an embodiment, the conveyance system can be configured with adjustable legs or feet, with a minimal frame, in this case a tee bar. The adjustable legs or feet allow for floors sloped with drainage, or to set an elevation that is best suited for the end user.

In an embodiment, a frame of the conveyor is simple in design to minimize redundancy in parts, and limits/mitigates interferences which could hinder the serviceability.

In an embodiment, the load supporting member in a shape of a tee bar allows for a suitable surface area for the product or load 2 to travel on without the necessity for a solid top, or near solid top, and allows for clean ability.

In an embodiment, the conveyance system can be adapted with uniform bracketry that allows for multiple options to/for connection to other conveyors, devices or equipment; so the indexing table can be stand alone or interface with other equipment or a table, robot, gripper, or fall/slide/other into a bin/pallet/crate/box or other means of infeed handling or discharge handling. Covers can also be implemented for cylinders or chains, or other devises that need a cover in case of a leak, or ruptured hose or seal, etc.

In an embodiment, a drive system (powered device) can be any one of many device types, such as a hydraulic cylinder, pneumatic cylinder, mechanized chain or mechanized bar (or other stock), servo or any other devise to advance or retract the indexers.

In an embodiment, indexers, or indexing bars, or carrying members attached with a multilane linkage move multiple products linearly or at an incline, vertical, upside down (utilizing a retractable or gravity pusher bar(s), hook(s), magnet(s), vacuum/suction cup(s), or other) with a forward and return or cyclical stroke with a repeatable motion or a variable motion. The indexers can be placed along-side each other to have an overlapping design for the transfer of product, or inline design to push the product over the return position of the next indexing bar in the sequence.

In an embodiment, the indexers can have a single contactor per indexer or multiple contactors per indexer (a contactor would be any means of contacting or conveying the product; retractable or gravity pusher bar, a vacuum/suction cup, a magnet, a hook, or other).

In an embodiment, the conveyance system can be configured with an optional hood to cover the conveyor from dust, overhead dripping, or other airborne items that could cause contamination of the product, or make the product unsuitable. The hood can be configured to span the width and length of the conveyor with a removable piece that bridges from one lanes hood to the adjoining lanes hood, with a built in slope based on a bracket that affixes to the legs of the conveyor. The removable piece can be set into a formed receptacle on the perimeter of the hood, which lifts out for cleaning, and the removable piece also has a formed edge that retains it in the trough. Under hood, lighting/spectrum packages can be also available.

The conveyor 10 or 200 can be used in various applications. In an embodiment, the conveyor 10 or 200 can replace belt conveyor 10a/10b as disclosed in U.S. Pat. No. 7,269,935 B2 issued to Jafari on Sep. 18, 2007, the entire contents of which are incorporated herein by reference. Thus, the conveyor 10 or 200 can be configured for use in applications for wrapping pavers, bricks. In other words, a machine for wrapping pavers, cement blocks or lumber with flexible film and banner film can comprise the above described conveyor 10 or 200 or any modifications thereof. For example, the conveyor 10 can be adapted to move only a single row of loads during a single stroke of the powered member 130.

In an embodiment, the conveyor 10 or 200 can replace belt conveyor 12 as disclosed in U.S. Pat. No. 9,103,595 B2 issued to Clurket on Aug. 11, 2015, the entire contents of which are incorporated herein by reference. Thus, the conveyor 10 or 200 can be configured for use in a shrink wrap tunnel machine or application. In other words, a shrink wrap tunnel machine can comprise the above described conveyor 10 or 200 or any modifications thereof. For example, the conveyor 10 can be adapted to move only a single row of loads during a single stroke of the powered member 130.

In an embodiment, the conveyor 10 or 200 can be integrated within a case packer for example such as Item PC-2500 "Continuous Motion Wraparound Case Packer" or item 65TW-28 "Tray Wrapper Shrink Packaging System", both manufactured by ARPAC, LLC of Schaumburg, Ill. Thus, the conveyor 10 or 200 can be configured for use in a machine or application for wrapping trayed metal cans, paper cans, glass jars, glass bottles, plastic jars and plastic bottles and boxes. In other words, a machine for wrapping trayed metal cans, paper cans, glass jars, glass bottles, plastic jars and plastic bottles and boxes can comprise the above described conveyor 10 or 200 or any modifications thereof. For example, the conveyor 10 can be adapted to move only a single row of loads during a single stroke of the powered member 130.

In particular embodiments, such machine is a case packer.

In particular embodiments, such machine is a shrink wrap machine.

In particular embodiments, such machine is an oven that is configured to cook or bake, with electrical resistance, dough transported on the conveyors in special bread containers with electrically conductive pans.

In some of the above embodiments, any one of the indexing device, the conveyance means and the conveyor is configured to be easily cleaned, easily maintained, with minimal standardized parts, easily disassembled and reassembled for shipment, with sufficient clearances (more than a half an inch near any moving part) to minimize/mitigate safety concerns, while having the ability to accurately place/stage the product in a precise location on every cycle. At least the embodiments of FIGS. 1-18, 21 and 25-27 do not contain components requiring lubrication and such are void of an environment exposed to any undesirable lubricants.

At least the embodiments of FIGS. 1-18, 21 and 25-27 can enable a precise placement of the load 2. Particularly, with electrically operated drives and motor control, the loads 2 can be advanced with tolerance of about thousand(s) of an inch and aligned with respective machine stations. There are many reasons a product may be in a precise location such as filling a specific ingredient, multiple ingredients and single or multiple stations, time delay (time lapse) to allow for a process to meet thresholds before a next step (heating, cooling, freezing, liquefying, vaporizing, boiling, cooking, culturing, basting, fermenting, etc.), mixing, assembling, welding, soldering, mounting, forming (including box forming or tray forming), threading, attaching/affixing, extraction or removing, cutting, filing, deburring, drilling, milling, applicators, wrapping, banding, strapping, shrink wrapping, bundling, stacking, compacting, gluing, printing, labelling, inflating, deflating, prepping for shipment (packing foam or other) scanning, painting, coloring, cleaning, sanitizing, curing, seasoning, chemical reaction or a variety of other applications.

In an embodiment, a conveyor is provided for incrementally advancing or indexing a plurality of rows of loads with a plurality of loads in each row. The conveyor comprises a conveyance means for incrementally advancing or indexing the plurality of rows of loads with the plurality of loads in each row along a conveyance path, and a single powered member coupled to the conveyance means and operable to move the conveyance means.

A feature of this embodiment is that the conveyance means comprises a pair of outer load supporting members extending between the inlet and outlet ends of the conveyor, each outer load supporting members comprising a first wall coupled to a respective side member and a second wall with a load supporting surface, the load supporting surface being disposed generally horizontally during operation of the conveyor; inner load supporting members extending between the inlet and outlet ends of the conveyor, the load inner supporting members positioned in a spaced apart relationship with each other between the pair of outer load supporting members, each inner load supporting member comprising a first wall and a second wall with a load supporting surface, the first wall of the each inner load supporting member being disposed generally vertically during operation of the conveyor and comprising an aperture, the load supporting surface of the each inner load supporting member being disposed generally horizontally during operation of the conveyor; braces coupled stationary, at each end thereof, to each side member of the frame, in series and in a spaced apart relationship with each other between the inlet and outlet ends of the conveyor, each brace disposed substantially transverse to the load supporting members and passing through aligned apertures in each load supporting member; clamps caging each brace and being disposed in pairs between first walls of a pair of adjacent members, each clamp comprising a pair of portions fastened to each other during operation of the conveyor; biasing members, each biasing member comprising a first portion stationary attached to a surface of the first wall of each member in an alignment with a respective clamp and comprising a second portion movable in a relationship to the first portion and having one end thereof positioned in an abutting relationship with the respective clamp so as to bias each brace with an upper edge of each aperture during use of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; and an indexing device. A feature of this embodiment is that the apparatus further comprises additional braces stationary disposed mediate the inlet and outlet ends in a direction transverse to a direction therebetween, each additional brace comprising first brace apertures in the first wall of each load supporting members, second brace apertures in the side members of the frame in an alignment with the first brace apertures, spacers disposed between surfaces of the first walls of adjacent load supporting members and having each end in an abutting relationship therewith, third brace apertures in the spacers oriented in the direction transverse to the direction between the inlet and outlet ends and in an alignment with the first and second brace apertures, and an elongated member passed through the aligned first, second and third brace apertures and having each end thereof secured to a respective side member of the frame.

A feature of this embodiment is that the indexing device comprises: receptacles disposed in series with each other between the inlet and outlet ends of the conveyor and in a space between a pair of adjacently disposed load supporting members, each receptacle coupled stationary to a respective U-shaped bracket, the each receptacle comprising a pair of vertically disposed walls; carrying members, each carrying member positioned for a reciprocal linear movement between the pair of vertical surfaces in each receptacle and between a pair of the adjacent members, the carrying member extending between the inlet and outlet ends of the conveyor; force exerting members disposed in series with each other between the inlet and outlet ends of the conveyor, each force exerting member comprising a front end and a rear end, the rear end being heavier than the front end; a pivotal connection between each force exerting member and a respective carrying member; each force exerting member pivotable between a load engaging position and a non-load engaging position on the carrying member and movable with the carrying member in the reciprocal linear movement; stops, each stop rigidly coupled to the carrying member and positioned to maintain the front end of a respective force exerting member in the load engaging position; the front end has at least a portion thereof extending outwardly, in the load engaging position, from load supporting surfaces of the spaced apart members and in a abutting relationship with a portion of the load during operation of the conveyor, the abutting relationship causing an incremental advancement of the load between the inlet and outlet ends during a linear movement of the carrying member in a first direction; the front end and the rear end being at least partially disposed, in the non-load engaging position, below the load supporting surfaces during the linear movement of the carrying member in an opposite second direction; and the reciprocal linear movement in the first direction of the force exerting members advances the load from the inlet end to the outlet end.

A feature of this embodiment is that the conveyor further comprises a device configured to move the load(s) in a reversed or retracted direction from the outlet end to the inlet end when the load(s) is disposed at the outlet end. The device comprises edge slots in the first wall of each of the pair of outer load supporting members and the inner load supporting members; a bearing block coupled to each first wall in an alignment with a respective edge slot; a shaft passed through each bearing block; a pawl secured on the shaft for a rotation thereof; and another powered member coupled with a link to the pawl and operable to pivot the shaft and the pawl in the direction from the outlet end to the inlet end to move the load, disposed at the outlet end in the reversed or retracted direction.

A feature of this embodiment is that the conveyor further comprises a frame and wherein the conveyance means comprises a portion thereof being mechanically fastened to the frame.

A feature of this embodiment is that the conveyor further comprises a sensor positioned and operable to sense a position of the load so as to reverse an operating direction of the powered member.

A feature of this embodiment is that the conveyor further comprises a sensor positioned to sense a presence or an absence of the load moving along the conveyance path.

A feature of this embodiment is that the powered member comprises a pneumatic or hydraulic cylinder.

A feature of this embodiment is that the conveyor further comprises at least one transmitter and at least one receiver aligned across a width of the conveyor with the at least one transmitter.

A feature of this embodiment is that the conveyor further comprises a control member.

In an embodiment, a conveyor is configured to advance a plurality of rows of loads with a plurality of loads in each row. The conveyor comprises a frame defining an inlet end and an outlet end of the conveyor, the frame comprising end members and a pair of side members, each side member coupled to a pair of end members in a direction between the inlet end and the outlet end; a pair of outer load supporting members extending between the inlet and outlet ends of the conveyor, each outer load supporting members comprising a first wall coupled to a respective side member and a second wall with a load supporting surface, the load supporting surface being disposed generally horizontally during operation of the conveyor; inner load supporting members extending between the inlet and outlet ends of the conveyor, the load inner supporting members positioned in a spaced apart relationship with each other between the pair of outer load supporting members, each inner load supporting member comprising, a first wall and a second wall with a load supporting surface, the first wall of the each inner load supporting member being disposed generally vertically during operation of the conveyor and comprising an aperture, the load supporting surface of the each inner load supporting member being disposed generally horizontally during operation of the conveyor; first braces coupled stationary, at each end thereof, to each side member of the frame, in series and in a spaced apart relationship with each other between the inlet and outlet ends of the conveyor, each first brace disposed substantially transverse to the load supporting members and passing through aligned apertures in each load supporting member; clamps caging each first brace and disposed in pairs between first walls of a pair of adjacent members, each clamp comprising a pair of portions fastened to each other during operation of the conveyor; biasing members, each biasing member comprising a first portion stationary attached to a surface of the first wall of each member in an alignment with a respective clamp and comprising a second portion movable in a relationship to the first portion and having one end thereof positioned in an abutting relationship with the respective clamp so as to bias each brace with an upper edge of each aperture during use of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; receptacles, disposed in series with each other between the inlet and outlet ends of the conveyor and in a space between a pair of adjacently disposed load supporting members, each receptacle comprising a pair of vertically disposed walls, each receptacle coupled stationary to a respective U-shaped bracket; liners, each liner comprising a low friction material and being coupled to an interior of each vertically disposed wall; carrying members, each carrying member positioned for a reciprocal linear movement between liners in each receptacle and between a pair of the adjacent members, the carrying member extending between the inlet and outlet ends of the conveyor; second braces stationary disposed mediate the inlet and outlet ends in a direction transverse to a direction therebetween, each second brace comprising first brace apertures in the first wall of each load supporting members, second brace apertures in the side members of the frame in an alignment with the first brace apertures, spacers disposed between surfaces of the first walls of adjacent load supporting members and having each end in an abutting relationship therewith, third brace apertures in the spacers oriented in the direction transverse to the direction between the inlet and outlet ends and in an alignment with the first and second brace apertures, and an elongated member passed through the aligned first, second and third brace apertures and having each end thereof secured to a respective side member of the frame; a powered member configured to provide the reciprocal linear movement, the powered member having one end thereof coupled to the frame; a linkage comprising a link disposed transverse to the reciprocal linear movement, the link having a pivotal connection with an opposite end of the powered member and a plurality of coupling members, a portion of the plurality of coupling members spaced apart from each other adjacent a respective carrying member, each coupling member comprising one end thereof coupled to a respective carrying member and comprising a second end coupled to the link; force exerting members disposed in series with each other between the inlet and outlet ends of the conveyor, each force exerting member comprising a front end and a rear end, the rear end being heavier than the front end; a pivotal connection between each force exerting member and a respective carrying member; each force exerting member pivotable between a load engaging position and a non-load engaging position on the carrying member and movable with the carrying member in the reciprocal linear movement; stops, each stop rigidly coupled to the carrying member and positioned to maintain the front end of a respective force exerting member in the load engaging position; the front end has at least a portion thereof extending outwardly, in the load engaging position, from load supporting surfaces of the spaced apart members and in a abutting relationship with a portion of the load during operation of the conveyor, the abutting relationship causing an incremental advancement of the load between the inlet and outlet ends during a linear movement of the carrying member in a first direction; the front end and the rear end being at least partially disposed, in the non-load engaging position, below the load supporting surfaces during the linear movement of the carrying member in an opposite second direction; and the reciprocal linear movement in the first direction of the force exerting members advances the load from the inlet end to the outlet end.

A feature of this embodiment is that the load supporting surface of each inner load supporting member or each outer load supporting member comprises a substantially smooth surface.

A feature of this embodiment is that the load supporting surface of each inner load supporting member or each outer load supporting member comprises rollers mounted for a rotation.

In an embodiment, an indexing device is provided for a conveyor that conveys a load along a conveyance path between an inlet end and an outlet end of the conveyor, the load is being supported on a pair of spaced apart load supporting members during conveyance, the indexing device comprises a receptacle mounted in a stationary position between the pair of spaced apart load supporting members, the receptacle defining a pair of walls disposed substantially vertically and an interior between inner surfaces of the pair of walls; a carrying member positioned for a linear movement in the interior between the pair of walls; a force exerting member configured to abut the load during use of the conveyor; a connection between the force exerting member and the carrying member; and a linkage coupling the carrying member to a powered member.

A feature of this embodiment is that the connection is a pivotal connection; the force exerting member pivots between a load engaging position and a non-load engaging position on the carrying member and moves with the carrying member; the front end has at least a portion thereof extending outwardly, in the load engaging position, from load carrying surfaces of the spaced apart load supporting members and in an abutting relationship with a portion of the load during operation of the indexing device, the abutting relationship causing an incremental advancement of the load between the inlet and outlet ends during the linear movement of the carrying member in a first direction; the front end and the rear end being at least partially disposed, in the non-load engaging position, below or even with the load carrying surfaces during the linear movement of the carrying member in an opposite second direction; the linear movement of the force exerting member in the first direction advances the load from the inlet end to the outlet end.

In an embodiment, an indexing device is provided a conveyor that conveys a series of loads along a conveyance path between an inlet end and an outlet end of the conveyor, the loads being supported on a pair of load supporting members spaced apart in a direction normal to the conveyance path, the indexing device comprises receptacles mounted in a stationary position, in series with each other, between the inlet and outlet ends of the conveyor and between the pair of spaced apart load supporting members, each receptacle defining a pair of vertically disposed walls and an interior between inner surfaces of the pair of walls; a carrying member positioned for a linear movement in the interior in each receptacle; force exerting members disposed in series with each other between the inlet and outlet ends of the conveyor and between the pair of spaced apart load supporting members, each force exerting member comprising a front end and a rear end; a pivotal connection between each force exerting member and the carrying member; each force exerting member pivots between a load engaging position and a non-load engaging position on the carrying member and moves with the carrying member; the front end has at least a portion thereof extending outwardly, in the load engaging position, above load carrying surfaces of the spaced apart load supporting members and in an abutting relationship with a portion of a respective load during operation of the indexing device, the abutting relationship causing an incremental advancement of the load between the inlet and outlet ends during the linear movement of the carrying member in a first direction; the front end and the rear end being at least partially disposed, in the non-load engaging position, below or even with the load carrying surfaces during the linear movement of the carrying member in an opposite second direction; and the linear movement of the force exerting members in the first direction advances the loads from the inlet end to the outlet end. The indexing device can further comprise liners, each liner comprising a low friction material and being coupled to an interior of each vertically disposed wall.

In an embodiment, an indexing device is provided a conveyor that conveys a series of loads along a conveyance path between an inlet end and an outlet end of the conveyor, the loads being supported on a pair of load supporting members spaced apart in a direction normal to the conveyance path, the indexing device comprises receptacles mounted in a stationary position, in series with each other, between the inlet and outlet ends of the conveyor and between the pair of spaced apart load supporting members, each receptacle defining a pair of vertically disposed walls and an interior between inner surfaces of the pair of walls; a carrying member positioned for a linear movement in the interior in each receptacle; force exerting members disposed in series with each other between the inlet and outlet ends of the conveyor and between the pair of spaced apart load supporting members, each force exerting member comprising a front end and a rear end; a pivotal connection between each force exerting member and the carrying member; a linkage coupling the carrying member with a powered member; each force exerting member pivots between a load engaging position and a non-load engaging position on the carrying member and moves with the carrying member; the front end has at least a portion thereof extending outwardly, in the load engaging position, above load carrying surfaces of the spaced apart load supporting members and in an abutting relationship with a portion of a respective load during operation of the indexing device, the abutting relationship causing an incremental advancement of the load between the inlet and outlet ends during the linear movement of the carrying member in a first direction; the front end and the rear end being at least partially disposed, in the non-load engaging position, below or even with the load carrying surfaces during the linear movement of the carrying member in an opposite second direction; and the linear movement of the force exerting members in the first direction advances the loads from the inlet end to the outlet end.

In an embodiment, an indexing device is provided for a conveyor configured to convey an array of loads along a conveyance path, the loads being supported on load supporting members, the load supporting members are spaced apart with each other in a direction normal to the conveyance path, the array comprising a plurality of rows of loads with a plurality of loads in each row, the indexing device comprises receptacles disposed in the array pattern; carrying members extending between inlet and outlet ends of the conveyor, each carrying member mounted for a linear movement on two or more receptacles between a pair of adjacent load supporting members; force exerting members disposed in the array pattern between the inlet and outlet ends of the conveyor and adjacent the carrying members, each force exerting member comprising a front end and a rear end; a connection between each force exerting member and a respective carrying member; and a linkage coupling the carrying members to a powered member.

A feature of this embodiment is that the receptacles are mounted stationary.

A feature of this embodiment is that each receptacle comprises a pair of walls disposed vertically during use of the indexing devices, each carrying member is disposed for the linear movement in a gap between the pair of walls.

A feature of this embodiment is that the receptacles are mounted for the linear movement on the load supporting members in the conveyor.

A feature of this embodiment is that each receptacle comprises: a pair of first flanges disposed substantially horizontally along the conveyance path during use of the indexing device; a pair of second flanges, each connecting one first flange from the pair of first flanges to a load supporting member; a member disposed substantially horizontally during use of the indexing device between a pair of adjacent load supporting members; a female receptacle on each edge of the member, each edge being disposed along the conveyance path, the female receptacle being sized and shaped to receive the one first flange from the pair of first flanges; a connection between the member and one carrying member; and a connection between the member and the linkage.

A feature of this embodiment is that each receptacle comprises a wall disposed vertically during use of the indexing devices, the wall comprising one of a recess and a protrusion and wherein each carrying member comprises an opposite one of the recess and protrusion, the recess and the protrusion being sized and shaped complimentary to each other so as to enable the linear movement of each carrying member in a relationship to each receptacle.

A feature of this embodiment is that the front end comprises one of a recess, a protrusion and a combination thereof.

A feature of this embodiment is that the front end is enlarged to extend above at least one load supporting member during use of the indexing device.

A feature of this embodiment is that the connection is a pivotal connection; the force exerting member pivots between a load engaging position and a non-load engaging position on the carrying member and moves with the carrying member; the front end has at least a portion thereof extending outwardly, in the load engaging position, from load carrying surfaces of the spaced apart load supporting members and in an abutting relationship with a portion of the load during operation of the indexing device, the abutting relationship causing an incremental advancement of the load between the inlet and outlet ends during the linear movement of the carrying member in a first direction; the front end and the rear end being at least partially disposed, in the non-load engaging position, so that not to move a respective load during the linear movement of the carrying member in an opposite second direction; the linear movement of the force exerting member in the first direction advances the load from the inlet end to the outlet end.

A feature of this embodiment is that each carrying member comprises a base with a pair of portions, each of the pair of portions having a J-shaped configuration in a plane transverse to a length of each carrying member; each receptacle comprising a T-shaped configuration in the plane transverse to the length of the carrying member, each receptacle is sized to fit within the base.

A feature of this embodiment is that each carrying member comprises a base with a pair of portions, each of the pair of portions having an L-shaped configuration in a plane transverse to a length of each carrying member; each receptacle comprising a U-shaped configuration in the plane transverse to the length of the carrying member, each receptacle is sized to fit within the base.

A feature of this embodiment is that indexing device further comprises a liner comprising a material with low friction characteristics, the liner comprising a U-shaped configuration in the plane transverse to the length of the carrying member, the liner being disposed between the base and the U-shaped configuration of each receptacle.

In an embodiment, a device is provided for a conveyor configured to convey a single row of loads along a conveyance path in a first direction, the loads being supported on load supporting members during conveyance, the load supporting members are being spaced apart with each other in a second direction being normal to the conveyance path, the loads being disposed in the second direction normal, the device comprises a single row of receptacles disposed in the second directions; a single row of carrying members, each carrying member mounted for a linear movement on a respective receptacle between a pair of adjacent load supporting members; a single row of force exerting members, each force exerting member coupled either pivotally or stationary to a respective carrying member, each force exerting member comprising a front end and a rear end; and a connection between each force exerting member and a respective carrying member. In this embodiment, a linkage couples the carrying members to a powered member.

In an embodiment, a conveyor configured to advance a load along a conveyance path comprises a frame defining an inlet end and an outlet end of the conveyor; a pair of load supporting members extending between the inlet and outlet ends of the conveyor, the pair of load supporting members positioned in a spaced apart relationship with each other, each load carrying member comprising, a first wall and a second wall with a load carrying surface, the first wall being disposed generally vertically during operation of the conveyor, the load carrying surface being disposed generally horizontally during operation of the conveyor; braces coupled stationary, at each end thereof, to the frame or to each load carrying member, in series and in a spaced apart relationship with each other between the inlet and outlet ends of the conveyor, each brace disposed transverse to the pair of load supporting members; U-shaped brackets, each U-shaped bracket comprising a pair of flanges coupled stationary to a respective brace and further comprising a surface disposed substantially horizontally during use of the conveyor; receptacles, each receptacle coupled stationary to a respective U-shaped bracket, in series with each other between the inlet and outlet ends of the conveyor and in a space between the pair of members, each receptacle defining a pair of vertically disposed walls; liners, each liner comprising a low friction material and being coupled to an interior of each vertically disposed wall; a carrying member positioned for a reciprocal linear movement between liners in each receptacle; a powered member configured to provide the reciprocal linear movement; a coupling member comprising one end thereof coupled to the carrying member and comprising a second end coupled to the powered member; force exerting members disposed in series with each other between the inlet and outlet ends of the conveyor, each force exerting member comprising a front end and a rear end, the rear end being heavier than the front end; a pivotal connection between each force exerting member and the carrying member; each force exerting member pivotable between a load engaging position and a non-load engaging position on the carrying member and movable with the carrying member in the reciprocal linear movement; stops, each stop rigidly coupled to the carrying member and positioned to maintain the front end of a respective force exerting member in the load engaging position; the front end has at least a portion thereof extending outwardly, in the load engaging position, from load carrying surfaces of the spaced apart member and in a abutting relationship with a portion of the load during operation of the conveyor, the abutting relationship causing an incremental advancement of the load between the inlet and outlet ends during a linear movement of the carrying member in a first direction; the front end and the rear end being at least partially disposed, in the non-load engaging position, below the load carrying surfaces during the linear movement of the carrying member in an opposite second direction; and the reciprocal linear movement of the force exerting members in the first direction advances the load from the inlet end to the outlet end.

A feature of this embodiment is that the conveyor can further comprise additional braces stationary disposed mediate the inlet and outlet ends in a direction transverse to a direction therebetween, each additional brace comprising first brace apertures in the first wall of each load supporting members, second brace apertures in the frame in an alignment with the first brace apertures, a spacer disposed between surfaces of the first walls of each load supporting members and having each end in an abutting relationship therewith, third brace apertures in the spacer oriented in the direction transverse to the direction between the inlet and outlet ends and in an alignment with the first and second brace apertures, and an elongated member passed through the aligned first, second and third brace apertures and having each end thereof secured to the frame.

A feature of this embodiment is that the frame comprises a pair of side members and wherein the second brace apertures are formed through a thickness of each side member.

A feature of this embodiment is that the conveyor can further comprise a device configured to move the load in a reversed or retracted direction from the outlet end to the inlet end when the load is disposed at the second end, the device comprising edge slots in the first wall of each load carrying member; a bearing block coupled to each first wall in an alignment with a respective slot; a shaft passed through each bearing block; a pawl secured on the shaft for a rotation thereof; and another powered drive coupled with a link to the pawl and operable to pivot the shaft and the pawl in the direction from the outlet end to the inlet end to move the load, disposed at the outlet end, a small increment.

A feature of this embodiment is that the conveyor can further comprise a sensor positioned and operable to sense a position of the load so as to reverse an operating direction of the powered means.

A feature of this embodiment is that the conveyor can further comprise a sensor positioned to sense a presence or an absence of the load translating on the pair of load supporting members.

In an embodiment, a conveyor, configured to advance a load along a conveyance path, comprises a frame defining an inlet end and an outlet end of the conveyor, the frame comprising end members and a pair of side members, each side member coupled to a pair of end members in a direction between the inlet end and the outlet end; load supporting members extending between the inlet and outlet ends of the conveyor, the load supporting members positioned in a spaced apart relationship with each other, each load carrying member comprising, a first wall and a second wall with a load carrying surface, the first wall being disposed generally vertically during operation of the conveyor and comprising an aperture, the load carrying surface being disposed generally horizontally during operation of the conveyor; first braces coupled stationary, at each end thereof, to each side member of the frame, in series and in a spaced apart relationship with each other between the inlet and outlet ends of the conveyor, each first brace disposed substantially transverse to the load supporting members and passing through aligned apertures in each load carrying member; clamps caging each first brace and disposed in pairs between first walls of a pair of adjacent members, each clamp comprising a pair of portions fastened to each other during operation of the conveyor; biasing members, each biasing member comprising a first portion stationary attached to a surface of the first wall of each member in an alignment with a respective clamp and comprising a second portion movable in a relationship to the first portion and having one end thereof positioned in an abutting relationship with the respective clamp so as to bias each brace with an upper edge of each aperture during use of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; L-shaped members coupled, in pairs, stationary to a respective U-shaped bracket, in series with each other between the inlet and outlet ends of the conveyor and in a space between a pair of adjacently disposed members, each pair of the L-shaped members defining a receptacle with a pair of vertically disposed walls; liners, each liner comprising a low friction material and being coupled to an interior of each vertically disposed wall; carrying members, each carrying member positioned for a reciprocal linear movement between liners in each receptacle and between a pair of the adjacent members, the carrying member extending between the inlet and outlet ends of the conveyor; second braces stationary disposed mediate the inlet and outlet ends in a direction transverse to a direction therebetween, each second brace comprising first brace apertures in the first wall of each load supporting members, second brace apertures in the side members of the frame in an alignment with the first brace apertures, spacers disposed between surfaces of the first walls of adjacent load supporting members and having each end in an abutting relationship therewith, third brace apertures in the spacers oriented in the direction transverse to the direction between the inlet and outlet ends and in an alignment with the first and second brace apertures, and an elongated member passed through the aligned first, second and third brace apertures and having each end thereof secured to a respective side member of the frame; a powered member configured to provide the reciprocal linear movement, the powered member having one end thereof coupled to the frame; a linkage comprising a carrier disposed transverse to the conveyance path, the carrier having a pivotal connection with an opposite end of the powered member and a plurality of coupling members, a portion of the plurality of coupling members spaced apart from each other adjacent a respective carrying member, each coupling member comprising one end thereof coupled to a respective carrying member and comprising a second end coupled to the carrier; force exerting members disposed in series with each other between the inlet and outlet ends of the conveyor between the inlet and outlet ends, each force exerting member comprising a front end and a rear end, the rear end being heavier than the front end; a pivotal connection between each force exerting member and the carrying member; each force exerting member pivotable between a load engaging position and a non-load engaging position on the carrying member and movable with the carrying member in the reciprocal linear movement; stops, each stop rigidly coupled to the carrying member and positioned to maintain the front end of a respective force exerting member in the load engaging position; the front end has at least a portion thereof extending outwardly, in the load engaging position, from load carrying surfaces of the spaced apart members and in a abutting relationship with a portion of the load during operation of the conveyor, the abutting relationship causing an incremental advancement of the load between the inlet and outlet ends during a linear movement of the carrying member in a first direction; the front end and the rear end being at least partially disposed, in the non-load engaging position, below the load carrying surfaces during the linear movement of the carrying member in an opposite second direction; and the reciprocal linear movement in the first direction of the force exerting members advances the load from the inlet end to the outlet end. In an embodiment, a kit for production of a free-standing conveyor from a plurality of interfitting parts comprises a frame comprising four tubular end members configured for vertical positioning during use of the conveyor, two tubular cross braces and two longitudinal side members, each longitudinal side member comprising apertures disposed adjacent and spaced from each end thereof, the longitudinal side members, when connected to the four tubular end members, define an inlet end and an outlet end of the conveyor; elongated members, each elongated member comprising a first wall and a second wall with a load carrying surface, the first wall being disposed generally vertically during operation of the conveyor and comprising apertures spaced apart along a length of each elongated members and biasing members, each biasing member disposed between a peripheral edge of a respective aperture and a free edge of the first wall and comprising a first portion stationary attached to a surface of the first wall of each member in an alignment with a respective clamp and comprising an second portion movable in a relationship to the first portion, the load carrying surface being disposed generally horizontally during operation of the conveyor; braces; clamps, each clamp comprising a pair of portions fastened to each other during operation of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; L-shaped members, each L-shaped member having one leg thereof configured for fastening to the surface of each U-shaped bracket during assembly of the conveyor; liners, each liner comprising a low friction material and being coupled to an interior surface of another leg of a respective L-shaped member; elongated rails; a powered member comprising a stationary portion and a movable portion thereof being configured for a reciprocal linear movement; a link member comprising a carrier disposed transverse to the having a means for a pivotal connection with a distal end of the movable member and flanges disposed in a spaced apart relationship on and from one exterior surface of the carrier; plurality of coupling members, each coupling member comprising one end thereof configured for coupling, with fasteners, to a respective rail and comprising a second end thereof configured for coupling, with fasteners, to the link member; force exerting members, each force exerting member comprising a front end and a rear end, the rear end being heavier than the front end; a pivotal connection between each force exerting member and a respective rail; and stops, each stop being rigidly coupled to each rail in a proximity to a respective pivotal connection.

In an embodiment, a conveyor, configured to advance a load along a conveyance path comprises a frame defining an inlet end and an outlet end of the conveyor; a device mounted on the frame and configured to advance the load in a direction from the inlet end to the outlet end; and a device mounted on the frame and configured to move the load, disposed at the outlet end only, in a direction from the outlet end to the inlet end prior to discharge of the load outwardly from the outlet end.

A feature of this embodiment is that the conveyor further comprises a device coupled to the outlet end and configured to receive the load discharged therefrom.

In an embodiment, a method is provided for advancing a load in a linear direction from an inlet end of a conveyor past an outlet end thereof, the method comprises advancing the load, with a first device comprising a first portion thereof stationary mounted on the conveyor and a second portion thereof reciprocally movable in the linear direction and comprising gravity rocking advancement pushers abutting a portion of the load during movement from the inlet end to the outlet end; moving, with a second device, the load, disposed at the outlet end only, in a direction from the outlet end to the inlet end prior to discharge of the load from the outlet end; and moving the load, with the gravity rocking advancement pushers past the outlet end to discharge the load from the conveyor.

In an embodiment, a conveyor that incrementally advances or indexes a plurality of rows of loads with a plurality of loads in each row, comprises a frame defining inlet and outlet ends of the conveyor, the frame comprising four vertically disposed end members and a pair of side members extending between the inlet and outlet ends, each of the pair of side members being coupled to a pair of the vertically disposed members; a conveyance means for incrementally advancing or indexing the plurality of rows of loads with the plurality of loads in each row along a conveyance path; and a single powered member coupled to the conveyance means and operable to move a portion of the conveyance means along the conveyance path.

A feature of this embodiment is that the conveyance means comprises a pair of outer load supporting members extending between the inlet and outlet ends of the conveyor, each outer load supporting members comprising a first wall disposed generally vertically during operation of the conveyor and comprising apertures and a second wall with a load supporting surface, the load supporting surface being disposed generally horizontally during operation of the conveyor; inner load supporting members extending between the inlet and outlet ends of the conveyor, the inner load supporting members positioned in a spaced apart relationship with each other between the pair of outer load supporting members, each inner load supporting member comprising a first wall and a second wall with a load supporting surface, the first wall of each inner load supporting member being disposed generally vertically during operation of the conveyor and comprising apertures, the load supporting surface of each inner load supporting member being disposed generally horizontally during operation of the conveyor; braces fastened stationary, at each end thereof, to each side member of the frame, in series and in a spaced apart relationship with each other between the inlet and outlet ends of the conveyor, each brace disposed substantially transverse to the conveyance path and passing through aligned apertures in each outer and inner load supporting member; clamps caging each brace and disposed in pairs between first walls of a pair of adjacent inner load supporting members or between one outer load supporting member and one inner load supporting member, each clamp comprising a pair of portions fastened to each other during operation of the conveyor; biasing members, each biasing member comprising a first portion stationary attached to a surface of the first wall of each load supporting member in an alignment with a respective clamp and comprising a second portion movable in a relationship to the first portion and having one end thereof positioned in an abutting relationship with the respective clamp so as to bias each brace with an upper edge of each aperture during use of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; and an indexing device.

A feature of this embodiment is that the conveyor further comprises additional braces stationary disposed mediate the inlet and outlet ends in the direction transverse to the conveyance path, each additional brace comprising first brace apertures in the first wall of each outer and inner load supporting member-a, second brace apertures in the side members of the frame in an alignment with the first brace apertures, spacers disposed between surfaces of the first walls of adjacent load supporting members and having each end in an abutting relationship therewith, third brace apertures in the spacers oriented in the direction transverse to the conveyance path and in an alignment with the first and second brace apertures, and an elongated member passed through the aligned first, second and third brace apertures and having each end thereof secured to a respective side member of the frame.

A feature of this embodiment is that the indexing device comprises receptacles disposed in series with each other between the inlet and outlet ends of the conveyor and in each space between the pair of adjacently disposed inner load supporting members or between the one outer load supporting member and the one inner load supporting member, each receptacle coupled stationary to a respective U-shaped bracket, each receptacle comprising a pair of vertically disposed wall surfaces; carrying members, each carrying member positioned for a reciprocal linear movement between the pair of vertical wall surfaces in each receptacle, the carrying members extending between the inlet and outlet ends of the conveyor; force exerting members disposed in series with each other between the inlet and outlet ends of the conveyor along a respective carrying member, each force exerting member comprising a front end and a rear end, the rear end being heavier than the front end; a pivotal connection between each force exerting member and the respective carrying member; each force exerting member pivotable between a load engaging position and a non-load engaging position on the respective carrying member and movable with the respective carrying member in the reciprocal linear movement; stops, each stop rigidly coupled to the carrying member and positioned to maintain the front end of a respective force exerting member in the load engaging position; the front end has at least a portion thereof extending outwardly, in the load engaging position, from load supporting surfaces of the spaced apart members and in an abutting relationship with a portion of the load during operation of the conveyor, the abutting relationship causing an incremental advancement of the load between the inlet and outlet ends during a linear movement of the respective carrying member in a first direction along the conveyance path; the front end and the rear end being at least partially disposed, in the non-load engaging position, below the load supporting surfaces during the linear movement of the respective carrying member in an opposite second direction; and the linear movement in the first direction of the force exerting members advances the loads in the first direction.

A feature of this embodiment is that the conveyor further comprises a device configured to move the loads in a reversed or retracted direction from the outlet end to the inlet end when the loads are disposed at the outlet end, the device comprises edge slots in the first wall of each of the pair of outer load supporting members and the inner load supporting members; a bearing block coupled to each first wall in an alignment with a respective edge slot; a shaft passed through each bearing block; a pawl secured on the shaft for a rotation thereof; and another powered member coupled with a link to the pawl and operable to pivot the shaft and the pawl so as to move the loads, disposed at the outlet end in the reversed or retracted direction.

A feature of this embodiment is that the conveyor further comprises a sensor positioned and operable to sense a position of the load so as to reverse an operating direction of the powered member.

A feature of this embodiment is that the conveyor further comprises a sensor positioned to sense a presence or an absence of the load moving along the conveyance path.

A feature of this embodiment is that the powered member comprises a pneumatic or hydraulic cylinder.

A feature of this embodiment is that the conveyor further comprises at least one transmitter and at least one receiver aligned across a width of the conveyor with the at least one transmitter.

A feature of this embodiment is that the conveyor further comprises a control member.

In an embodiment, a conveyor, configured to advance a plurality of rows of loads with a plurality of loads in each row, comprises a frame defining an inlet end and an outlet end of the conveyor, the frame comprising end members and a pair of side members, each side member coupled to a pair of end members in a direction between the inlet end and the outlet end; a pair of outer load supporting members extending between the inlet and outlet ends of the conveyor, each outer load supporting members comprising a first wall with apertures and a second wall with a load supporting surface, the load supporting surface being disposed generally horizontally during operation of the conveyor; inner load supporting members extending between the inlet and outlet ends of the conveyor, the load inner supporting members positioned in a spaced apart relationship with each other between the pair of outer load supporting members, each inner load supporting member comprising a first wall and a second wall with a load supporting surface, the first wall of each inner load supporting member being disposed generally vertically during operation of the conveyor and comprising apertures, the load supporting surface of each inner load supporting member being disposed generally horizontally during operation of the conveyor; first braces fastened stationary, at each end thereof, to each side member of the frame, in series and in a spaced apart relationship with each other between the inlet and outlet ends of the conveyor, each first brace disposed substantially transverse to the direction between the inlet end and the outlet end and passing through aligned apertures in each outer and inner load supporting member; clamps caging each first brace and disposed in pairs between first walls of a pair of adjacent inner load supporting members or between one outer load supporting member and one inner load supporting member, each clamp comprising a pair of portions fastened to each other during operation of the conveyor; biasing members, each biasing member comprising a first portion stationary attached to a surface of the first wall of each outer and inner load supporting member in an alignment with a respective clamp and comprising a second portion movable in a relationship to the first portion and having one end thereof positioned in an abutting relationship with the respective clamp so as to bias each first brace with an upper edge of each aperture during use of the conveyor; U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor; receptacles, disposed in series with each other between the inlet and outlet ends of the conveyor and in a space between the pair of adjacently disposed inner load supporting members or between the one outer load supporting member and the one inner load supporting member, each receptacle comprising a pair of vertically disposed walls, each receptacle coupled stationary to a respective U-shaped bracket; liners, each liner comprising a low friction material and being coupled to an interior of each vertically disposed wall; carrying members, each carrying member positioned for a reciprocal linear movement, in the direction between the inlet end and the outlet end, between liners in each receptacle, each carrying member extending between the inlet and outlet ends of the conveyor; second braces stationary disposed mediate the inlet and outlet ends in the direction transverse to the direction between the inlet end and the outlet end, each second brace comprising first brace apertures in the first wall of each outer and inner load supporting member-a, second brace apertures in the side members of the frame in an alignment with the first brace apertures, spacers disposed between surfaces of the first walls of adjacent load supporting members and having each end in an abutting relationship therewith, third brace apertures in the spacers oriented in the direction transverse to the direction between the inlet and outlet ends and in an alignment with the first and second brace apertures, and an elongated member passed through the aligned first, second and third brace apertures and having each end thereof secured to a respective side member of the frame; a powered member configured to provide the reciprocal linear movement, the powered member having one end thereof coupled to the frame; a linkage comprising a link disposed transverse to the reciprocal linear movement, the link having a pivotal connection with an opposite end of the powered member and a plurality of coupling members, a portion of the plurality of coupling members spaced apart from each other adjacent a respective carrying member, each coupling member comprising one end thereof coupled to the respective carrying member and comprising a second end coupled to the link; force exerting members disposed in series with each other between the inlet and outlet ends of the conveyor, each force exerting member comprising a front end and a rear end, the rear end being heavier than the front end; a pivotal connection between each force exerting member and the respective carrying member; each force exerting member pivotable between a load engaging position and a non-load engaging position on the respective carrying member and movable with the respective carrying member in the reciprocal linear movement; stops, each stop rigidly coupled to the carrying member and positioned to maintain the front end of a respective force exerting member in the load engaging position; the front end has at least a portion thereof extending outwardly, in the load engaging position, from load supporting surfaces of the spaced apart outer and inner load supporting members and in an abutting relationship with a portion of the load during operation of the conveyor, the abutting relationship causing an incremental advancement of the load between the inlet and outlet ends during a linear movement of the respective carrying member in a first direction; the front end and the rear end being at least partially disposed, in the non-load engaging position, below the load supporting surfaces during the linear movement of the respective carrying member in an opposite second direction; and the reciprocal linear movement in the first direction of the force exerting members advances the load from the inlet end to the outlet end.

A feature of this embodiment is that the conveyor further comprises the load supporting surface of each inner load supporting member or each outer load supporting member comprises a substantially smooth surface.

A feature of this embodiment is that the conveyor further comprises the load supporting surface of each inner load supporting member or each outer load supporting member comprises rollers mounted for a rotation.

A feature of this embodiment is that the conveyor further comprises the conveyance means comprises braces that are affixed stationary, at each end thereof, to the frame in a spaced apart relationship with each other between the inlet end and the outlet end; stationary support brackets, each support bracket being permanently or detachably coupled to a respective brace; receptacles, each receptacle being coupled stationary to a respective support bracket and defining an interior space; rails positioned for a reciprocal linear movement within the interior space and extending between the inlet end and the outlet end; the powered member configured to provide the reciprocal linear movement of the rails; coupling members coupling each rail from the rails to the powered member; load carrying members; force exerting members disposed in series with each other between the inlet end and the outlet end, each force exerting members is in a pivotal connection with the rails, each force exerting member is pivotable between a load engaging position and a non-load engaging position on the rails and is movable with the rails in the reciprocal linear movement, enabled by the powered member, to move the container assemblies positioned and conveying on the load carrying members; and stops, each stop positioned and mounted to maintain each force exerting member in the load engaging position.

In an embodiment, a conveyor, that incrementally advances or indexes a plurality of rows of loads with a plurality of loads in each row, comprises a frame defining inlet and outlet ends of the conveyor, the frame comprising four vertically disposed end members and a pair of side members extending between the inlet and outlet ends, each of the pair of side members being coupled to a pair of the vertically disposed members; a conveyance means for incrementally advancing or indexing the plurality of rows of loads with the plurality of loads in each row along a conveyance path, the conveyance means comprising a pair of outer load supporting members extending between the inlet and outlet ends of the conveyor, each outer load supporting members comprising a first wall disposed generally vertically during operation of the conveyor and comprising apertures and a second wall with a load supporting surface, the load supporting surface being disposed generally horizontally during operation of the conveyor, inner load supporting members extending between the inlet and outlet ends of the conveyor, the inner load supporting members positioned in a spaced apart relationship with each other between the pair of outer load supporting members, each inner load supporting member comprising a first wall and a second wall with a load supporting surface, the first wall of each inner load supporting member being disposed generally vertically during operation of the conveyor and comprising apertures, the load supporting surface of each inner load supporting member being disposed generally horizontally during operation of the conveyor, braces fastened stationary, at each end thereof, to each side member of the frame, in series and in a spaced apart relationship with each other between the inlet and outlet ends of the conveyor, each brace disposed substantially transverse to the conveyance path and passing through aligned apertures in each outer and inner load supporting member, clamps caging each brace and disposed in pairs between first walls of a pair of adjacent inner load supporting members or between one outer load supporting member and one inner load supporting member, each clamp comprising a pair of portions fastened to each other during operation of the conveyor, biasing members, each biasing member comprising a first portion stationary attached to a surface of the first wall of each outer and inner load supporting member in an alignment with a respective clamp and comprising a second portion movable in a relationship to the first portion and having one end thereof positioned in an abutting relationship with the respective clamp so as to bias each brace with an upper edge of each aperture during use of the conveyor, U-shaped brackets, each U-shaped bracket comprising a pair of flanges, each of the pair of flanges being coupled rigidly to one of the pair of portions of each clamp, each U-shaped bracket further comprising a surface disposed substantially horizontally during use of the conveyor, and an indexing device; and a single powered member coupled to the indexing device.

In an embodiment, a conveyor, that incrementally advances or indexes a plurality of rows of loads with a plurality of loads in each row, comprises a frame defining inlet and outlet ends of the conveyor, the frame comprising four vertically disposed end members and a pair of side members extending between the inlet and outlet ends, each of the pair of side members being coupled to a pair of the vertically disposed members; braces that are affixed stationary, at each end thereof, to the frame in a spaced apart relationship with each other between the inlet end and the outlet end; stationary support brackets, each support bracket being permanently or detachably coupled to a respective brace; receptacles, each receptacle being coupled stationary to a respective support bracket and defining an interior space; rails positioned for a reciprocal linear movement within the interior space and extending between the inlet end and the outlet end; a singled powered member configured to provide the reciprocal linear movement of the rails; coupling members coupling each rail from the rails to the powered member; load carrying members extending between the inlet and outlet ends of the conveyor; force exerting members disposed in series with each other between the inlet end and the outlet end, each force exerting members is in a pivotal connection with a respective rail, each force exerting member is pivotable between a load engaging position and a non-load engaging position on the respective rail and is movable with the respective rail in the reciprocal linear movement, enabled by the powered member, to move the container assemblies positioned and conveying on the load carrying members; and stops, each stop positioned and mounted to maintain each force exerting member in the load engaging position.

In an embodiment, a conveyor, configured to convey an array of loads along a conveyance path, the loads being supported on load supporting members, the, the array comprising a plurality of rows of loads with a plurality of loads in each row, comprises a frame; load supporting members that are spaced apart with each other in a direction normal to the conveyance path, the load supporting members are mounted stationary on the frame; a powered member comprising a connection with the frame, the powered member operable to generate a linear movement; an indexing device supported on the frame, the indexing device comprising receptacles disposed in the array pattern and between a pair of adjacent load supporting members, carrying members extending between inlet and outlet ends of the conveyor, each carrying member mounted for a linear movement on two or more receptacles between a pair of adjacent load supporting members, force exerting members disposed in the array pattern between the inlet and outlet ends of the conveyor and adjacent the carrying members, each force exerting member comprising a front end and a rear end, and a connection between each force exerting member and a respective carrying member; and a linkage coupling the carrying members to the powered member.

It should be appreciated that reference throughout this specification to "an embodiment" means that a particular feature, structure or characteristic described in connection with the embodiment is included in at least one embodiment of the present invention. Therefore, it is emphasized and should be appreciated that two or more references to "an embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

Furthermore, there is no intention to be bound by any expressed or implied theory presented in the preceding technical field, background, or the following detailed description. It is also to be understood that the specific devices and processes illustrated in the coupled drawings, and described in the forgoing specification, are simply examples of the inventive concepts defined in the appended claims. Hence, any specific dimensions and other physical characteristics relating to the examples disclosed herein are not to be considered as limiting, unless the claims expressly state otherwise.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶16.

Anywhere the term "comprising" is used, embodiments and components "consisting essentially of" and "consisting of" are expressly disclosed and described herein."

Furthermore, the Abstract is not intended to be limiting as to the scope of the claimed invention and is for the purpose of quickly determining the nature of the claimed invention.

What is claimed is:

1. An indexing device for a conveyor configured to convey an array of loads along a conveyance path, the loads being supported on load supporting members, the load supporting members are spaced apart with each other in a direction normal to the conveyance path, the array comprising a plurality of rows of loads with a plurality of loads in each row, said indexing device comprising:
   receptacles disposed in an array pattern;
   carrying members extending between inlet and outlet ends of the conveyor, each carrying member mounted for a reciprocal linear movement on two or more receptacles between a pair of adjacent load supporting members;
   force exerting members disposed in said array pattern between the inlet and outlet ends of the conveyor and adjacent said carrying members, each force exerting member comprising a front end and a rear end, said each force exerting member moves linearly with said respective carrying member;
   a pivotal connection between each force exerting member and a respective carrying member, so that said each force exerting member pivots, due to gravity, from a load non-engaging position into a load engaging position and under a weight of the load from said load engaging position into said load non-engaging position;
   stops, each stop being rigidly coupled to a carrying member in a position to abut a side edge of a respective force exerting member and maintain said front end of said respective force exerting member in said load engaging position; and
   a linkage coupling said carrying members to a single powered member.

2. The indexing device of claim 1, wherein each receptacle comprises a pair of walls disposed vertically during use of said indexing devices, said each carrying member is disposed for said linear movement in a gap between said pair of walls.

3. The indexing device of claim 1, wherein each receptacle comprises a wall disposed vertically during use of said indexing devices, said wall comprising one of a recess and a protrusion and wherein each carrying member comprises an opposite one of said recess and protrusion, said recess and said protrusion being sized and shaped complimentary to each other so as to enable said linear movement of said each carrying member in a relationship to said each receptacle.

4. The indexing device of claim 1, wherein said front end comprises one of a recess, a protrusion and a combination thereof.

5. The indexing device of claim 1, wherein said front end is enlarged to extend above at least one load supporting member during use of said indexing device.

6. The indexing device of claim 1, wherein said front end has at least a portion thereof extending outwardly, in said load engaging position, from load carrying surfaces of the spaced apart load supporting members and in an abutting relationship with a portion of the load during operation of said indexing device, said abutting relationship causing an incremental advancement of said load between the inlet and outlet ends during said linear movement of said carrying member in a first direction; said front end and said rear end being at least partially disposed, in said non-load engaging position, so that not to move a respective load during said linear movement of said carrying member in an opposite second direction; said linear movement of said force exerting member in said first direction advances the load from the inlet end to the outlet end.

7. An indexing device for a conveyor configured to convey an array of loads along a conveyance path, the loads being supported on load supporting members, the load supporting members are spaced apart with each other in a direction normal to the conveyance path, the array comprising a plurality of rows of loads with a plurality of loads in each row, said indexing device comprising:
  carrying members extending between inlet and outlet ends of the conveyor, each carrying member mounted for a reciprocal linear movement between a pair of adjacent load supporting members;
  a linkage coupling said carrying members to a single powered member;
  receptacles mounted for said reciprocal linear movement on the load supporting members in the conveyor, wherein each receptacle comprises:
    a pair of first flanges disposed substantially horizontally along the conveyance path during use of said indexing device,
    a pair of second flanges, each connecting one first flange from said pair of first flanges to a load supporting member,
    a member disposed substantially horizontally during use of said indexing device between a pair of adjacent load supporting members,
    a female receptacle on each edge of said member, said each edge being disposed along the conveyance path, said female receptacle being sized and shaped to receive said one first flange from said pair of first flanges,
    a connection between said member and one carrying member, and
    a connection between said member and said linkage; and
  force exerting members disposed in said array pattern between the inlet and outlet ends of the conveyor and adjacent said carrying members, each force exerting member comprising a front end and a rear end, said each force exerting member moves linearly with said respective carrying member and pivots between a load engaging and a load non-engaging positions.

8. The indexing device of claim 7, further comprises a liner comprising a material with low friction characteristics, said liner comprising a U-shaped configuration in said plane transverse to said length of said carrying member, said liner being disposed between said base and said U-shaped configuration of said each receptacle.

9. A device for a conveyor configured to convey a single row of loads along a conveyance path in a first direction, the loads being supported on load supporting members during conveyance, the load supporting members are being spaced apart with each other in a second direction being normal to the conveyance path, the loads being disposed in the second direction, said indexing device comprising:
  a single row of receptacles disposed in said second direction;
  a single row of carrying members, each carrying member mounted for a linear movement on a respective receptacle between a pair of adjacent load supporting members;
  a single row of force exerting members, each force exerting member coupled either pivotally or stationary to a respective carrying member, each force exerting member comprising a front end and a rear end; and
  a connection between each force exerting member and a respective carrying member.

10. The device of claim 9, further comprising a linkage coupling said carrying members to a powered member.

11. A conveyor configured to convey an array of loads along a conveyance path, the loads being supported on load supporting members, the, the array comprising a plurality of rows of loads with a plurality of loads in each row, said conveyor comprising:
  a frame;
  load supporting members that are spaced apart with each other in a direction normal to the conveyance path, said load supporting members are mounted stationary on said frame;
  a powered member comprising a connection with said frame, said powered member operable to generate a linear movement;
  an indexing device supported on said frame, said indexing device comprising:
    receptacles disposed in said array pattern and between a pair of adjacent load supporting members,
    carrying members extending between inlet and outlet ends of the conveyor, each carrying member mounted for said linear movement on two or more receptacles between a pair of adjacent load supporting members,
    force exerting members disposed in an array pattern between the inlet and outlet ends of the conveyor and adjacent said carrying members, each force exerting member comprising a front end and a rear end, said each force exerting member moves linearly with said respective carrying member,
    a pivotal connection between each force exerting member and a respective carrying member, so that said each force exerting member pivots, due to gravity, from a load non-engaging position into a load engaging position and under a weight of the load from said load engaging position into said load non-engaging position, and
    stops, each stop being rigidly coupled to a carrying member in a position to abut a side edge of a respective force exerting member and maintain said front end of said respective force exerting member in said load engaging position; and
  a linkage coupling said carrying members to said powered member.

12. The conveyor of claim 11, further comprising a control unit configured to operate said powered member so as to generate said linear movement.

13. The conveyor of claim 12, further comprising one or more sensors coupled to said control unit, said one or more sensors positioned to sense one or more loads and generate a load sensing input.

14. The conveyor of claim 11, wherein said frame comprises braces extending in the direction normal to the conveyance path and being spaced apart from each other along the conveyance path and support brackets, each support bracket being coupled to a respective brace, wherein each receptacle is secured to and upstands on a respective support bracket.

15. The conveyor of claim 14, wherein said each support bracket comprises a U-shaped bracket with a pair of flanges coupled to a respective brace and a main portion with at least one surface disposed substantially horizontally during use of said conveyor and above said respective brace.

16. The conveyor of claim 15, wherein each flange is detachably coupled to said respective brace with a clamp.

17. An indexing device for a conveyor configured to convey an array of loads along a conveyance path, the loads being supported on load supporting members, the load supporting members are spaced apart with each other in a direction normal to the conveyance path, the array comprising a plurality of rows of loads with a plurality of loads in each row, said indexing device comprising:

- carrying members extending between inlet and outlet ends of the conveyor, each carrying member mounted for a reciprocal linear movement between a pair of adjacent load supporting members, said each carrying member comprises a base with a pair of portions, each of said pair of portions having a J-shaped configuration in a plane transverse to a length of said each carrying member;
- receptacles, each receptacle comprising a T-shaped configuration in said plane transverse to said length of said carrying member, said each receptacle is sized to fit within said base;
- a linkage coupling said carrying members to a single powered member; and
- force exerting members disposed in said array pattern between the inlet and outlet ends of the conveyor and adjacent said carrying members, each force exerting member comprising a front end and a rear end, said each force exerting member moves linearly with said respective carrying member and pivots between a load engaging and a load non-engaging positions.

18. An indexing device for a conveyor configured to convey an array of loads along a conveyance path, the loads being supported on load supporting members, the load supporting members are spaced apart with each other in a direction normal to the conveyance path, the array comprising a plurality of rows of loads with a plurality of loads in each row, said indexing device comprising:

- carrying members extending between inlet and outlet ends of the conveyor, each carrying member mounted for a reciprocal linear movement between a pair of adjacent load supporting members, said each carrying member comprises a base with a pair of portions, each of said pair of portions having an L-shaped configuration in a plane transverse to a length of said each carrying member;
- receptacles, each receptacle comprising a U-shaped configuration in said plane transverse to said length of said carrying member, said each receptacle is sized to fit within said base;
- a linkage coupling said carrying members to a single powered member; and
- force exerting members disposed in said array pattern between the inlet and outlet ends of the conveyor and adjacent said carrying members, each force exerting member comprising a front end and a rear end, said each force exerting member moves linearly with said respective carrying member and pivots between a load engaging and a load non-engaging positions.

\* \* \* \* \*